(12) United States Patent
Yang et al.

(10) Patent No.: US 12,323,881 B2
(45) Date of Patent: Jun. 3, 2025

(54) DEVICE POSITIONING METHOD AND RELATED APPARATUS

(71) Applicant: Huawei Technologies Co., Ltd., Shenzhen (CN)

(72) Inventors: Jianye Yang, Nanjing (CN); Penghui Chen, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 354 days.

(21) Appl. No.: 17/955,918

(22) Filed: Sep. 29, 2022

(65) Prior Publication Data

US 2023/0026812 A1 Jan. 26, 2023

Related U.S. Application Data

(63) Continuation of application No. PCT/CN2021/084184, filed on Mar. 30, 2021.

(30) Foreign Application Priority Data

Mar. 31, 2020 (CN) .......................... 202010247671.3

(51) Int. Cl.
*H04W 4/029* (2018.01)
(52) U.S. Cl.
CPC .................. *H04W 4/029* (2018.02)
(58) Field of Classification Search
CPC .............................. H04W 4/029; H04W 4/02
USPC ..................................................... 455/456.1
See application file for complete search history.

(56) References Cited

U.S. PATENT DOCUMENTS

| 2012/0252416 | A1* | 10/2012 | Kissinger | .............. H04W 74/06 |
| | | | | 455/412.2 |
| 2013/0247117 | A1* | 9/2013 | Yamada | ................... H04B 5/72 |
| | | | | 340/12.5 |
| 2014/0075352 | A1 | 3/2014 | Hansen et al. | |
| 2014/0242912 | A1 | 8/2014 | Imamura | |
| 2015/0355308 | A1 | 12/2015 | Ishida et al. | |
| 2016/0192125 | A1 | 6/2016 | Leland et al. | |
| 2017/0185265 | A1* | 6/2017 | Pierce | ................... H04L 51/224 |

FOREIGN PATENT DOCUMENTS

| CN | 104754512 A | 7/2015 |
| CN | 108717373 A | 10/2018 |
| CN | 109151210 A | 1/2019 |
| JP | 2008311889 A | 12/2008 |
| JP | 2014161493 A | 9/2014 |
| JP | 2014216726 A | 11/2014 |
| JP | 2016151960 A | 8/2016 |
| KR | 20160035767 A | 4/2016 |

* cited by examiner

*Primary Examiner* — Qutbuddin Ghulamali
(74) *Attorney, Agent, or Firm* — Conley Rose, P.C.

(57) ABSTRACT

A device positioning method includes a first electronic device sending, at each of a first position and a second position, a BLUETOOTH positioning signal to a second electronic device in response to a detected shake operation performed on the first electronic device. The first electronic device receives first response information sent by the second electronic device. The first electronic device determines first position information of the second electronic device based on the first response information. The first electronic device displays a second interface, and the second interface includes the first position information and the identifier of the second electronic device.

20 Claims, 49 Drawing Sheets

DEVICE POSITIONING METHOD AND RELATED APPARATUS

CROSS-REFERENCE TO RELATED APPLICATIONS

This is a continuation of International Patent Application No. PCT/CN2021/084184 filed on Mar. 30, 2021, which claims priority to Chinese Patent Application No. 202010247671.3 filed on Mar. 31, 2020. The disclosures of the aforementioned applications are hereby incorporated by reference in their entireties.

TECHNICAL FIELD

This disclosure relates to the field of short-range communications technologies, and in particular, to a device positioning method and a related apparatus.

BACKGROUND

The development of wireless communications technologies allows terminals such as smartphones and tablet computers to support users to share data such as pictures and documents with other devices, thereby improving office efficiency and office experience of the users. For example, a user may share data such as a picture or a file on a terminal such as a smartphone with another device without using a data cable.

Currently, when the user wants to share data such as a picture on a portable terminal such as a smartphone, the user first needs to determine a device for receiving in surrounding devices. When there are many surrounding devices capable of receiving the shared data, after the terminal discovers the surrounding devices, device names of the surrounding devices may be displayed on a sharing interface for the user to select. Generally, these surrounding devices are named after their models by default. When surrounding devices of a same model exist, duplicate device names are displayed on the sharing interface. This increases difficulty in identifying and determining the device for receiving, and reduces efficiency of sharing data by the terminal. In addition, in scenarios such as BLUETOOTH connection and device search, devices near the terminal also need to be positioned.

SUMMARY

This disclosure provides a device positioning method and a related apparatus, so that a terminal can determine and display, on a data sharing interface, a device connection interface, or a device searching interface by using a shake operation of a user, a position of a surrounding device relative to the terminal, thereby helping the user quickly position the surrounding device.

According to a first aspect, this disclosure provides a device positioning method, including: a first electronic device displays a first interface, the first interface includes first prompt information and an identifier of a second electronic device, and the first prompt information is used to prompt a user to shake the first electronic device. Detecting a shake operation performed on the first electronic device. The first electronic device sends a BLUETOOTH positioning signal to the second electronic device at each of a first position and a second position in response to the detected shake operation. The first electronic device receives first response information sent by the second electronic device. The first electronic device determines first position information of the second electronic device based on the first response information. The first position information includes a first direction and/or a first distance of the second electronic device. The first distance is a distance between the first electronic device and the second electronic device. The first electronic device displays a second interface, and the second interface includes the first position information and the identifier of the second electronic device.

This disclosure provides a device positioning method. The first electronic device can determine, in a process in which the user shakes the terminal, a position of the second electronic device relative to the terminal, and display a relative direction and a relative distance between the nearby device and the terminal. This helps the user quickly position the second electronic device, and determine whether the second electronic device is a device for sharing, a to-be-connected device, or a to-be-searched device.

In a possible implementation, the first response information includes: a first signal strength value of the BLUETOOTH positioning signal that is sent by the first electronic device at the first position and is received by the second electronic device, and a second signal strength value of the BLUETOOTH positioning signal that is sent by the first electronic device at the second position and is received by the second electronic device. That the first electronic device determines first position information of the second electronic device based on the first response information includes: the first electronic device determines a distance between the second electronic device and the first position based on the first signal strength value. The first electronic device determines a distance between the second electronic device and the second position based on the second signal strength value. The first electronic device determines the first position information based on the distance between the second electronic device and the first position, the distance between the second electronic device and the second position, and the first position and the second position. In this way, an operation process of converting a signal strength into a distance may be executed by the first electronic device, thereby reducing operations of the second electronic device.

In a possible implementation, the first response information includes: a distance that is between the second electronic device and the first position and that is determined by the second electronic device based on the first signal strength value, and a distance that is between the second electronic device and the second position and that is determined by the second electronic device based on the second signal strength value. The first signal strength value is a signal strength value of the BLUETOOTH positioning signal that is sent by the first electronic device at the first position and is received by the second electronic device, and the second signal strength value is a signal strength value of the BLUETOOTH positioning signal that is sent by the first electronic device at the second position and is received by the second electronic device. That the first electronic device determines first position information of the second electronic device based on the first response information includes: the first electronic device determines the first position information based on the distance between the second electronic device and the first position, the distance between the second electronic device and the second position, and the first position and the second position. In this way, an operation process of converting a signal strength into a distance may be executed by the second electronic device, thereby reducing operations of the first electronic device.

In a possible implementation, the method further includes: the first electronic device sends, at a third position, the BLUETOOTH positioning signal to the second electronic device. The first position, the second position, and the third position are not in a straight line. The first response information includes: a response of the second electronic device to the BLUETOOTH positioning signal sent by the first electronic device at the first position, a response of the second electronic device to the BLUETOOTH positioning signal sent by the first electronic device at the second position, and a response of the second electronic device to the BLUETOOTH positioning signal sent by the first electronic device at the third position. In this way, the first electronic device may complete positioning of the second electronic device by sending a positioning request to the second electronic device at three positions and receiving response information of the second electronic device, thereby improving positioning accuracy.

In a possible implementation, the first interface is a data sharing interface. The data sharing interface includes a file object selected by the user, the identifier of the second electronic device, and the prompt information. In this way, the device positioning method provided in this disclosure may be applied to a data sharing scenario, to help a user determine a device for sharing.

In response to a detected first operation of selecting the second electronic device, the first electronic device establishes a data transmission connection to the second electronic device. The first electronic device sends, by using the data transmission connection, the file object selected by the user to the second electronic device.

Optionally, the first electronic device establishes a data transmission connection to the second electronic device in response to the detected shake operation. The first electronic device sends, by using the data transmission connection, the file object selected by the user to the second electronic device. In this way, by using the shake operation, the file object may be located and sent to the second electronic device by establishing a connection, so that a data transmission operation is more convenient.

The data transmission connection may be a communication connection such as WI-FI Direct, WI-FI software enabled access point (SoftAP), or ultra-wideband (UWB).

In a possible implementation, the first interface further includes an identifier of a third electronic device. The method further includes: the first electronic device sends the BLUETOOTH positioning signal to the third electronic device at each of the first position and the second position in response to the detected shake operation. The first electronic device receives second response information sent by the third electronic device. The first electronic device determines second position information of the third electronic device based on the second response information. The second position information includes a second direction of the third electronic device and/or a second distance of the third electronic device, and the second distance is a distance between the first electronic device and the third electronic device. The second interface further includes: the second position information and an identifier of the third electronic device. In this way, the first electronic device may simultaneously position a plurality of other devices.

In a possible implementation, the third electronic device is closest to the first position, and the method further includes: the first electronic device displays the identifier of the third electronic device at a specified place on the second interface. In this way, the first electronic device may prompt the user with a preferred device.

In a possible implementation, the third electronic device is closest to the second position, and the method further includes: the first electronic device displays identifier of the third electronic device at a specified place on the second interface. In this way, the first electronic device may prompt the user with a preferred device.

In a possible implementation, the first interface is a BLUETOOTH connection interface. The method further includes: the first electronic device establishes a BLUETOOTH connection to the second electronic device in response to a detected second operation of selecting the second electronic device. In this way, the device positioning method in this disclosure may be applied to a BLUETOOTH connection application scenario, to help a user quickly select a to-be-connected device.

In a possible implementation, the first interface is a BLUETOOTH device setting interface, and the first electronic device establishes the BLUETOOTH connection to the second electronic device. In this way, the device positioning method in this disclosure may be applied to an application scenario of searching for a connected device, to help a user quickly find the connected device.

In a possible implementation, the first interface is an accessory search interface, and the first electronic device disconnects the BLUETOOTH connection to the second electronic device. The accessory search interface further includes a sound play control element. The method further includes: the first electronic device sends, in response to a received third operation performed on the sound play control element, a sound play request to the second electronic device through BLUETOOTH Low Energy. The sound play request is used to request the second electronic device to play a preset sound. In this way, the device positioning method in this disclosure may be applied to an application scenario of searching for a disconnected device, to help a user quickly find the disconnected device.

In a possible implementation, that the first electronic device sends a BLUETOOTH positioning signal to the second electronic device at each of a first position and a second position includes: when the first electronic device does not establish a BLUETOOTH connection to the second electronic device, the first electronic device broadcasts the BLUETOOTH positioning signal to the second electronic device at each of the first position and the second position through BLUETOOTH Low Energy. When the first electronic device has established a BLUETOOTH connection to the second electronic device, the first electronic device broadcasts the BLUETOOTH positioning signal to the second electronic device at each of the first position and the second position through BLUETOOTH Low Energy, or the first electronic device sends the BLUETOOTH positioning signal to the second electronic device by using the established BLUETOOTH connection. In this way, regardless of whether the first electronic device is connected to the second electronic device by using BLUETOOTH, the first electronic device can determine a position of the second electronic device.

In a possible implementation, that the first electronic device determines first position information of the second electronic device based on the first response information includes: the first electronic device determines the distance between the second electronic device and the first position and the distance between the second electronic device and the second position based on the first response information. The first electronic device determines a first circle by using the first position as a circle center and by using the distance between the second electronic device and the first position as a radius. The first electronic device determines a second circle by using the second position as a circle center and by using the distance between the second electronic device and the second position as a radius. The first electronic device determines the first position information of the second electronic device based on an intersection point of the first circle and the second circle.

In a possible implementation, the first prompt information is used to prompt the user to shake the first electronic device from the first position to the second position. In this way, a shake operation of the user can be more accurate, and positioning accuracy can be improved.

In a possible implementation, the method further includes: the first electronic device displays second prompt information, and the second prompt information is used to prompt the user to shake the first electronic device from the second position to the third position. The first electronic device sends, at the third position, the BLUETOOTH positioning signal to the second electronic device.

In a possible implementation, before the first electronic device displays the first interface, the method further includes: the first electronic device displays a third interface, and the third interface includes the identifier of the second electronic device. The first electronic device displays the first interface in response to a detected fourth operation performed on the identifier of the second electronic device. This can prevent triggering positioning of another device in a process such as walking.

According to a second aspect, this disclosure provides an electronic device, which is the first electronic device and includes a touchscreen, one or more processors, and one or more memories. The one or more memories are coupled to the one or more processors. The one or more memories are configured to store computer program code. The computer program code includes computer instructions. When the one or more processors execute the computer instructions, a communications apparatus performs the device positioning method in any possible implementations of any one of the foregoing aspects.

According to a third aspect, this disclosure provides an electronic device, including one or more function modules. The one or more function modules are configured to perform the device positioning method in any one of the possible implementations of any one of the foregoing aspects.

According to a fourth aspect, an embodiment of this disclosure provides a computer storage medium, including computer instructions. When the computer instructions run on an electronic device, the electronic device is enabled to perform the device positioning method in any one of the possible implementations of any one of the foregoing aspects.

According to a fifth aspect, an embodiment of this disclosure provides a computer program product. When the computer program product is run on a computer, the computer is enabled to perform the device positioning method in any one of the possible implementations of any one of the foregoing aspects.

DESCRIPTION OF EMBODIMENTS

The following clearly describes the technical solutions in embodiments of this disclosure with reference to the accompanying drawings. In the descriptions of embodiments of this disclosure, "I" means "or" unless otherwise specified. For example, A/B may represent A or B. "and/or" in the text describes only an association relationship for describing associated objects and represents that three relationships may exist. For example, A and/or B may represent the following three cases: only A exists, both A and B exist, and only B exists. In addition, in the descriptions of the embodiments of this disclosure, "a plurality of" means two or more.

The following terms "first" and "second" are merely intended for a purpose of description, and shall not be understood as implying or implying relative importance or implicitly indicating a quantity of indicated technical features. Therefore, a feature limited by "first" or "second" may explicitly or implicitly include one or more of the features. In the descriptions of embodiments of this disclosure, unless otherwise specified, "a plurality of" means two or more.

Embodiments of this disclosure provide a device positioning method. A terminal can determine, in a process in which a user shakes the terminal, a position of a nearby device relative to the terminal, and display a relative direction and a relative distance between the nearby device and the terminal, to enable the user to quickly position a to-be-shared device, a to-be-connected device, or a device for sharing.

Figure 1:
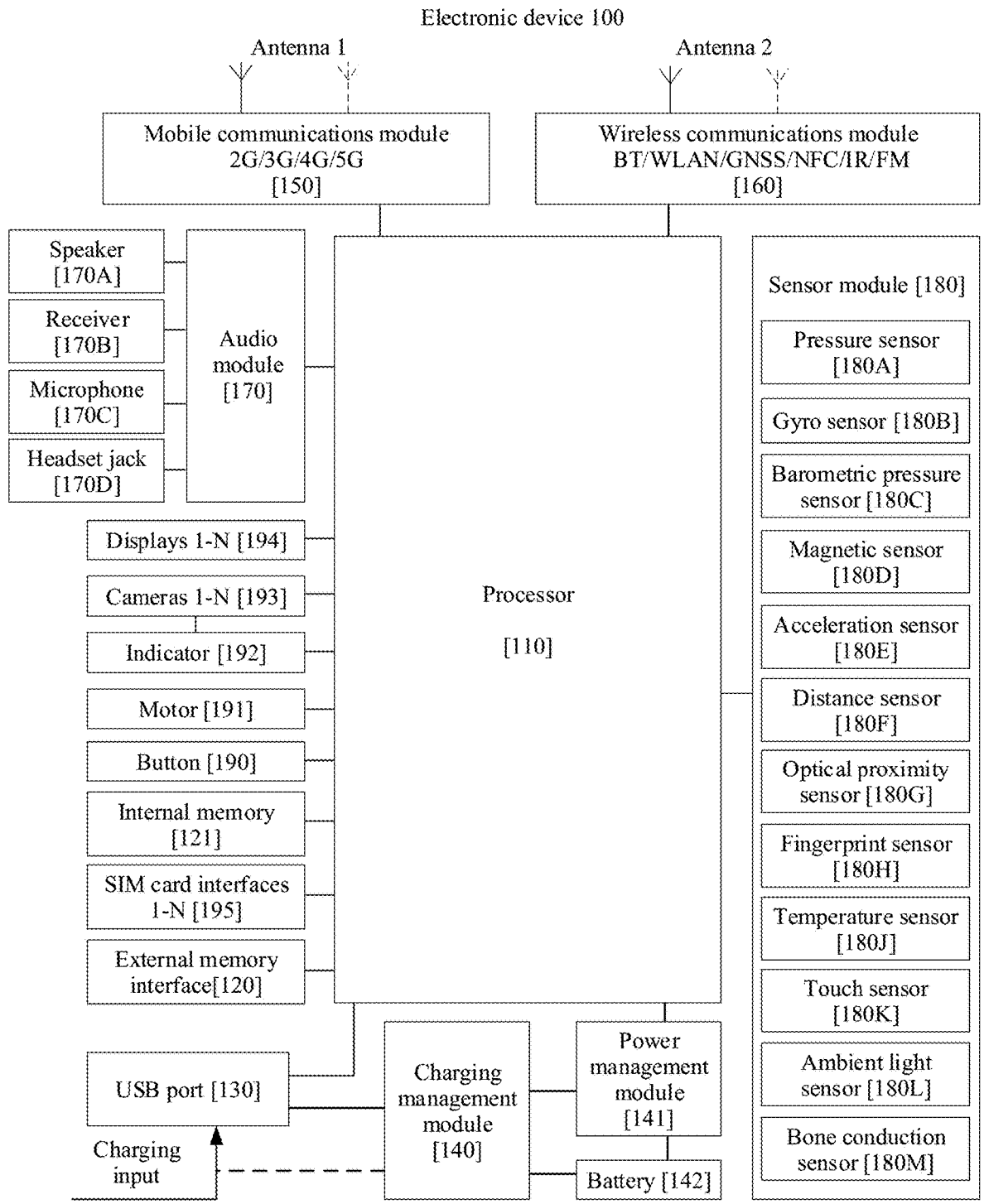
FIG. 1 is a schematic diagram of a hardware structure of a terminal according to an embodiment of this disclosure.

FIG. 1 is a schematic diagram of a structure of a terminal 100.

The following uses the terminal 100 as an example to describe this embodiment. It should be understood that the terminal 100 shown in FIG. 1 is merely an example, and the terminal 100 may have more or fewer components than those shown in FIG. 1, two or more components may be combined, or there may be different component configurations. Various parts shown in the figure may be implemented in hardware including one or more signal processing and/or application-specific integrated circuits, software, or a combination of hardware and software.

The terminal 100 may include a processor 110, an external memory interface 120, an internal memory 121, a Universal Serial Bus (USB) interface 130, a charging management module 140, a power supply management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a Subscriber Identity Module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient optical sensor 180L, a bone conduction sensor 180M, and the like.

It may be understood that the structure shown in this embodiment of the present disclosure does not constitute a specific limitation on the terminal 100. In some other embodiments of this disclosure, the terminal 100 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors.

The controller may be a nerve center and a command center of the terminal 100. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data that has been used or cyclically used by the processor 110. If the processor 110 needs to use the instructions or the data again, the processor 110 may directly invoke the instructions or the data from the memory. This avoids repeated access and reduces waiting time of the processor 110, thereby improving system efficiency.

In some embodiments, the processor 110 may include one or more interfaces. The interface may include an Inter-Integrated Circuit ($I^2C$) interface, an Inter-Integrated Circuit Sound ($I^2S$) interface, a pulse-code modulation (PCM) interface, a universal asynchronous reeiver/transmitter (UART) interface, a Mobile Industry Processor Interface (MIPI), a general-purpose input/output (GPIO) interface, a SIM interface, and/or a USB interface.

The $I^2C$ interface is a bidirectional synchronous serial bus, including a serial data line (SDA) and a serial clock line (SCL). In some embodiments, the processor 110 may include a plurality of $I^2C$ buses. The processor 110 may be separately coupled to the touch sensor 180K, a charger, a flash, the camera 193, and the like by using different $I^2C$ bus interfaces. For example, the processor 110 may be coupled to the touch sensor 180K by using an $I^2C$ interface, so that the processor 110 communicates with the touch sensor 180K by using the $I^2C$ bus interface, to implement a touch function of the terminal 100.

The $I^2S$ interface may be used for audio communication. In some embodiments, the processor 110 may include a plurality of $I^2S$ buses. The processor 110 may be coupled to the audio module 170 by using an $I^2S$ bus, to implement communication between the processor 110 and the audio module 170. In some embodiments, the audio module 170 may transfer an audio signal to the wireless communications module 160 by using an $I^2S$ interface, to implement a function of answering a call by using a BLUETOOTH headset.

The PCM interface may also be used for audio communication, and samples, quantizes, and encodes an analog signal. In some embodiments, the audio module 170 may be coupled to the wireless communications module 160 by using the PCM bus interface. In some embodiments, the audio module 170 may alternatively transfer an audio signal to the wireless communications module 160 by using the PCM interface, to implement a function of answering a call by using a BLUETOOTH headset. Both the $I^2S$ interface and the PCM interface may be configured to perform audio communication.

The UART interface is a universal serial data bus used for asynchronous communication. The bus may be a bidirectional communications bus. It converts data to be transmitted between serial communication and parallel communication. In some embodiments, the UART interface is usually configured to connect the processor 110 and the wireless communications module 160. For example, the processor 110 communicates with a BLUETOOTH module in the wireless communications module 160 by using the UART interface, to implement a BLUETOOTH function. In some embodiments, the audio module 170 may transfer an audio signal to the wireless communications module 160 by using the UART interface, to implement a function of playing music by using a BLUETOOTH headset.

The MIPI interface may be configured to connect the processor 110 to peripheral devices such as the display 194 and the camera 193. The MIPI interface includes a Camera Serial Interface (CSI), a Display Serial Interface (DSI), and the like. In some embodiments, the processor 110 communicates with the camera 193 by using the CSI interface, to implement a photographing function of the terminal 100. The processor 110 communicates with the display 194 by using the DSI interface, to implement a display function of the terminal 100.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may be further configured as an I²C interface, an I²S interface, a UART interface, an MIPI interface, or the like.

The USB interface 130 is an interface that meets a USB standard specification, and may be a mini USB interface, a micro USB interface, a USB Type-C interface, or the like. The USB interface 130 may be configured to connect to a charger for charging the terminal 100, may be configured to transmit data between the terminal 100 and a peripheral device, or may be configured to connect to a headset for playing audio by using the headset. The interface may be further configured to connect to another terminal such as an augmented reality (AR) device.

It may be understood that the interface connection relationship between the modules shown in this embodiment of the present disclosure is merely an example for description, and does not constitute a limitation on the structure of the terminal 100. In some other embodiments of this disclosure, the terminal 100 may alternatively use an interface connection manner different from that in the foregoing embodiment, or a combination of a plurality of interface connection manners.

The charging management module 140 is configured to receive charging input from a charger. The charger may be a wireless charger or a wired charger. In some embodiments of wired charging, the charging management module 140 may receive charging input of the wired charger by using the USB interface 130. In some embodiments of wireless charging, the charging management module 140 may receive wireless charging input by using a wireless charging coil of the terminal 100. When charging the battery 142, the charging management module 140 may further supply power to the terminal by using the power supply management module 141.

The power supply management module 141 is configured to connect the battery 142, the charging management module 140, and the processor 110. The power supply management module 141 receives input of the battery 142 and/or input of the charging management module 140, and supplies power to the processor 110, the internal memory 121, an external memory, the display 194, the camera 193, the wireless communications module 160, and the like. The power supply management module 141 may be further configured to monitor a parameter such as a battery capacity, a quantity of battery cycles, and a battery health status (electric leakage or impedance). In some other embodiments, the power supply management module 141 may alternatively be disposed in the processor 110. In some other embodiments, the power supply management module 141 and the charging management module 140 may alternatively be disposed in a same component.

A wireless communication function of the terminal 100 may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the terminal 100 may be configured to cover one or more communications frequency bands. Different antennas may be multiplexed to improve utilization of the antennas. For example, the antenna 1 may be multiplexed as a diversity antenna of a wireless local area network. In some other embodiments, the antenna may be used in combination with a tuning switch.

The mobile communications module 150 may provide a wireless communications solution applied to the terminal 100 including 2G/3G/4G/5G. The mobile communications module 150 may include at least one filter, a switch, a power amplifier, a low noise amplifier (LNA), and the like. The mobile communications module 150 may receive an electromagnetic wave by using the antenna 1, perform processing such as filtering and amplifying on the received electromagnetic wave, and transmit the electromagnetic wave to the modem processor for demodulation. The mobile communications module 150 may further amplify a signal modulated by the modem processor, and convert, by using the antenna 1, the signal into an electromagnetic wave for radiation. In some embodiments, at least some functional modules in the mobile communications module 150 may be disposed in the processor 110. In some embodiments, at least some function modules of the mobile communications module 150 may be disposed in a same device with at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then the demodulator transfers the low-frequency baseband signal obtained through demodulation to the baseband processor for processing. After being processed by the baseband processor, the low-frequency baseband signal is transmitted to the application processor. The application processor outputs a sound signal by using an audio device (not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same device as the mobile communications module 150 or another function module.

The wireless communications module 160 may provide a wireless communication olution that is pplied to the terminal 100, and that includes wireless local area networks (WLAN) (for example, a WI-FI network), BLUETOOTH (BLUETOOTH, BT), a global navigation satellite system (GNSS), frequency modulation (FM), a near-field communication (NFC) technology, an infrared (IR) technology, or the like. The wireless communications module 160 may be one or more components integrating at least one communications processing module. The wireless communications module 160 receives an electromagnetic wave by using the antenna 2, performs frequency modulation and filtering processing on an electromagnetic wave signal, and sends the processed signal to the processor 110. The wireless communications module 160 may further receive a to-be-sent signal from the processor 110, perform frequency modulation and amplification on the to-be-sent signal, and convert, by using the antenna 2, the signal into an electromagnetic wave for radiation.

In embodiments of this disclosure, a BLUETOOTH module in the terminal 100 may support BLUETOOTH Low Energy (BLE) and classic BLUETOOTH (basic rate/enhanced data rate (BR/EDR)).

The BLUETOOTH module may be configured to discover a nearby device around the terminal 100 by using the BLE. After discovering a nearby device around the terminal 100, the terminal 100 may obtain a device name of the nearby device, and display, on the display, a device option corresponding to the nearby device and the device name.

The BLUETOOTH module may be configured to send a BLUETOOTH positioning signal to another device at two or more positions. After receiving the BLUETOOTH positioning signal, the other device may calculate a distance between the other device and the terminal 100 based on received signal strength of the BLUETOOTH positioning signal, and return a BLUETOOTH response to the terminal 100. The BLUETOOTH response includes information about the distance between the other device and the terminal 100.

In a possible implementation, the BLUETOOTH module may send the BLUETOOTH positioning signal to another device at two or more positions. After receiving the BLUETOOTH positioning signal, the other device may directly return the received signal strength value of the BLUETOOTH positioning signal to the BLUETOOTH module of the terminal 100. The BLUETOOTH module may send the received signal strength value to the processor 110. The processor 110 may calculate position information of the other device relative to the terminal 100 based on the received signal strength values of the two or more positions.

In a possible implementation, the BLUETOOTH module on the terminal 100 may receive, at two or more positions, BLUETOOTH signals sent by another device. The BLUETOOTH module may report, to the processor 110, signal strength values of the BLUETOOTH signals separately received at the two or more positions. The processor 110 may calculate position information of the other device relative to the terminal 100 based on the received signal strength values of the two or more positions.

In some embodiments, the antenna 1 of the terminal 100 is coupled to the mobile communications module 150, and the antenna 2 is coupled to the wireless communications module 160, so that the terminal 100 may communicate with a network and another device by using a wireless communications technology. The wireless communication technology may include a Global System for Mobile Communications (GSM), a General Packet Radio Service (GPRS), code-division multiple access (CDMA), wideband code-division multiple access (WCDMA), time-division synchronous code-division multiple access (TD-SCDMA), Long-Term Evolution (LTE), BLUETOOTH, a GNSS, a WLAN, NFC, FM, and/or an IR technology. The GNSS may include a Global Positioning System (GPS), a Global Navigation Satellite System (GLONASS), a BEIDOU Navigation Satellite System (BDS), a Quasi-Zenith Satellite System (QZSS), and/or satellite-based augmentation systems (SBAS).

The terminal 100 may implement a display function by using the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs, and the GPUs execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light-emitting diode (AMOLED), a flex light-emitting diode (FLED), a mini-LED, a micro-LED, a micro-OLED, a quantum dot light emitting diode (QLED), or the like. In some embodiments, the terminal 100 may include one or N displays 194, where N is a positive integer greater than 1.

In embodiments of this disclosure, the display 194 may display a data sharing interface (for example, a sharing interface of a file such as a picture, audio, a video, or a document). When the user shakes the terminal 100 to enable the terminal 100 to position a nearby device by using BLUETOOTH, the display 194 may display position information of the nearby device on the sharing interface. In some application scenarios, the display 194 may display a device connection interface (for example, a BLUETOOTH connection interface). When the user shakes the terminal 100 to enable the terminal 100 to position the nearby device by using the BLUETOOTH, the display 194 may display the position information of the nearby device on the device connection interface. In some application scenarios, the display 194 may display a device search interface (for example, an accessory search interface). After the user shakes the terminal 100, to enable the terminal 100 to position a specified device by using the BLUETOOTH, the display 194 may display, on the device search interface, position information of the specified device relative to the terminal 100. For specific content, refer to subsequent embodiments, and details are not described herein again.

The terminal 100 may implement a photographing function by using the ISP, the camera 193, the video coder/decoder, the GPU, the display 194, the application processor, and the like.

The image signal processor (ISP) is configured to process data fed back by the camera 93. The camera 193 is configured to capture a static image or a video. An object generates, through a lens, an optical image to be projected to a photosensitive element. The photosensitive element may be a charge-coupled device (CCD) or a complementary metal-oxide-semiconductor (CMOS) optoelectronic transistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in a format such as RGB or YUV. In some embodiments, the terminal 100 may include one or N cameras 193, where N is a positive integer greater than 1.

The digital signal processor is configured to process a digital signal, and may further process another digital signal in addition to a digital image signal.

The video codec is configured to compress or decompress a digital video. The terminal 100 may support one or more video codecs. In this way, the terminal 100 can play or record videos in a plurality of coding formats, for example, Moving Picture Experts Group (MPEG)-1, MPEG-2, MPEG-3, and MPEG-4.

The NPU is a neural-network (NN) computing processor. By referring to a biological neural network structure.

The external memory interface 120 may be configured to connect to an external storage card, for example, a micro Secure Digital (SD) card, to extend a storage capability of the terminal 100. The external memory card communicates with the processor 110 by using the external memory interface 120, to implement a data storage function.

The internal memory 121 may be configured to store computer-executable program code. The executable program code includes instructions. The processor 110 runs the instructions stored in the internal memory 121, to perform various function applications of the terminal 100 and data processing. The internal memory 121 may include a program storage area and a data storage area. The program storage area may store an operating system, an application required by at least one function (for example, a sound playing function or an image playing function), and the like. The data storage area may store data (such as audio data and a phone book) created during use of the terminal 100. In addition, the internal memory 121 may include a high-speed random-access memory, and may further include a non-volatile memory, for example, at least one magnetic disk storage device, a flash storage device, or a Universal Flash Storage (UFS).

In embodiments of this disclosure, by running the instructions stored in the internal memory 121, the processor 110 can determine a position of a nearby device relative to the terminal 100 in a process in which the user moves the terminal, and controls the display 194 to display a relative direction and distance between the other device and the terminal on the data sharing interface or the device connection interface.

The terminal 100 may implement an audio function by using the audio module 170, the speaker 170A, the receiver 170B, the microphone 170C, the headset jack 170D, the application processor, and the like. For example, music playing and recording.

The pressure sensor 180A is configured to sense a pressure signal, and can convert the pressure signal into an electrical signal. In some embodiments, the pressure sensor 180A may be disposed in the display 194. The pressure sensor 180A may be of many types, for example, a resistive pressure sensor, an inductive pressure sensor, and a capacitive pressure sensor. The capacitive pressure sensor may include at least two parallel plates made of conductive materials. When a force is exerted on the pressure sensor 180A, capacitance between electrodes changes. The terminal 100 determines strength of the pressure based on a change in the capacitance. When a touch operation is performed on the display 194, the terminal 100 detects strength of the touch operation based on the pressure sensor 180A. The terminal 100 may also calculate a touch position based on a detection signal of the pressure sensor 180A. In some embodiments, touch operations that are performed on a same touch position but have different touch operation strength may correspond to different operation instructions.

The gyro sensor 180B may be configured to determine a motion posture of the terminal 100. In some embodiments, an angular velocity of the terminal 100 around three axes (namely, axes x, y, and z) may be determined by using the gyro sensor 180B. The gyro sensor 180B may be configured to implement image stabilization during photographing. For example, when a shutter is pressed, the gyro sensor 180B detects an angle at which the terminal 100 jitters, obtains, through calculation based on the angle, a distance for which a lens module needs to compensate, and allows a lens to cancel the jitter of the terminal 100 through reverse motion, to implement the image stabilization. The gyro sensor 180B may also be used in a navigation scenario and a somatic game scenario.

The barometric pressure sensor 180C is configured to measure barometric pressure. In some embodiments, the terminal 100 calculates an altitude by using a barometric pressure value measured by the barometric pressure sensor 180C, to assist in positioning and navigation.

The magnetic sensor 180D includes a Hall effect sensor.

The acceleration sensor 180E may detect magnitudes of accelerations of the terminal 100 in various directions (usually three axes). When the terminal 100 is still, a magnitude and a direction of gravity may be detected. The acceleration sensor may be further configured to identify a posture of the terminal, and is used in an application such as landscape/portrait orientation switching, a pedometer, and the like.

In embodiments of this disclosure, the gyro sensor 180B and the acceleration sensor 180E may be configured to detect a movement track of the terminal 100 and detect a position at which a BLUETOOTH positioning signal is sent. The gyro sensor 180B may send detected gyro data to the processor 110, and the acceleration sensor 180E may send acceleration data to the processor 110. The processor 110 may calculate, based on the acceleration data and the gyro data, the moving track of the terminal 100 and the position at which the BLUETOOTH positioning signal is sent.

The distance sensor 180F is configured to measure a distance. The terminal 100 may measure the distance by using infrared or laser. In some embodiments, in a photographing scenario, the terminal 100 may measure a distance by using the distance sensor 180F to implement fast focusing.

The optical proximity sensor 180G may include, for example, a light emitting diode (LED) and an optical detector, for example, a photodiode. The LED may be an infrared LED. The terminal 100 transmits infrared light by using the LED. The terminal 100 detects infrared reflected light from a nearby object by using the photodiode. When plenty of reflected light is detected, it may be determined that there is an object near the terminal 100.

The ambient optical sensor 180L is configured to sense luminance of ambient light.

The fingerprint sensor 180H is configured to collect a fingerprint.

The temperature sensor 180J is configured to detect a temperature.

The touch sensor 180K is also referred to as a "touch panel". The touch sensor 180K may be disposed in the display 194, and the touch sensor 180K and the display 194 form a touchscreen, which is also referred to as a "touch control screen". The touch sensor 180K is configured to detect a touch operation performed on or near the touch sensor 180K. The touch sensor may transfer the detected touch operation to the application processor, to determine a type of a touch event. Visual output related to the touch operation may be provided by using the display 194. In some other embodiments, the touch sensor 180K may alternatively be disposed on a surface of the terminal 100 at a position different from that of the display 194.

The bone conduction sensor 180M may obtain a vibration signal.

The button 190 includes a power button, a volume button, and the like.

The motor 191 may generate a vibration prompt. The motor 191 may be configured to provide an incoming call vibration prompt, or may be configured to provide touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. The touch vibration feedback effect may be further customized.

The indicator 192 may be an indicator light, and may be configured to indicate a charging status and a power change, or may be configured to indicate a message, a missed call, a notification, or the like.

The SIM card interface 195 is configured to connect to a SIM card.

The following describes a BLUETOOTH protocol architectural diagram in this disclosure.

Figure 2:
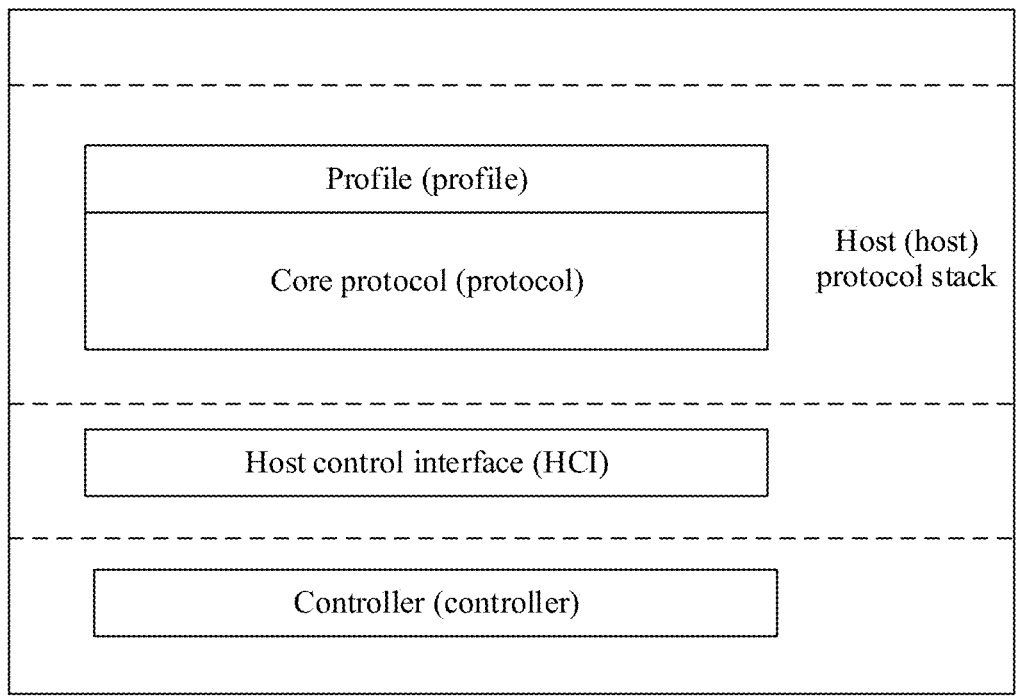
FIG. 2 is a schematic diagram of a BLUETOOTH protocol frame according to an embodiment of this disclosure.

As shown in FIG. 2, an embodiment of this disclosure provides a BLUETOOTH protocol framework, including but not limited to a host protocol stack, a host controller interface (HCI), and a controller.

The host protocol stack defines a plurality of profiles and a core protocol in the BLUETOOTH framework, each profile defines a corresponding message format and application rule, and the profiles are BLUETOOTH services. To implement interconnection and interworking between different devices on different platforms, the BLUETOOTH protocol is a specification formulated for various possible and universal application scenarios, for example, an Advanced Audio Distribution Profile (A2DP), a Hands-Free Profile (HFP), and the like.

The core protocol includes but is not limited to a BLUETOOTH basic Service Discovery Protocol (SDP), a Logical Link Control and Adaptation Protocol (L2CAP), and the like. The core protocol is essential to the BLUETOOTH protocol stack.

The HCI provides an upper-layer protocol with a unified interface for entering a link managing device and a unified manner for entering a baseband. Several transport layers exist between a host core protocol stack and the controller. These transport layers are transparent and complete a data transmission task. The BLUETOOTH Special Interest Group (BLUETOOTH Special Interest Group (SIG)) specifies four physical bus manners for connecting to hardware, that is, four HCI transport layers: USB, RS232, UART, and PC card.

The controller defines a bottom-layer hardware part, including a radio frequency, a baseband, and link management. A radio frequency layer implements filtering and transmission of a data bit stream by using a microwave of a 2.4 gigahertz (GHz) ISM frequency band that does not need to be authorized, and mainly defines a condition that needs to be met for a BLUETOOTH transceiver to work normally in this frequency band. The baseband is responsible for frequency hopping and transmission of BLUETOOTH data and information frames. Link management is responsible for connecting, establishing, and disconnecting links and performing security control. A link manager (LM) layer is a link management layer protocol of the BLUETOOTH protocol stack, and is responsible for translating an upper-layer HCI command into an operation that can be accepted by the baseband, establishing an asynchronous connection-oriented link (ACL) and a synchronous connection-oriented/extended link (SCO), and enabling a BLUETOOTH device to enter a working mode of an energy saving state, and the like. A link control (LC) layer is responsible for responding to an upper-layer link control command (for example, a link control command for performing functions such as establishing a transmission link of a data packet and maintaining a link) during transmission of a batch of data packets.

Some content of the method described in this embodiment of this disclosure is implemented by the wireless communications module 160 of the terminal 100 shown in FIG. 1, and may be performed by a BLUETOOTH module or a BLUETOOTH chip.

The following describes a data sharing process in a related technology of this disclosure.

The following uses sharing a picture file as an example.

1. First, a user needs to open a user interface of a gallery application on a terminal.

Figure 3A:
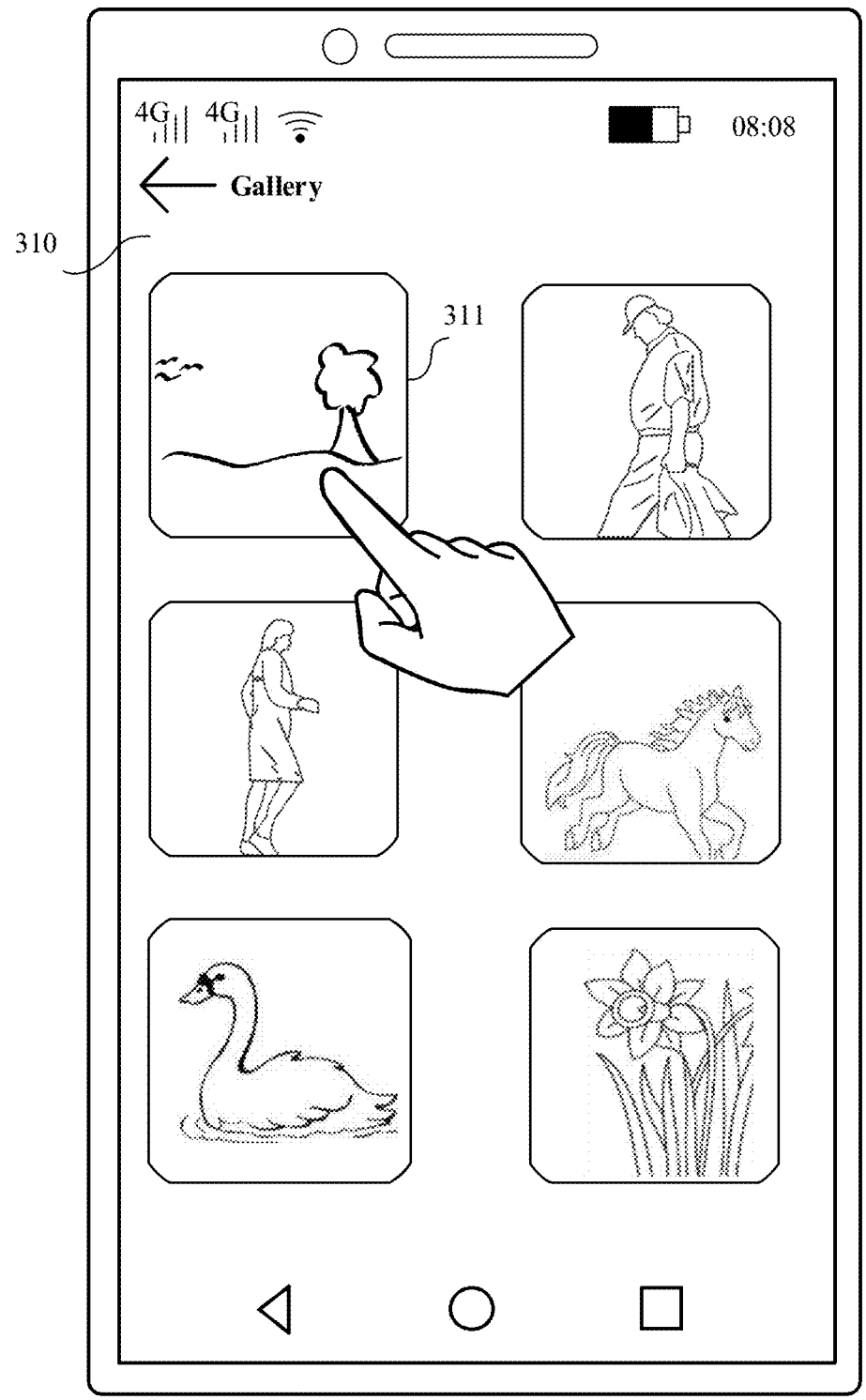
FIG. 3A to FIG. 3D are schematic diagrams of a group of interfaces according to other approaches.

FIG. 3A shows an example of a user interface 310 of a gallery application displayed on a terminal such as a smartphone. The "gallery" is an application for picture management on a terminal such as a smartphone or a tablet computer, and may also be referred to as an "album". The user interface 310 of the gallery application includes thumbnails of one or more pictures.

2. The user opens a picture display interface in the gallery application.

The terminal may receive an input operation (for example, tapping) performed by the user on the thumbnail 311 in FIG. 3A. In response to the input operation, the terminal may display a picture display interface 320 shown in FIG. 3B.

Figure 3B:
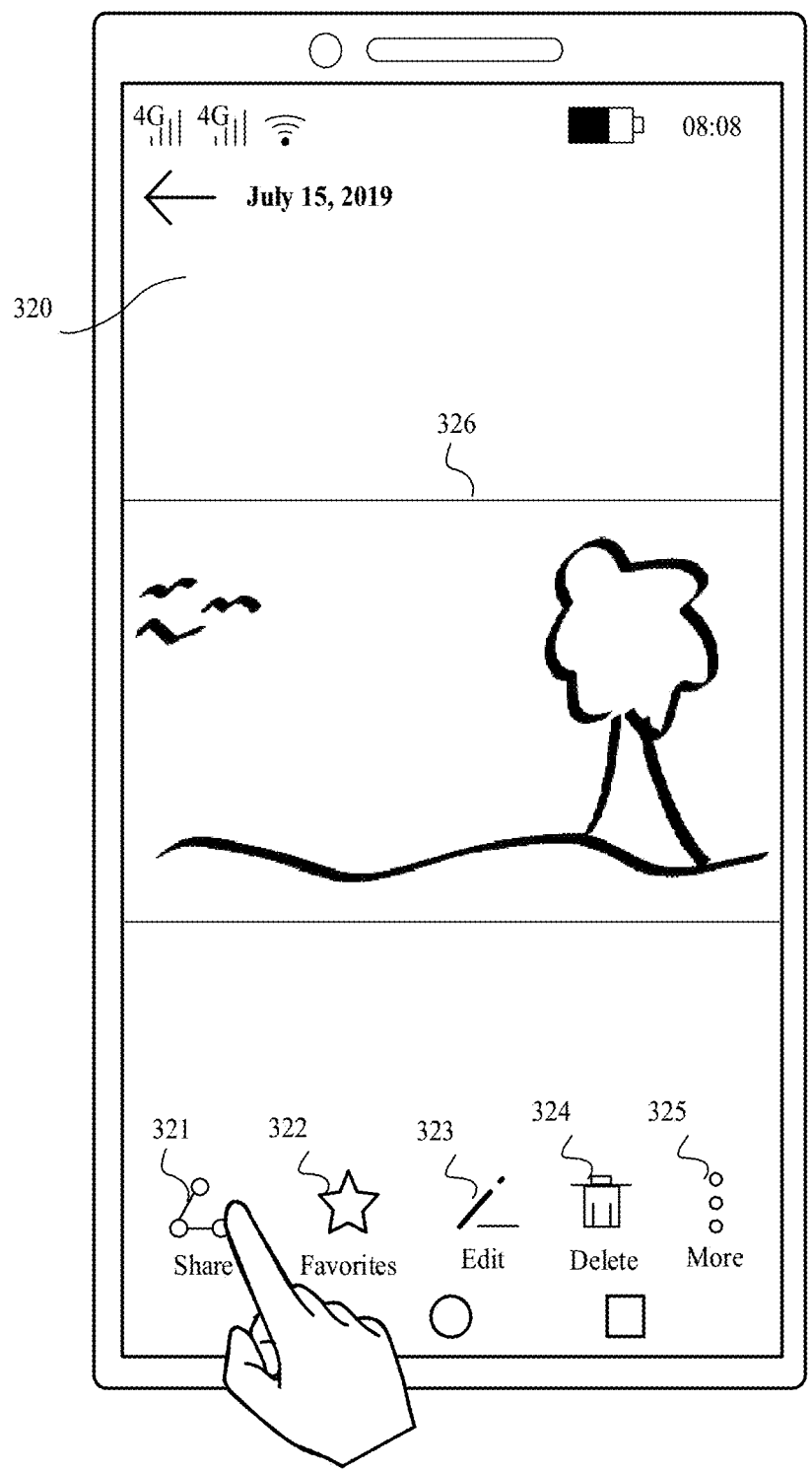

As shown in FIG. 3B, the picture display interface 320 includes a picture 326, a Share button 321, a Favorites button 322, an Edit button 323, a Delete button 324, and a More button 325. The picture 326 may have a title, for example, "Jul. 15, 2019". The Share button 321 may be used to trigger opening of a picture sharing interface. The Favorites button 322 may be used to trigger adding the picture 326 to a Favorites picture folder. The Edit button 323 may be configured to trigger an editing function such as rotation, pruning, filter adding, and blurring of the picture 326. The Delete button 324 may be configured to trigger deletion of the picture 326. The More button 325 may be used to trigger enabling of more functions related to the picture.

3. The user taps the share button on the picture display interface to open the picture sharing interface.

The terminal may receive an input operation (for example, tapping) performed by the user on the Share button 321 in FIG. 3B. In response to the input operation, the terminal may display a file sharing interface 330 shown in FIG. 3C.

Figure 3C:
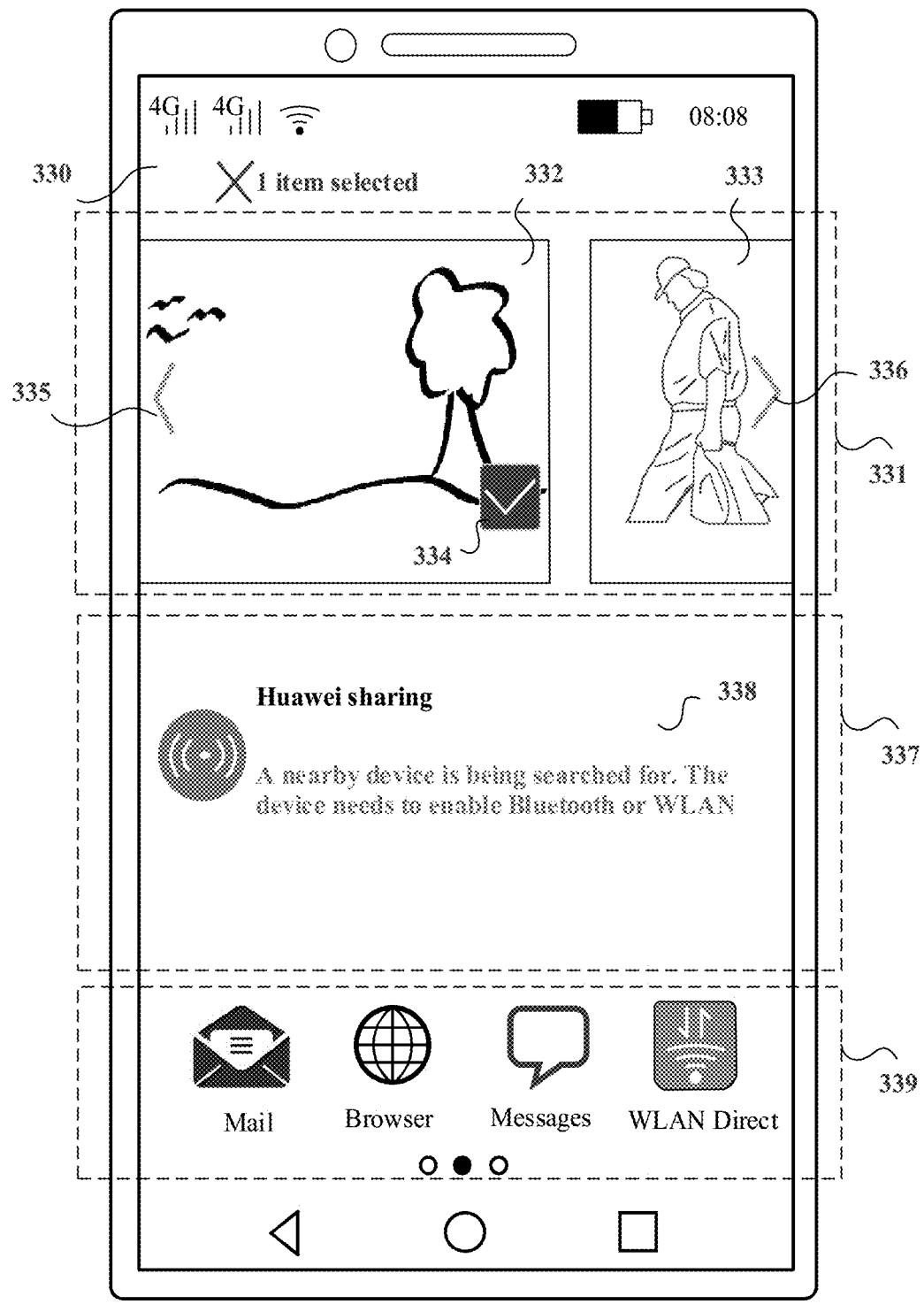

As shown in FIG. 3C, the file sharing interface 330 includes an area 331, an area 337, and an area 339.

The area 331 may be used to display one or more pictures or videos in the gallery, and the one or more pictures or videos may include a picture or a video selected by the user, for example, a selected picture 332. A mark 334 may be displayed on the selected picture 332, and the mark 334 may be used to indicate that the picture 332 corresponding to the mark 334 is selected by the terminal (that is, the picture is selected by the user). A control element 335 and a control element 336 may be further displayed in the area 331. The two control elements (the control element 335 and the control element 336) may be used to switch or update a picture displayed in the area 331. A picture or a video image displayed in the area 331 may be a thumbnail. An original image corresponding to the picture or the video image displayed in the area 331 may be stored on the terminal.

The area 337 may be used to display an option of a nearby device discovered by the terminal, and one or more user options. The user options correspond to the nearby device discovered by the terminal. When the terminal searches for a nearby device, the terminal may display a search prompt 338 (for example, a text prompt such as "A nearby device is being searched for. The device needs to enable BLUETOOTH or WLAN") in the area 337.

One or more service options (for example, an email icon, a browser icon, an information icon, and a WLAN direct connection icon) may be displayed in the area 339. An application or a protocol corresponding to the service option may support sharing, to a contact or a server, a picture selected by the user. The user may share data by using the application or the protocol corresponding to the service option. For example, the selected picture is shared to one or more contacts in WECHAT. For another example, the selected picture is shared to a dynamic publishing platform (namely, a server) of FACEBOOK.

4. After the terminal finds a nearby device, the user may tap a nearby device option on the picture sharing interface, to share the selected picture to the nearby device.

Figure 3D:
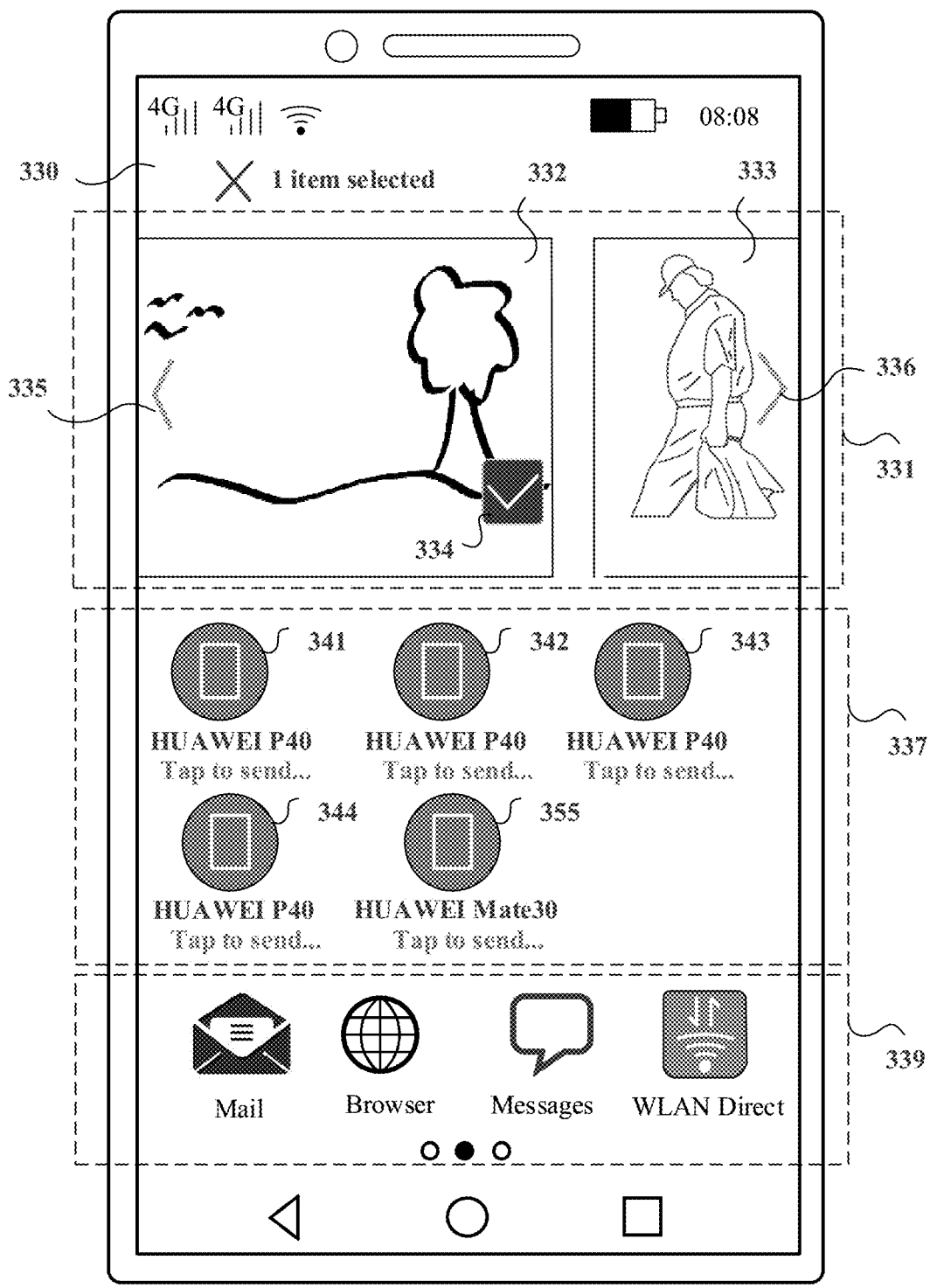

As shown in FIG. 3D, after finding the nearby device, the terminal may display the nearby device option in the area 337, for example, a device option 341 (a device name is "HUAWEI P40"), a device option 342 (a device name is "HUAWEI P40"), a device option 343 (a device name is "HUAWEI P40"), a device option 344 (a device name is "HUAWEI P40"), and a device option 345 (a device name is "HUAWEI Mate30").

The terminal may receive an input operation (for example, tapping) of the user on the device option 341. In response to the input operation, the terminal may establish a communication connection to a device corresponding to the device option 341, and then transmit, by using the communication connection, the selected picture to the device corresponding to the user option.

It can be learned from the foregoing data sharing process in the related technology that, when a user shares a file such as a picture on a terminal with a nearby device, some devices in devices near the terminal are devices of a same model, and the devices generally use a model of the device as a device name by default. Therefore, when the terminal displays the device names of the nearby devices on the data sharing interface (for example, the picture sharing interface 330 shown in FIG. 3D), the device names of these devices may be duplicate. For example, on the picture sharing interface 330 shown in FIG. 3D, device names of the device option 341, the device option 342, the device option 343, and the device option 344 are all "HUAWEI P40". Therefore, the user cannot determine, on the data sharing interface of the terminal, which device option is desired by the user, thereby reducing data sharing efficiency of the terminal and undermining user experience.

Figure 3E:
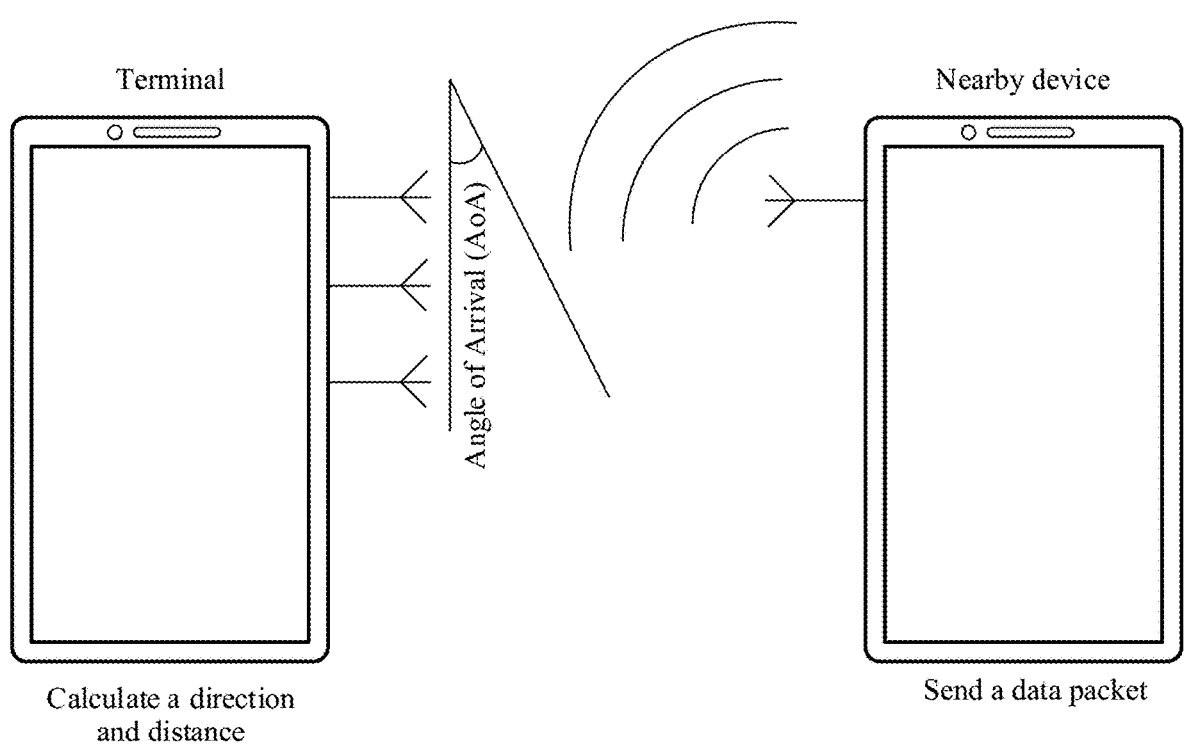
FIG. 3E is a schematic diagram of an angle of arrival (AoA) positioning method according to other approaches.

In another related technology, as shown in FIG. 3E, a BLUETOOTH protocol 5.1 provides an AoA measurement technology. A terminal may receive, by using three antennas, a data packet sent by a nearby device by using BLUETOOTH, and then calculate, based on a signal phase difference of the data packet received by using the three antennas, an AoA of the data packet sent by the nearby device. The terminal may further calculate a distance between the nearby device and the terminal based on signal strength of the received BLUETOOTH data packet sent by the nearby device. However, the BLUETOOTH protocol 5.1 needs to be supported by a hardware protocol, is not applicable to another BLUETOOTH protocol of an earlier release, and cannot be used for an old device.

Therefore, this disclosure provides a device positioning method. Before a user selects a nearby device that needs to be connected, the terminal 100 may prompt the user to move the terminal leftwards and rightwards. Then, in a moving process, the terminal 100 may send a BLUETOOTH positioning signal to the nearby device separately at two or more positions by using BLUETOOTH, and receive a distance value calculated by the nearby device based on a signal strength value of the received BLUETOOTH positioning signal. Then, the terminal 100 determines a position of the nearby device relative to the terminal 100 based on information of the two or more positions and information about a distance between the terminal 100 and the nearby device, and outputs the position of the nearby device to the user. In this way, when sharing a file, the user can accurately select a receiving device that needs to be connected for sharing, thereby providing convenience for the user.

With reference to an application scenario, the following describes a device positioning method provided in this disclosure.

First, an architectural diagram of a system in an application scenario is described.

Figure 4:
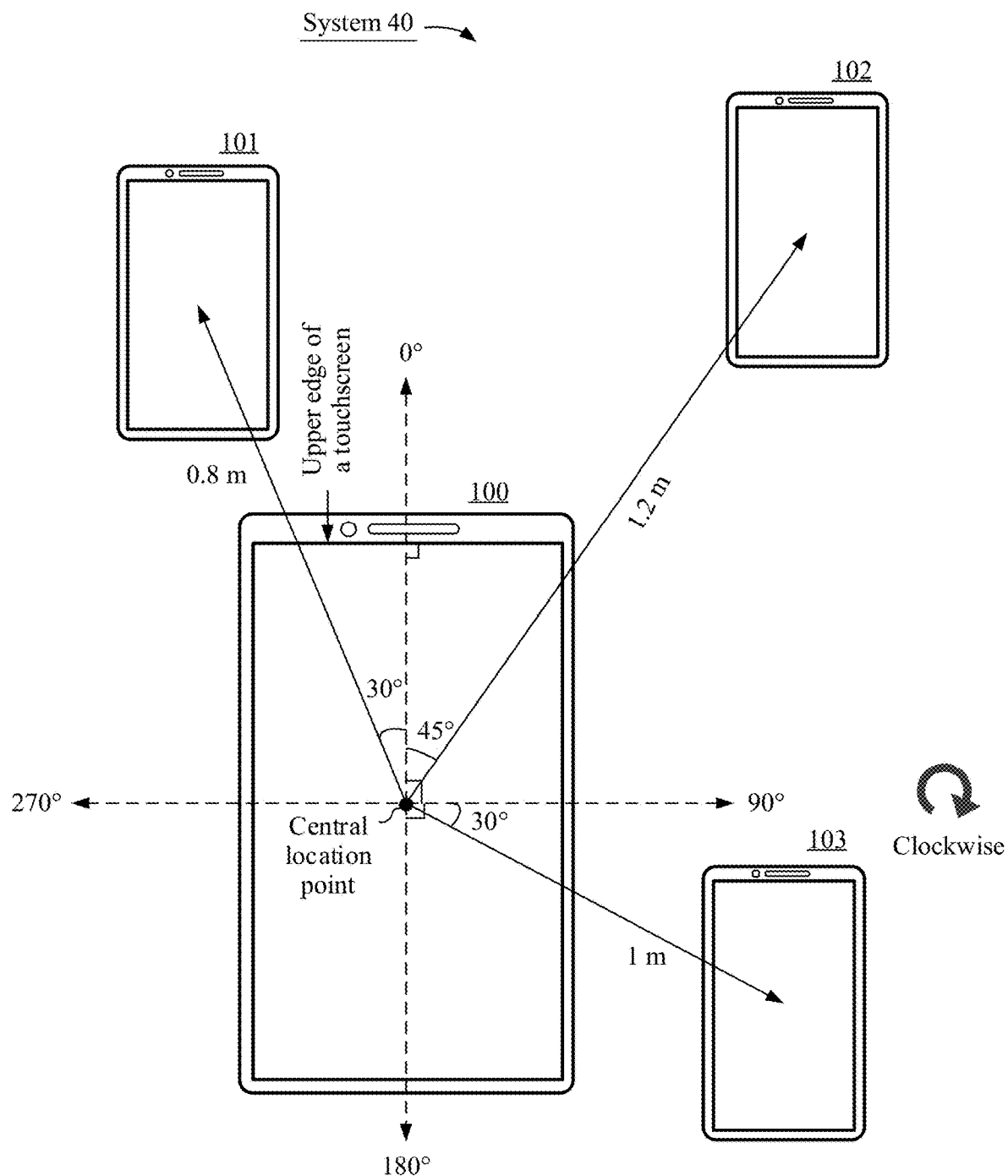
FIG. 4 is a schematic diagram of orientation of a system according to an embodiment of this disclosure.

FIG. 4 is a schematic diagram of a system architecture according to an embodiment of this disclosure. As shown in FIG. 4, a system 40 includes a terminal 100 and nearby devices. The nearby devices include a terminal 101, a terminal 102, a terminal 103, and the like. FIG. 4 shows an example of position relationships between the terminal 100, the terminal 101, the terminal 102, and the terminal 103 on a horizontal plane in some application scenarios of this disclosure.

In subsequent embodiments of this disclosure, to facilitate description of a position relationship between the terminal 100 and a nearby device, a reference point (for example, a central location point) on the device may be used to represent a location of the terminal 100 in a planar diagram. For example, a central location point of the terminal 100 may be used to represent a location of the terminal 100 on a horizontal plane. In this embodiment of this disclosure, a direction indicated by a vector whose start point is the central location point of the terminal 100 and that is perpendicular to an upper edge of a touchscreen of the terminal 100 may be used as a reference direction of the terminal 100, and may also be referred to as a due front direction (0° direction) of the terminal 100. A clockwise 90° direction of the terminal 100 may be referred to as a due right direction of the terminal 100, a 180° direction of the terminal 100 may be referred to as a due backward direction of the terminal 100, and a 270° direction of the terminal 100 may be referred to as a due left direction of the terminal 100.

Therefore, as shown in FIG. 4, the terminal 101 may be 0.8 meters (m) away from the terminal 100 in a direction of clockwise 330° (that is, 30° left of the front) of the terminal 100, and the terminal 102 may be 1.2 m away from the terminal 100 in a direction of clockwise 45° (that is, 45° right of the front) of the terminal 100. The terminal 103 may be 1 m away from the terminal 100 in a direction of clockwise 120° (that is, 60° right of the rear) of the terminal 100.

In this embodiment of this disclosure, there may be more or fewer devices near the terminal 100, and the devices near the terminal 100 are not limited to the three devices in FIG. 4. In FIG. 4, the three devices near the terminal 100 are merely used as an example to explain this disclosure, and should not constitute a limitation. FIG. 4 shows an example of a relative position relationship between the terminal 100 and the three nearby devices (the terminal 101, the terminal 102, and the terminal 103). This is merely used as an example to describe this embodiment of this disclosure, and should not be construed as a limitation.

The terminal 100, the terminal 101, the terminal 102, and the terminal 103 in FIG. 4 may be terminals such as a smartphone and a tablet computer. For a schematic structural diagram of the terminal 100, refer to the embodiment shown in FIG. 1. For structures of the terminal 101, the terminal 102, and the terminal 103, refer to the terminal 100. Details are not described herein again.

In some application scenarios, after triggering the terminal 100 to open a sharing interface of a file such as a picture, a video, or a document, a user may shake (for example, shake leftwards and rightwards) the terminal 100, so that the terminal 100 can position a nearby device by using BLUETOOTH, and display position information of the nearby device on the sharing interface. In this way, the user can accurately select, from a plurality of device options, a device with which data is to be shared.

Figure 5A:
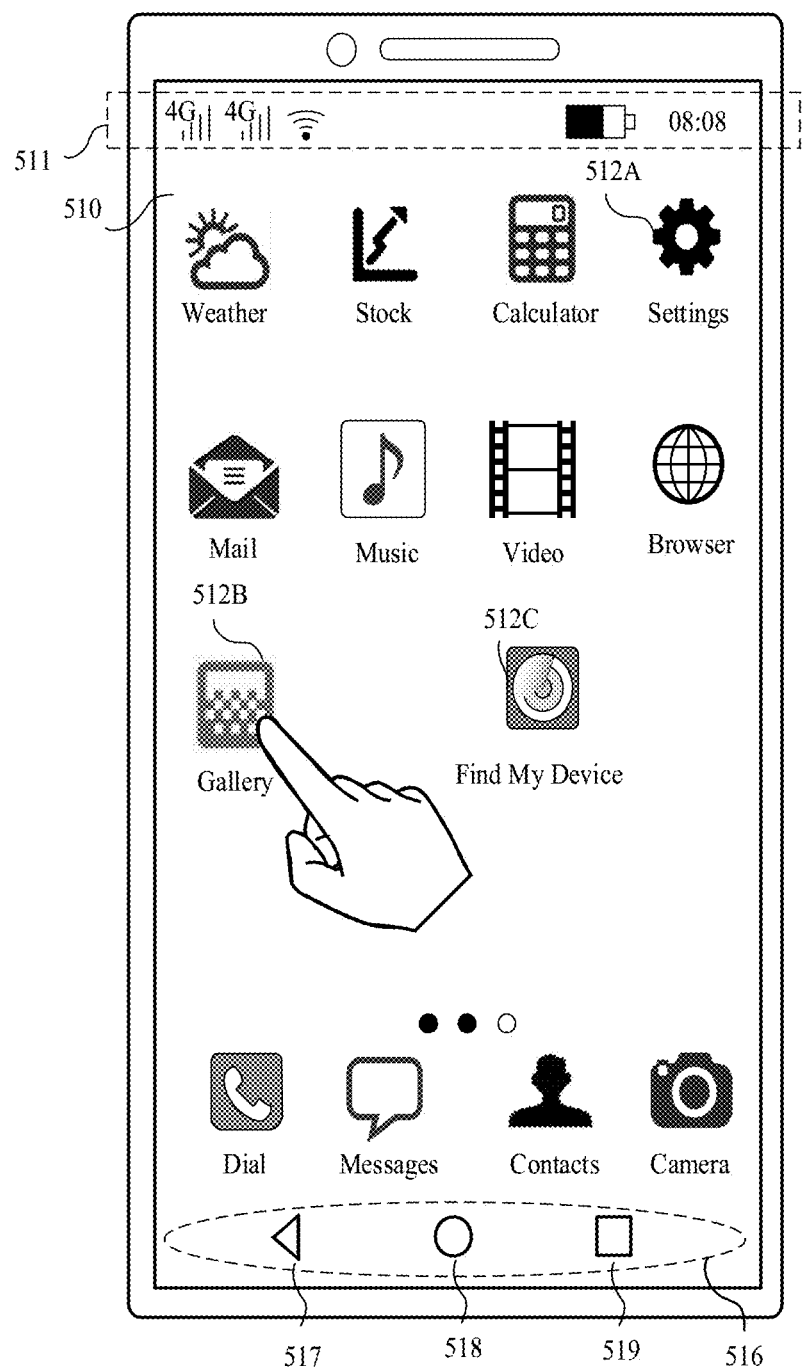
FIG. 5A to FIG. 5P are schematic diagrams of a group of interfaces according to an embodiment of this disclosure.
Figure 5B:
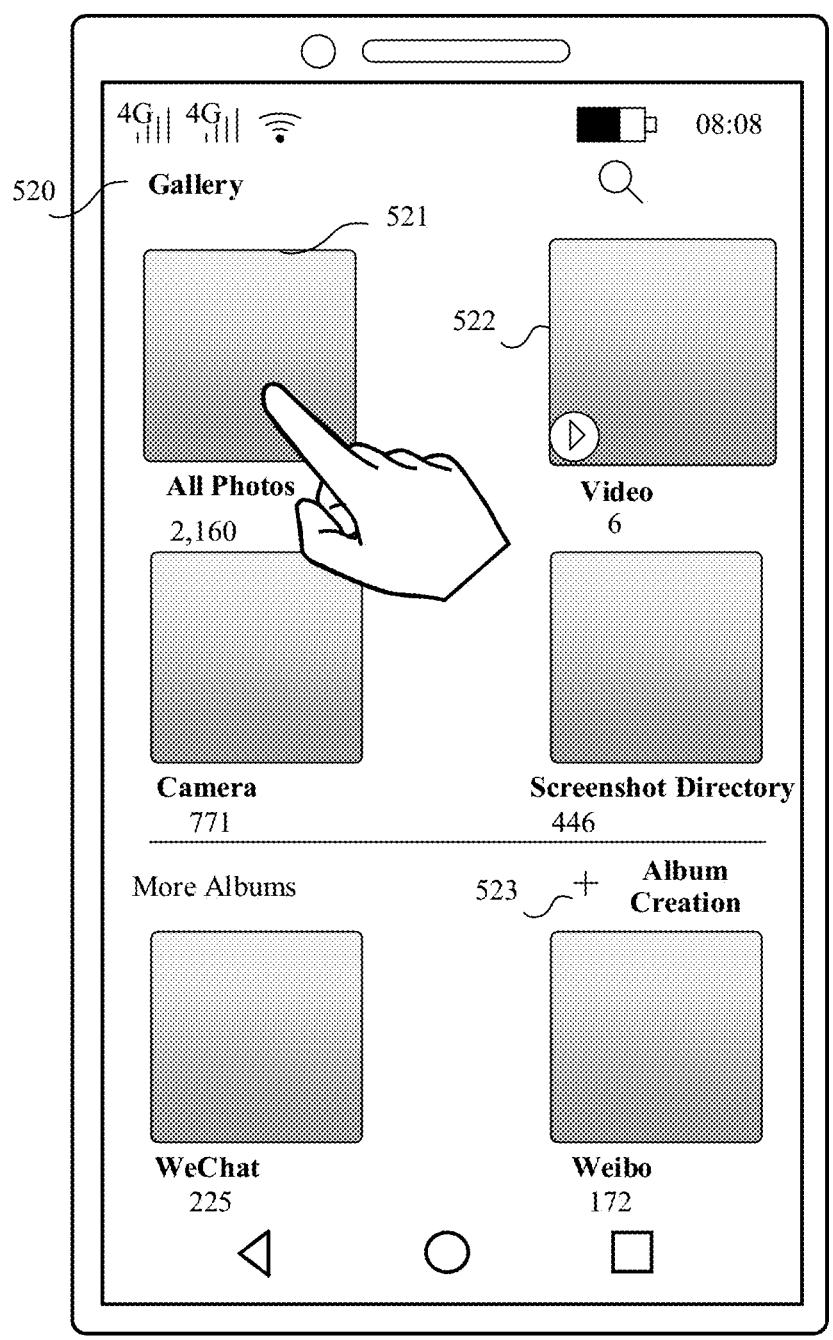
Figure 5C:
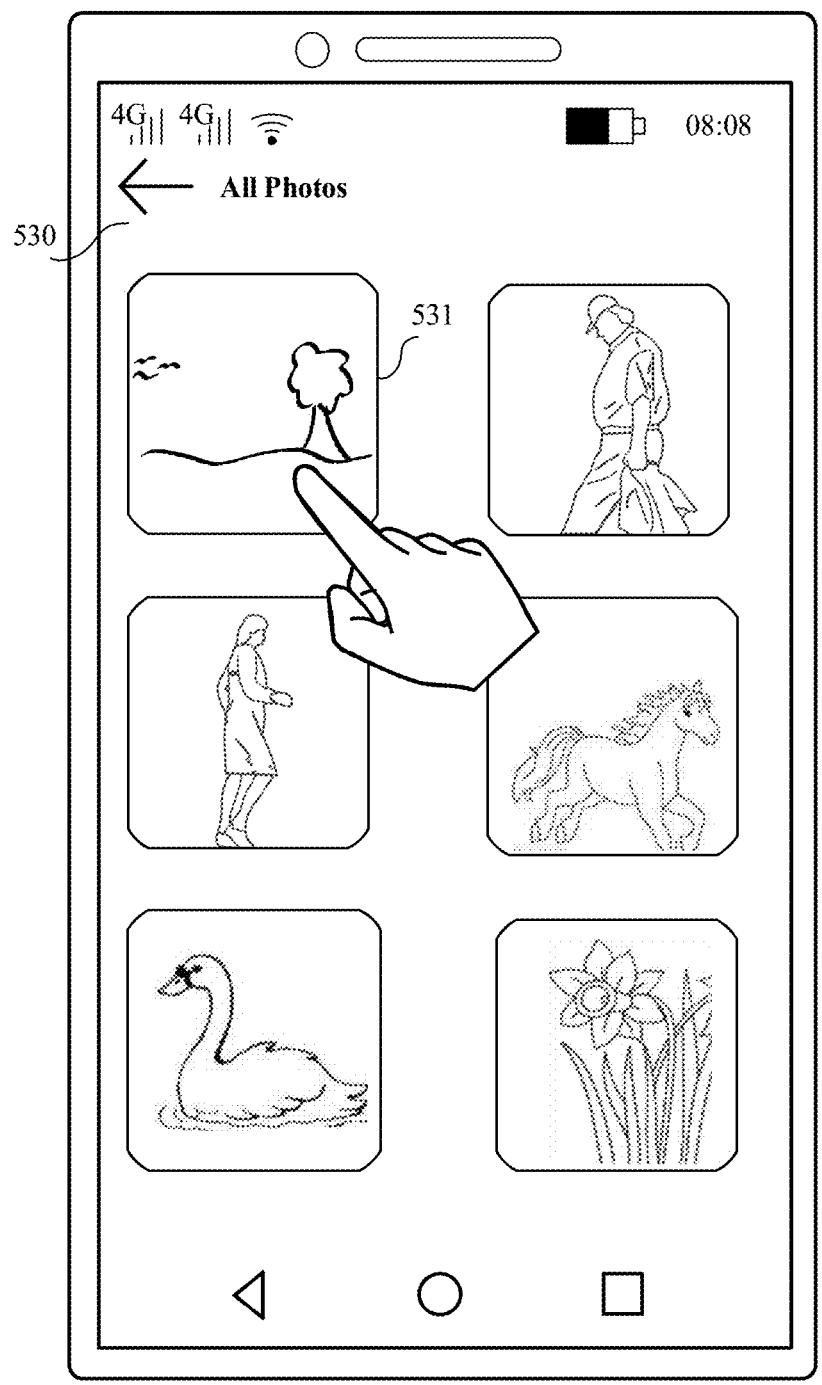
Figure 5D:
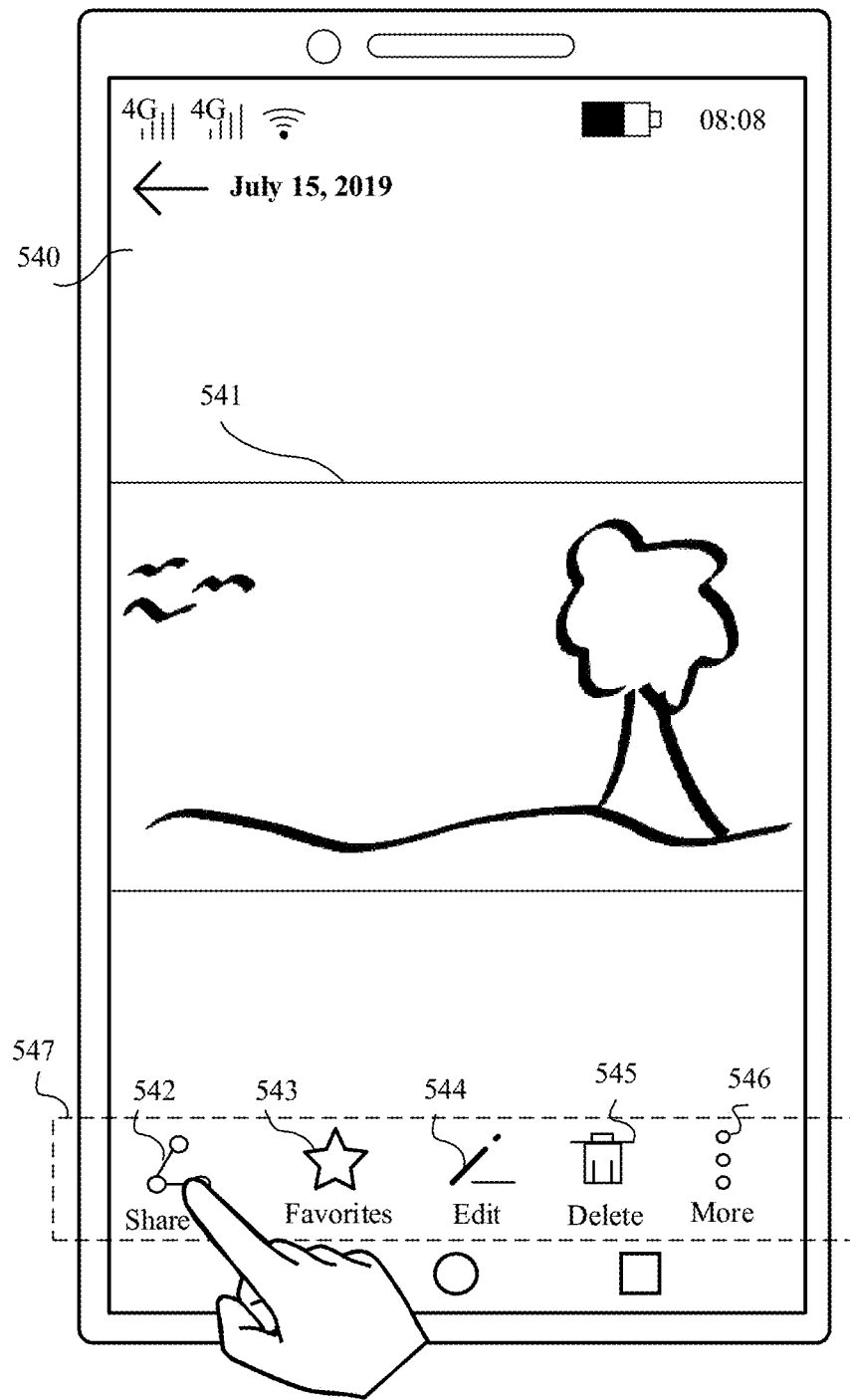
Figure 5E:
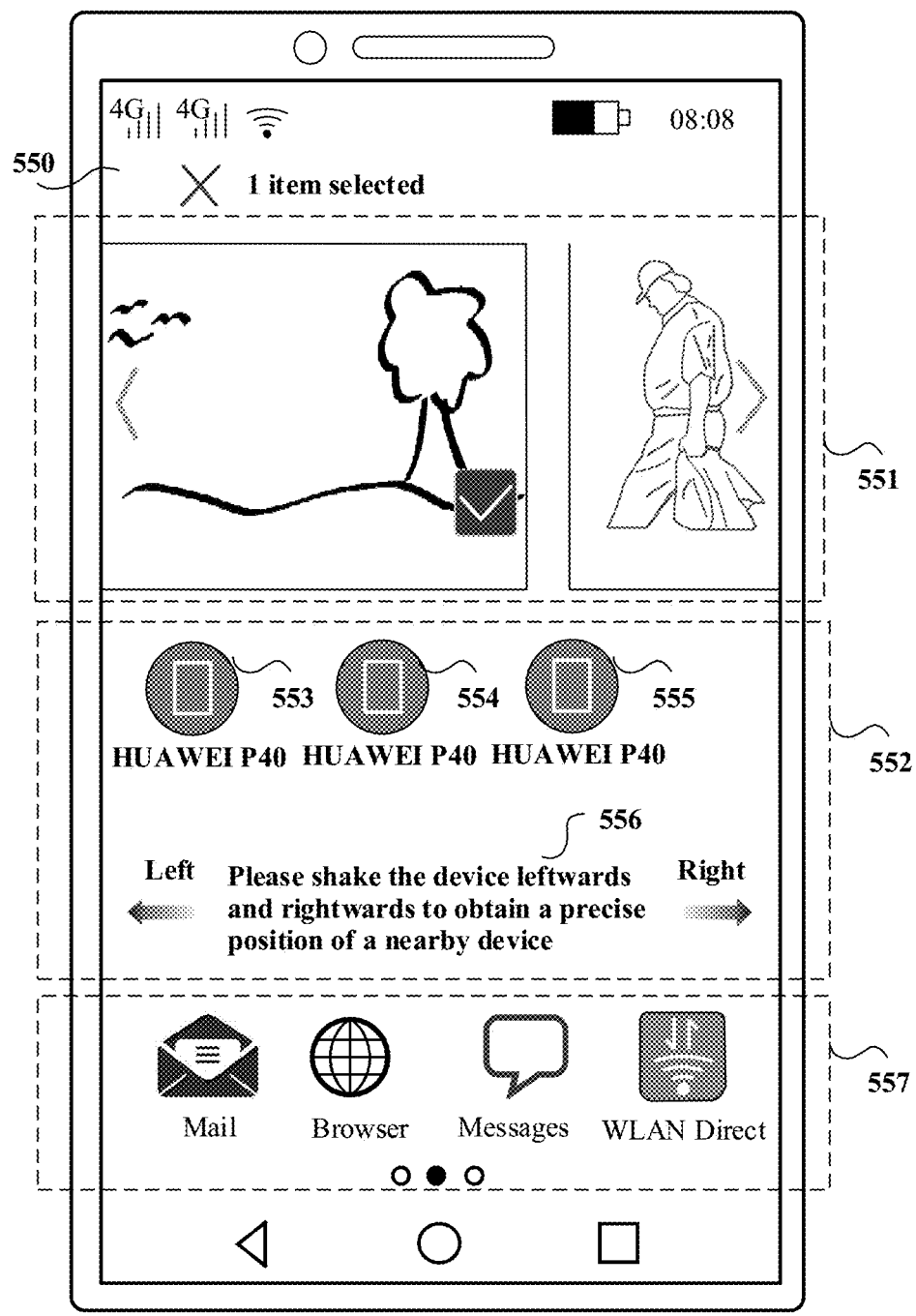
Figure 5F:
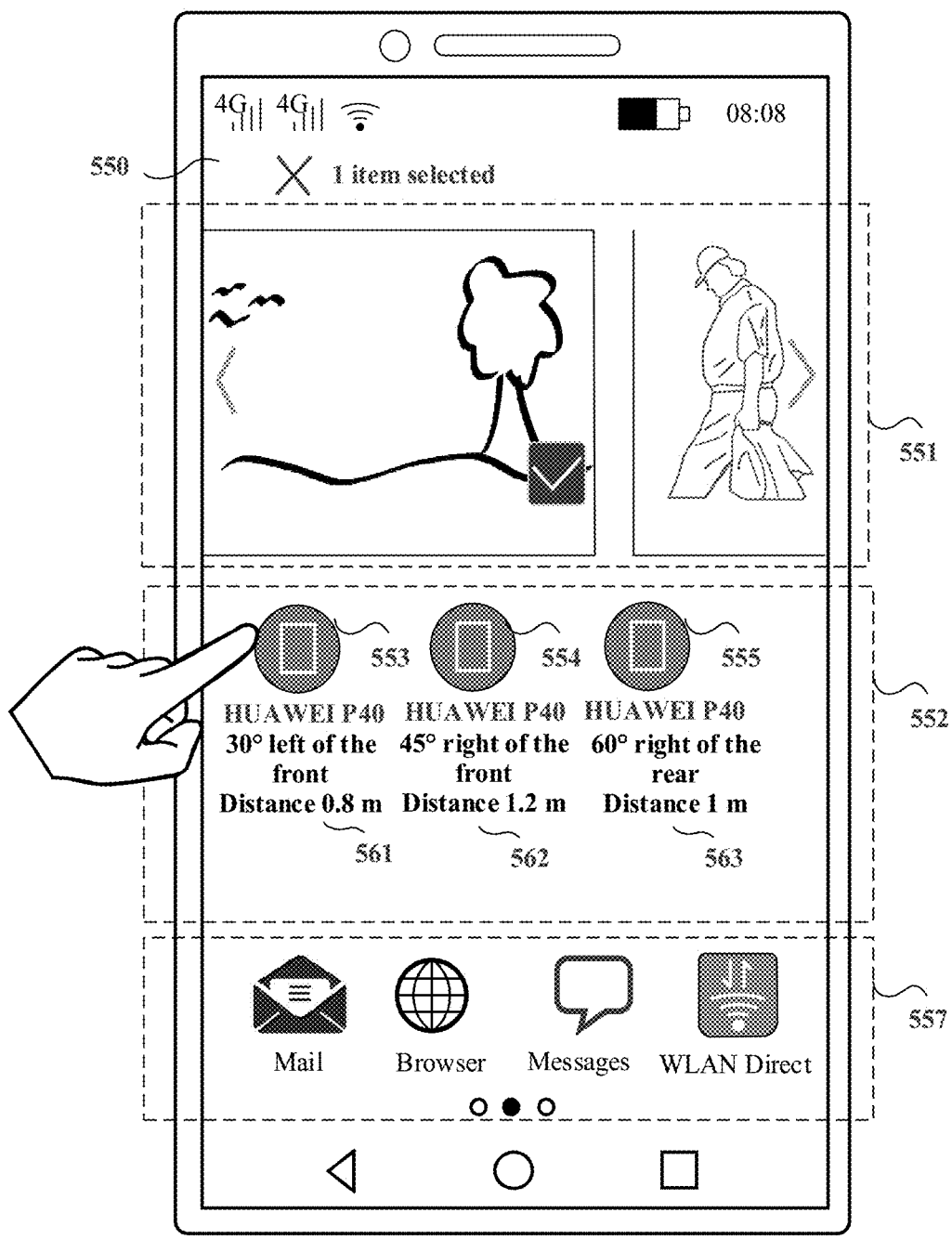
Figure 5G:
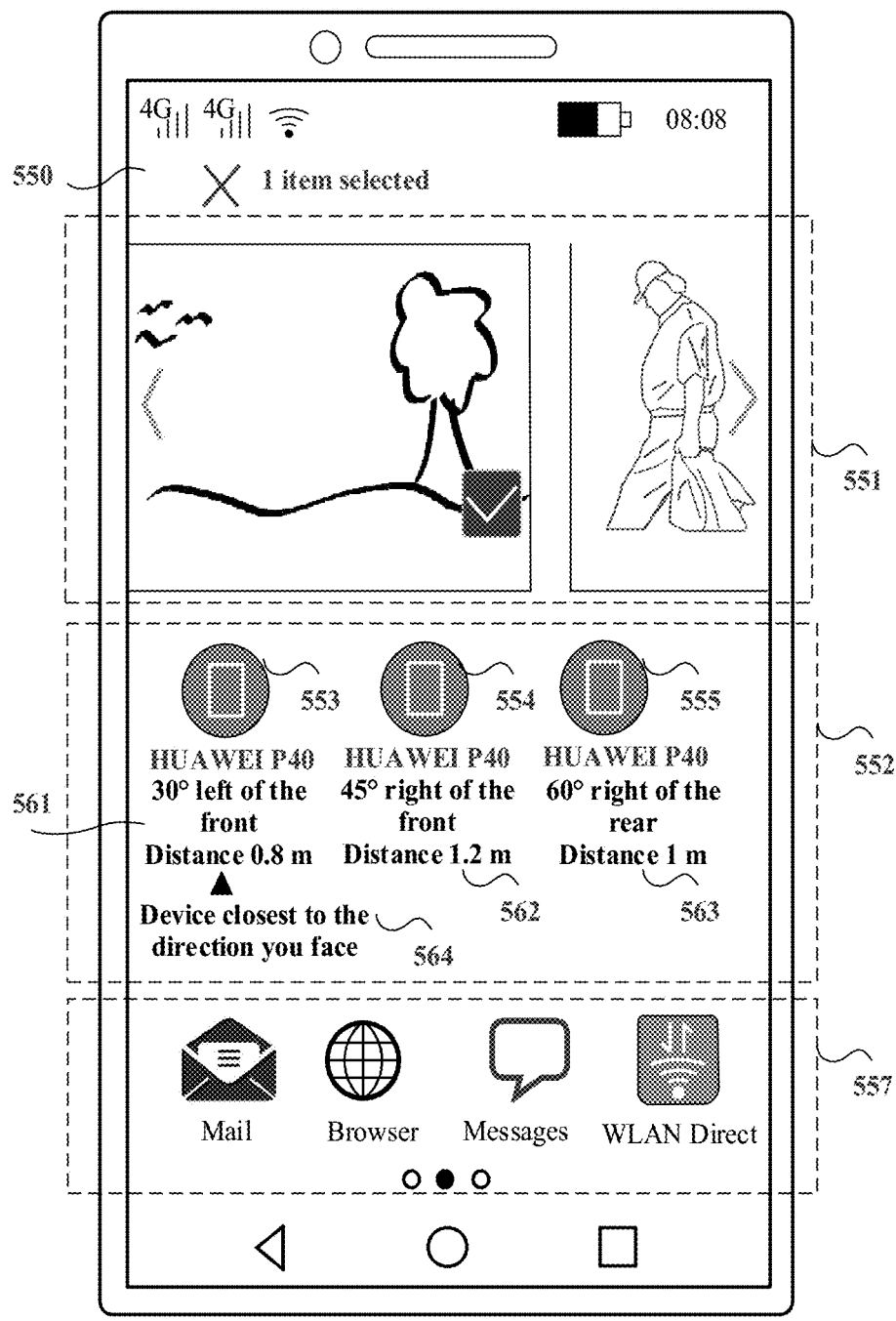
Figure 5H:
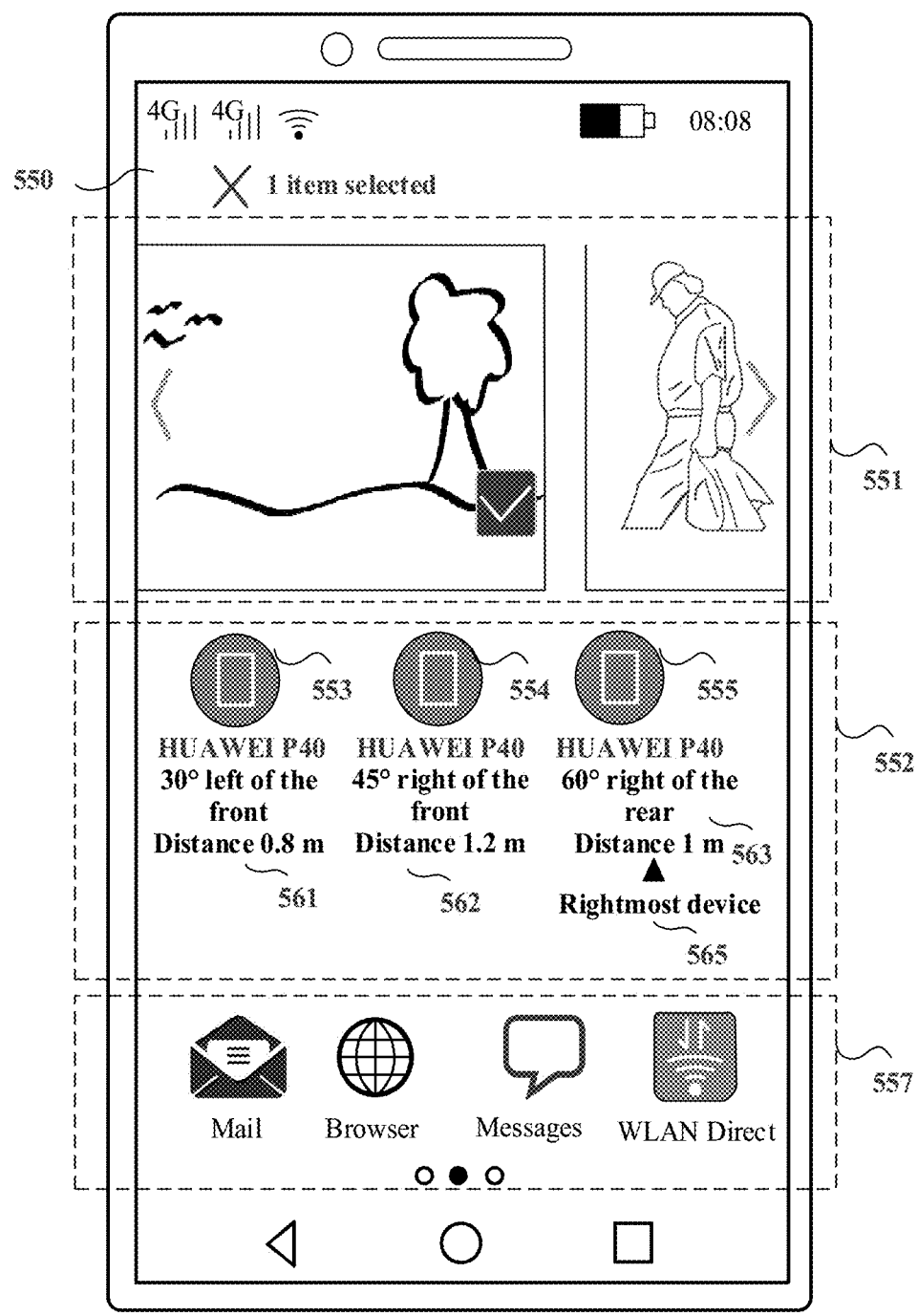
Figure 5I:
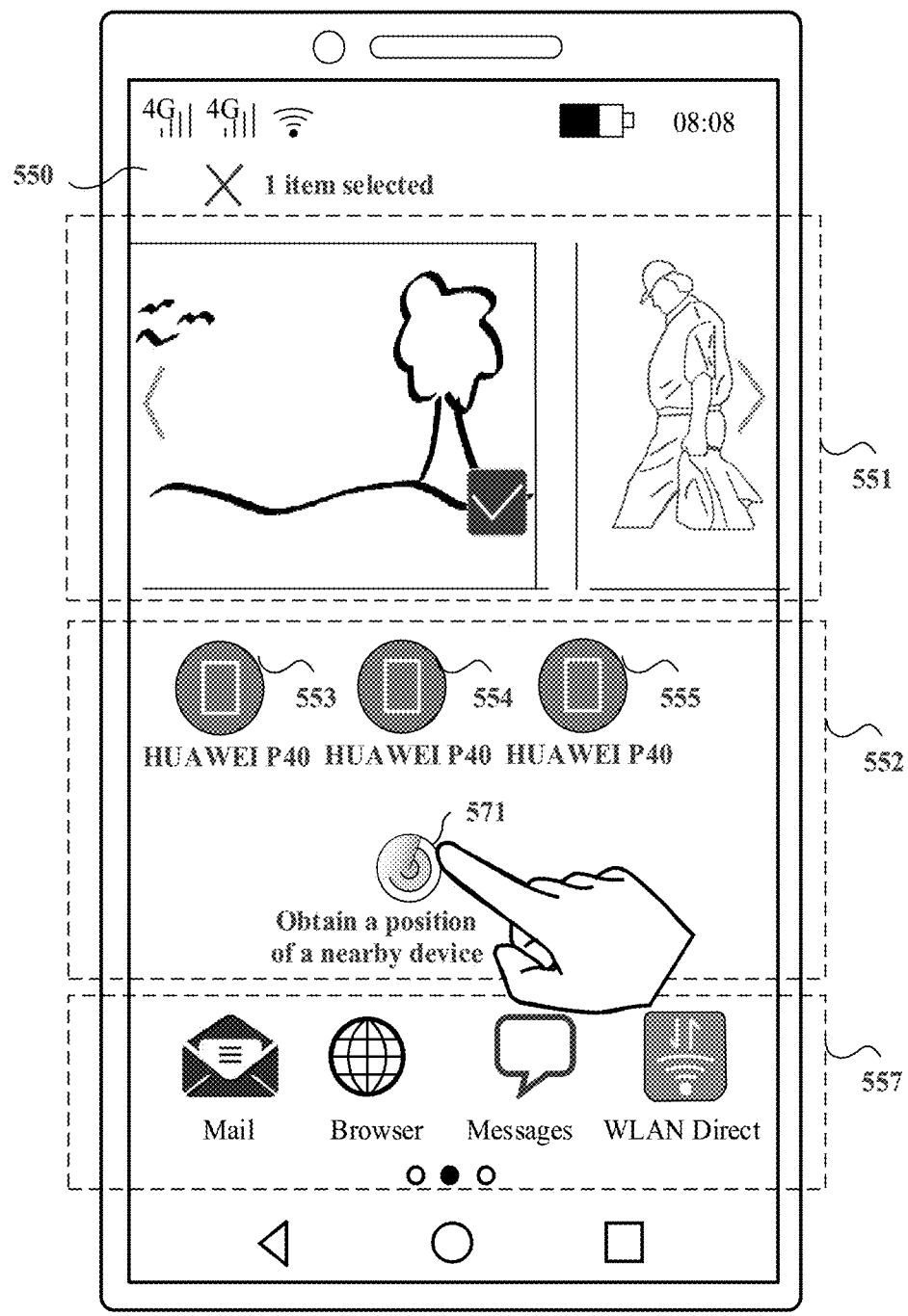
Figure 5J:
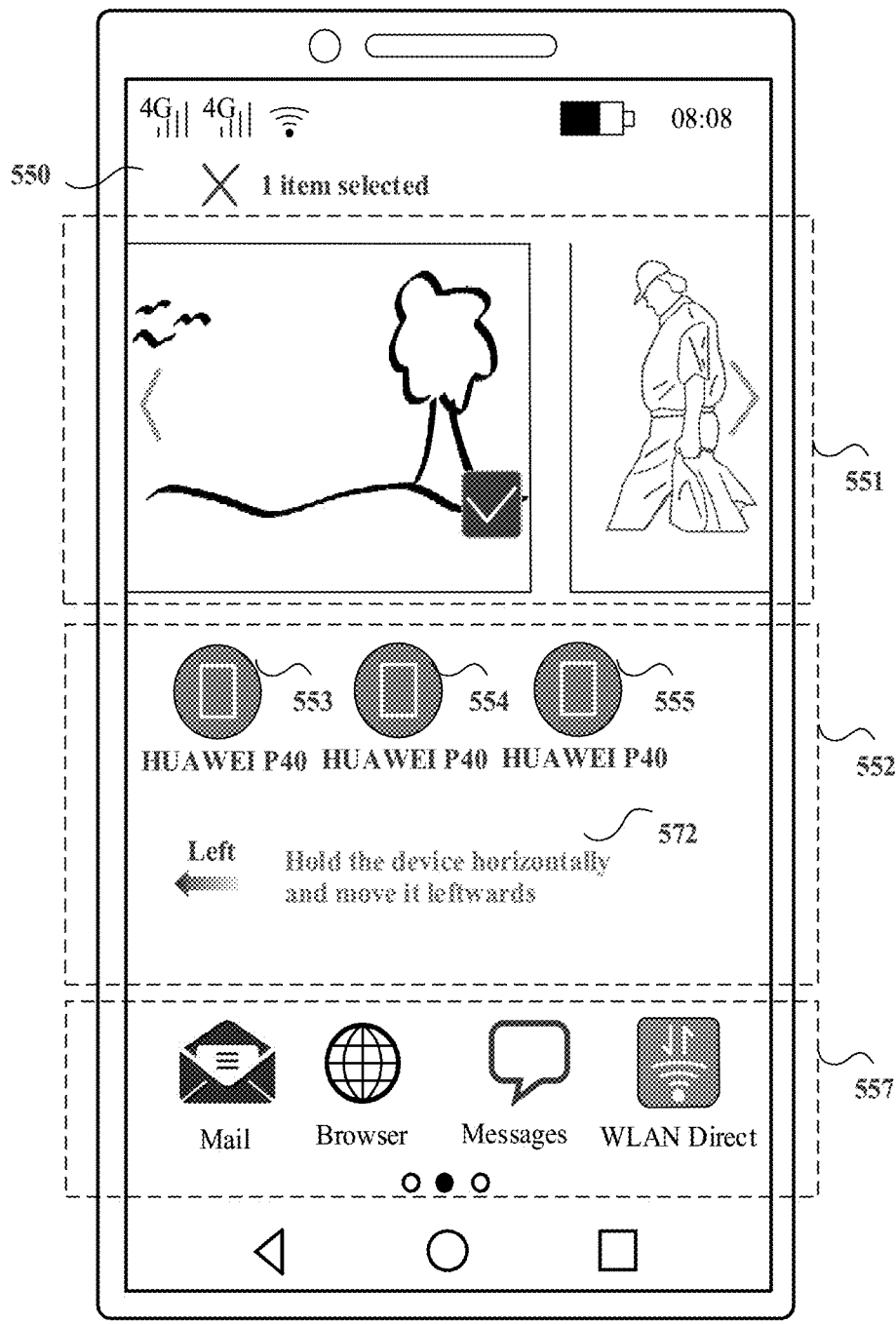
Figure 5K:
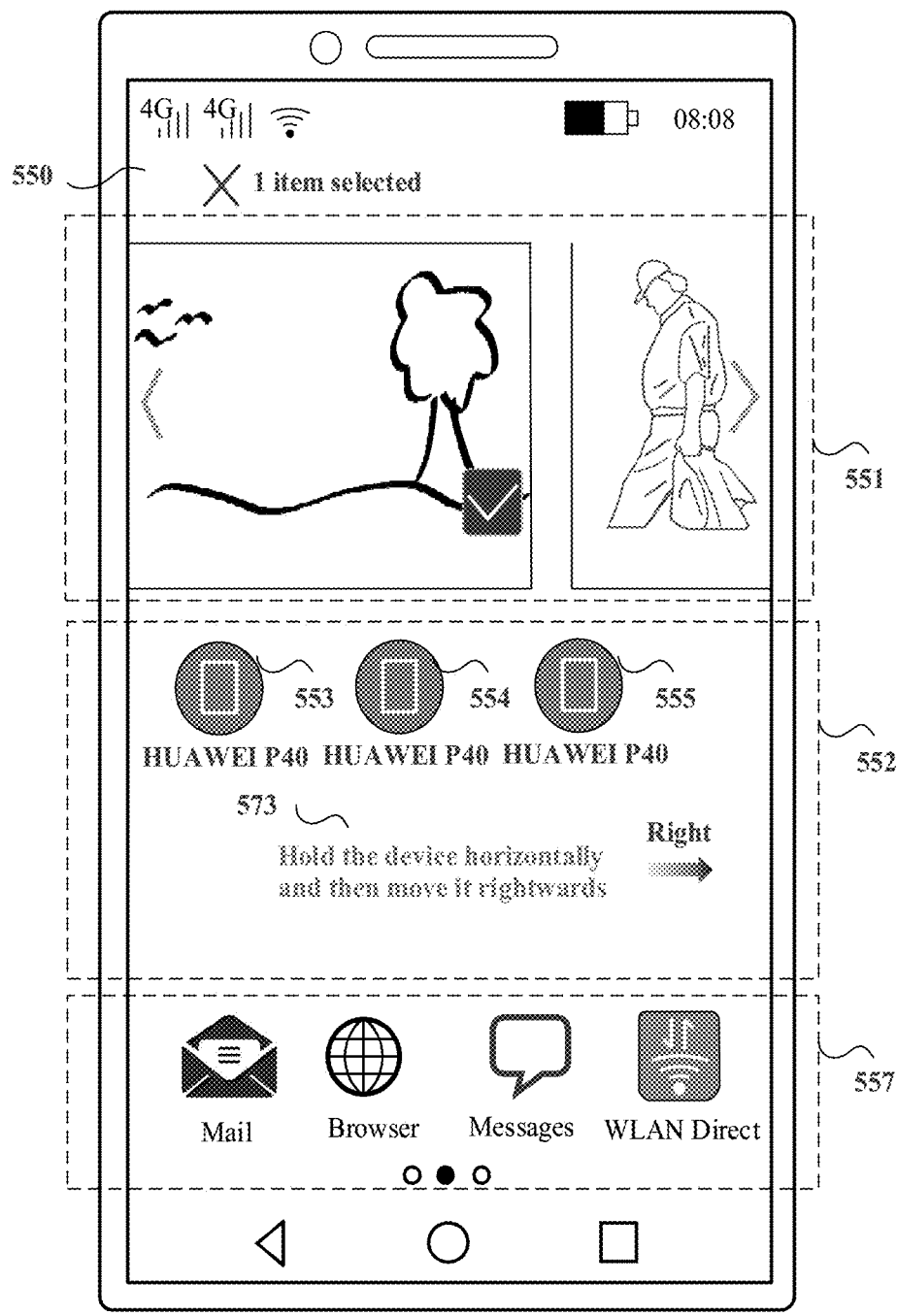
Figure 5L:
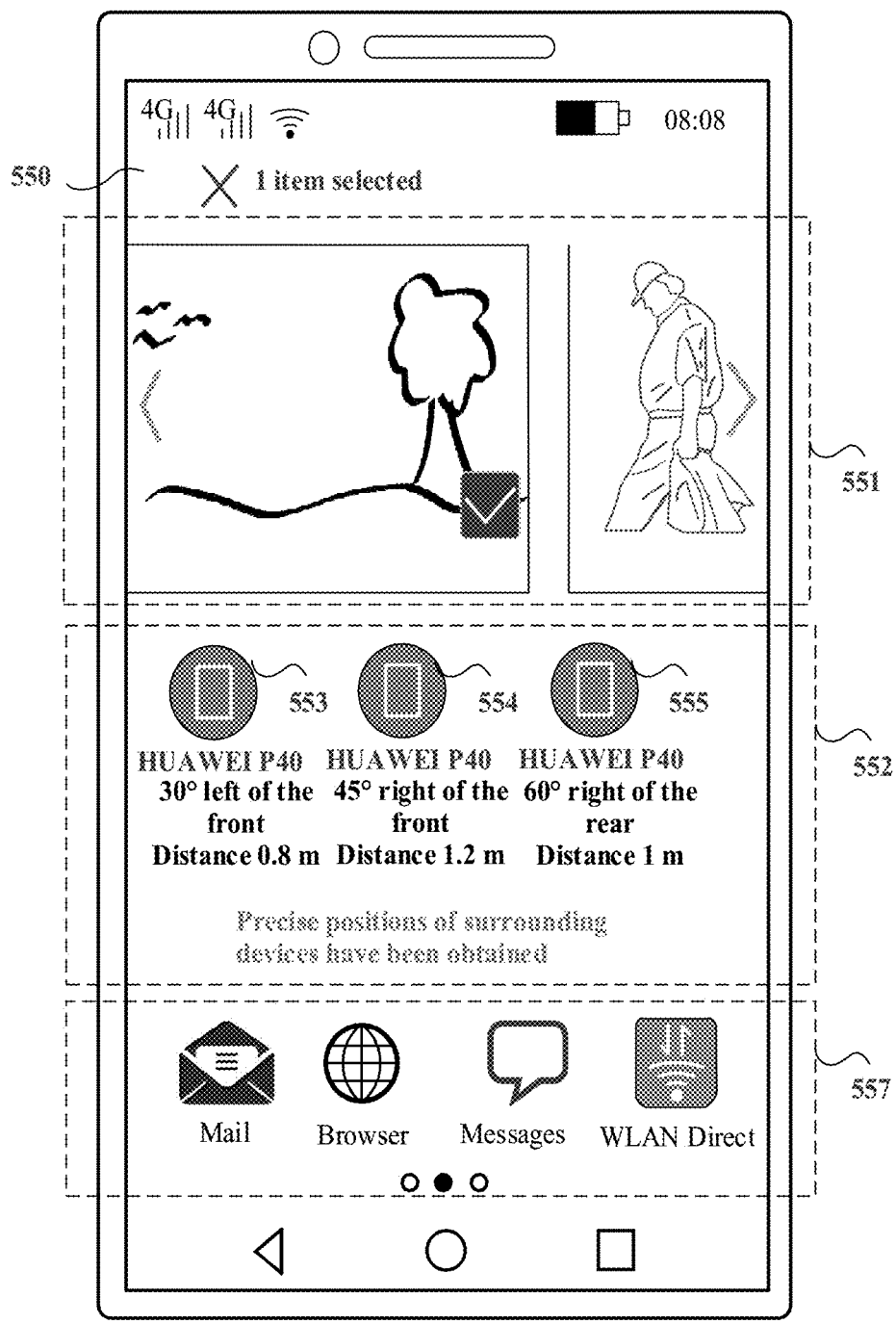
Figure 5M:
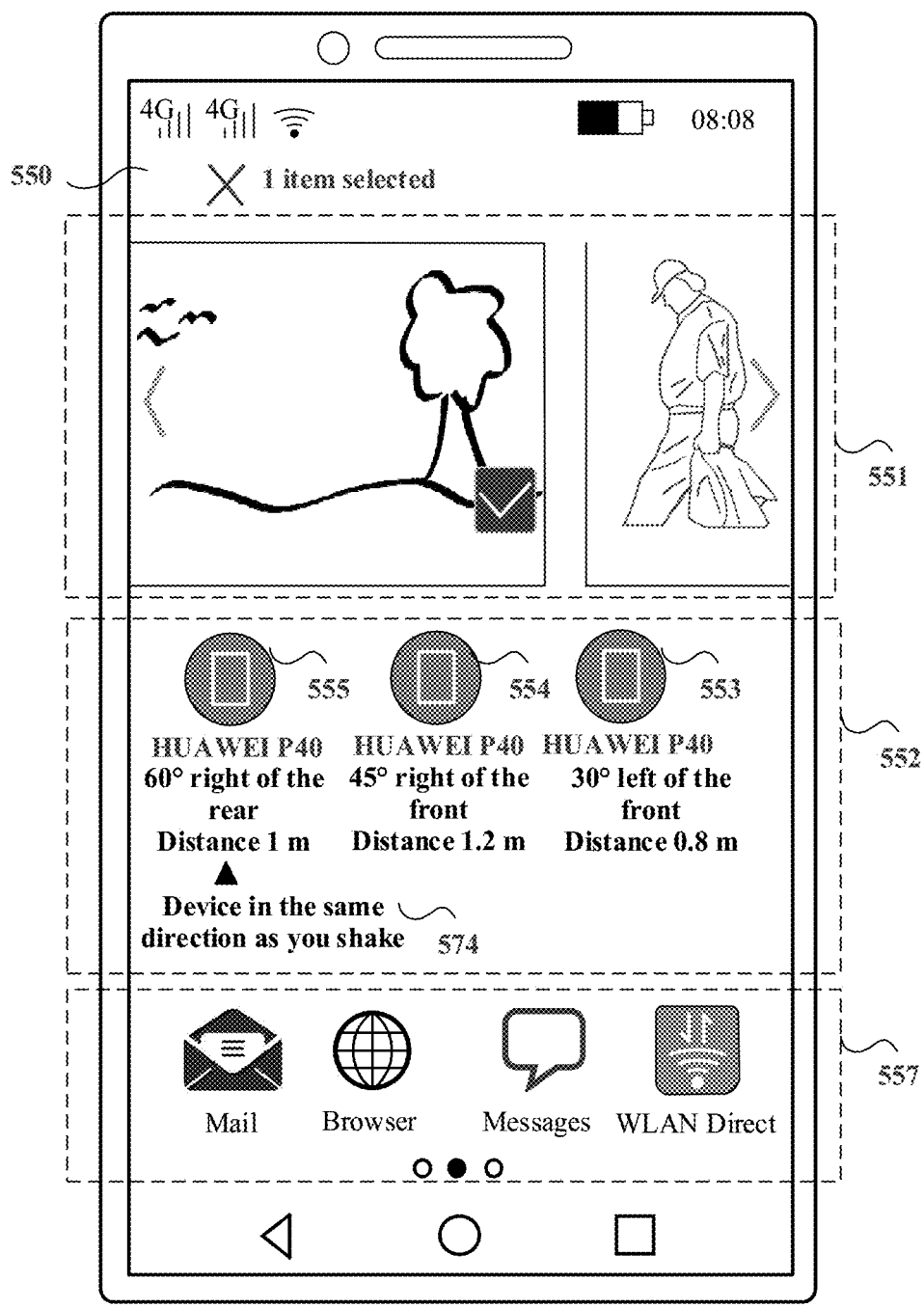
Figure 5N:
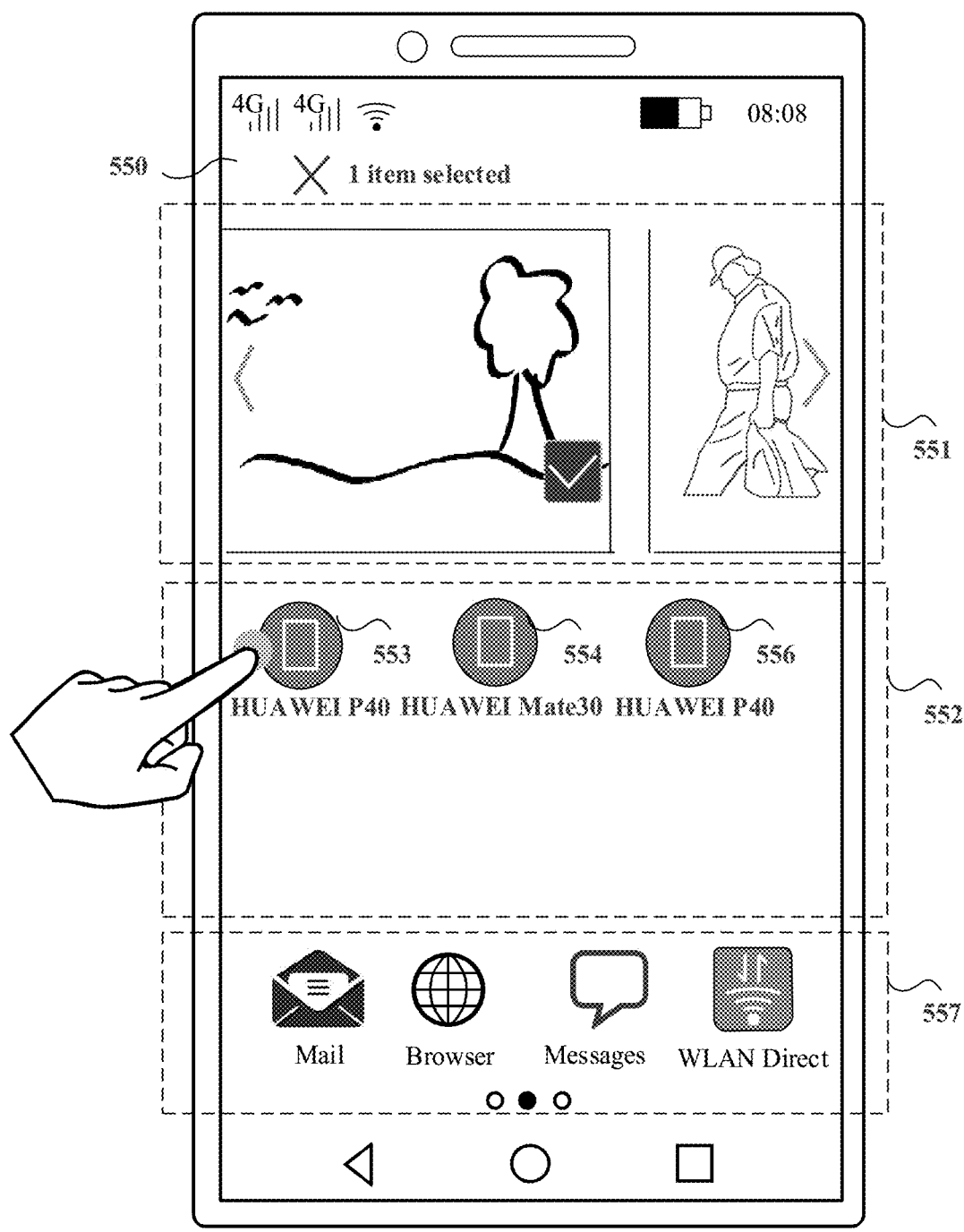
Figure 5O:
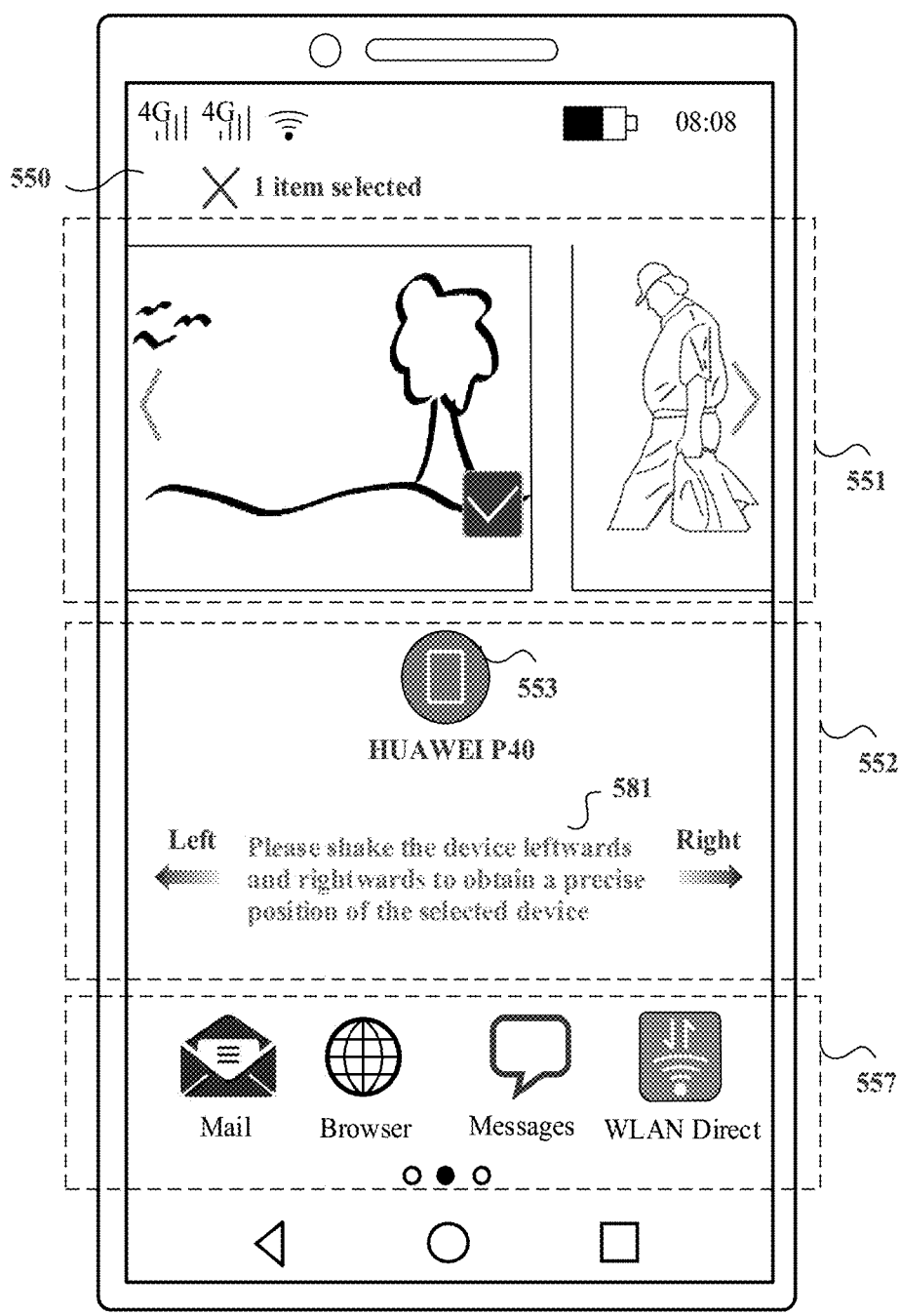
Figure 5P:
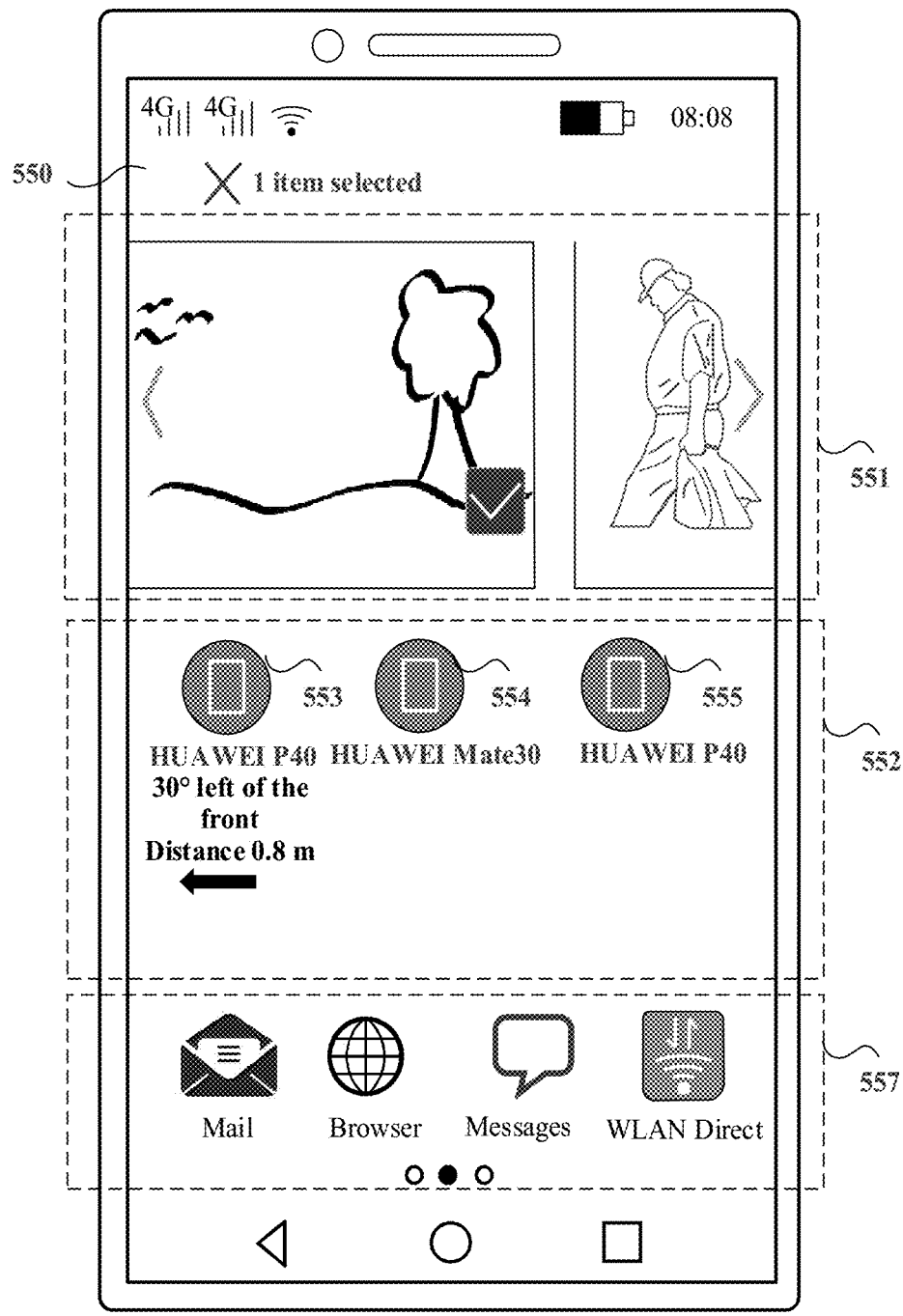

In the UI embodiment shown in FIG. 5A to FIG. 5P as an example, after a user triggers picture sharing, the terminal 100 may display, on a picture sharing interface, a device option corresponding to a nearby device, and the terminal 100 may indicate the user to move the terminal 100 leftwards and rightwards, so that the terminal 100 displays position information of the nearby device relative to the terminal 100 on the picture sharing interface.

For example, as shown in FIG. 5A, the terminal 100 displays an interface 510 of a home screen, and the interface 510 displays a page on which application icons are placed. The page includes a plurality of application icons (for example, a weather application icon, a stock application icon, a calculator application icon, a settings application icon 512A, an email application icon, a music application icon, a video application icon, a browser application icon, a gallery application icon 512B, and a Find My Device application icon 512C). A page indicator is further displayed below the plurality of application icons, to indicate a position relationship between the currently displayed page and another page. There is a plurality of tray icons (for example, a Dial application icon, a Messages application icon, a Contact application icon, and a Camera application icon) below the page indicator, and the tray icons remain displayed during page switching. In some embodiments, the page may alternatively include a plurality of application icons and a page indicator. The page indicator may not be a part of the page, and may exist independently. The application icons are also optional. This is not limited in this embodiment of this disclosure. A status bar 511 is displayed on an upper part of the interface 510. The status bar 511 may include one or more signal strength indicators of a mobile communication signal (which may also be referred to as a cellular signal), a battery status indicator, a time indicator, and the like. When the terminal enables a BLUETOOTH function, the status bar 511 may further display a BLUETOOTH enabling indicator. A navigation bar 516 is displayed below the tray icons. The navigation bar 516 may include system navigation buttons such as a Return button 517, a home screen button 518, and an outbound task history button 519. When detecting that the user taps the Return button 517, the terminal 100 may display a previous page of the current page. When detecting that the user taps the home screen button 518, the terminal 100 may display the home screen. When detecting that the user taps the outbound task history button 519, the terminal 100 may display a task recently opened by the user. The navigation buttons may alternatively be named in another manner. This is not limited in this disclosure. Not limited to a virtual button, each navigation button in the navigation bar 516 may also be implemented as a physical button. In some embodiments, the navigation bar 516 is also optional, and the user may complete a function of each navigation button in the navigation bar 516 by using another operation.

The terminal 100 may receive an operation (for example, tapping) performed by the user on the gallery application icon 512B. In response to the operation, the terminal 100 may display a gallery application interface 520 shown in FIG. 5B.

As shown in FIG. 5B, the gallery application interface 520 includes one or more album options (for example, an All Photos album 521, a video album 522, a camera album, a screenshot directory album, a WeChat album, a microblog album, and the like). Under each album option, there is a name of the album and a quantity of photos and/or videos in the album. For example, the All Photos album 521 includes 2160 photos, and the video album 522 includes six videos.

The gallery application interface 520 further includes an album creation control element 523. The album creation control element 523 may be configured to trigger creation of a new album on the gallery application interface 520.

The terminal 100 may receive an operation (for example, tapping) performed by the user on the All Photos album 521. In response to the operation, the terminal 100 may display an album interface 530 shown in FIG. 5C.

As shown in FIG. 5C, a title of the album interface 530 may be "All Photos". The album interface 530 includes thumbnails (for example, a thumbnail 531) of one or more pictures.

The terminal 100 may receive an operation (for example, tapping) performed by the user on the thumbnail 531. In response to the operation, the terminal 100 may display a picture display interface 540 shown in FIG. 5D.

As shown in FIG. 5D, a title of the picture display interface 540 may be "Jul. 15, 2019". The picture display interface 540 displays a picture 541 and a menu 547. The menu 547 includes a Share button 542, a Favorites button 543, an Edit button 544, a Delete button 545, and a More button 546. The Share button 542 may be used to trigger opening of a file sharing interface (refer to the file sharing interface 330 in FIG. 3C). The Favorites button 543 may be used to trigger adding the picture 541 to a Favorites picture folder. The Edit button 544 may be configured to trigger an editing function such as rotation, pruning, filter adding, and blurring of the picture 541. The Delete button 545 may be configured to trigger deletion of the picture 541. The More button 546 may be used to trigger enabling of more functions related to the picture 541.

In some embodiments, the menu 547 is optional. The menu 547 may be hidden on the picture display interface 540. For example, the user taps the picture 541 to hide the menu 547, and taps the picture 541 again to display the menu 547. This is not limited in this disclosure.

The terminal 100 may receive an input operation (for example, tapping) performed by the user on the Share button 542. In response to the input operation performed on the Share button 542, the terminal 100 may display a picture sharing interface 550 shown in FIG. 5E.

As shown in FIG. 5E, the picture sharing interface 550 includes an area 551, an area 552, and an area 557.

The area 551 may be used to display one or more pictures or videos in the gallery, and the one or more pictures or videos may include a picture or a video selected by the user. For text descriptions of the area 551, refer to the text description of the area 331 in the embodiment shown in FIG. 3C. Details are not described herein again.

The area 552 may be used to display an option of a nearby device discovered by the terminal 100. For example, after finding the nearby device, the terminal 100 may display a device option 553, a device option 554, and a device option 555 in the area 552. The device option 553 may correspond to the terminal 101 in FIG. 4, the device option 554 may correspond to the terminal 102 in FIG. 4, and the device option 555 may correspond to the terminal 103 in FIG. 4. The device option 553 may display a device name (for example, "HUAWEI P40") of the terminal 101, and the device option 554 may display a device name (for example, "HUAWEI P40") of the terminal 102, and the device option 555 may display a device name (for example, "HUAWEI P40") of the terminal 103. When displaying, in the area 552, the option of the nearby device discovered by the terminal 100, the terminal 100 may display, in the area 552, an operation prompt 556 for positioning the nearby device (for example, a text prompt "Please 'shake' the device leftwards and rightwards to obtain a precise position of the nearby device").

One or more service options (for example, an email icon, a browser icon, an information icon, a WLAN Direct icon, and the like) may be displayed in the area 557. For text descriptions of the area 557, refer to the text description of the area 337 in the embodiment shown in FIG. 3C. Details are not described herein again.

The terminal 100 may receive an operation of shaking the terminal 100 leftwards and rightwards by the user. In response to the operation of shaking the terminal 100 leftwards and rightwards, the terminal 100 may determine a position of a nearby device relative to the terminal 100 by using a BLUETOOTH technology. Subsequent embodiments describe how the terminal 100 determines position information of the nearby device relative to the terminal 100 in a process of moving leftwards and rightwards. Details are not described herein again.

After determining the position of the nearby device relative to the terminal 100, the terminal 100 may display the position information of the nearby device on the picture sharing interface.

As shown in FIG. 5F, the terminal 100 may display, below the device option 553, position information 561 of the terminal 101 relative to the terminal 100 (for example, a text prompt "30° left of the front distance 0.8 m"). The terminal 100 may display, below the device option 554, position information 562 of the terminal 102 relative to the terminal 100 (for example, a text prompt "45° right of the front distance 1.2 m"). The terminal 100 may display, below the device option 555, position information 563 of the terminal 103 relative to the terminal 100 (for example, a text prompt "60° right of the rear distance 1 m"). In this embodiment of this disclosure, a form of the position information of the nearby device relative to the terminal 100 may be not limited to a text, or may be a picture (for example, an arrow with a distance scale pointing to a position of the nearby device), an animation, or the like.

The terminal 100 may receive an input operation (for example, tapping) performed by the user on a device option (for example, the device option 553 corresponding to the terminal 101) corresponding to a nearby device. In response to the input operation, the terminal 100 may send the picture 541 to a nearby device (for example, the terminal 101) selected by the user by using a communications technology such as WI-FI Direct (for example, WI-FI peer-to-peer (P2P)), WI-FI SoftAp, and UWB.

In some embodiments, when the terminal 100 detects that the user moves the terminal 100 leftwards and rightwards (for example, moves leftwards first and then rightwards, or moves rightwards first and then leftwards), the terminal 100 may mark a nearby device (for example, the terminal 101) closest to the due front of the terminal 100 as a preferred device after the terminal 100 determines the position information of the nearby device.

For example, as shown in FIG. 5G, when the terminal 100 detects that the user moves the terminal 100 leftwards and rightwards (for example, moves leftwards first and then rightwards, or moves rightwards first and then leftwards), the terminal 100 may determine that the nearby device closest to the due front of the terminal 100 is the terminal 101. The terminal 100 may display a mark 564 below the device option 553 corresponding to the terminal 101. The mark 564 may be used to prompt that the terminal 101 corresponding to the device option 553 is the nearby device closest to the due front of the terminal 100. The mark 564 may be a text mark (for example, "a device closest to the direction you face"), a picture mark, or the like.

In some embodiments, when the terminal 100 detects that the user moves the terminal 100 merely leftwards (or merely rightwards), the terminal 100 may mark a leftmost (or rightmost) nearby device (for example, the terminal 101) as a preferred device after the terminal 100 determines the position information of the nearby device.

For example, as shown in FIG. 5H, when the terminal 100 detects that the user moves the terminal 100 leftwards and rightwards (for example, moves leftwards first and then rightwards, or moves rightwards first and then leftwards), the terminal 100 may determine that the rightmost nearby device of the terminal 100 is the terminal 103. The terminal 100 may display a mark 565 below the device option 555 corresponding to the terminal 103. The mark 565 may be used to prompt that the terminal 103 corresponding to the device option 555 is the rightmost nearby device of the terminal 100. The mark 565 may be a text mark (for example, "a rightmost device"), a picture mark, or the like.

In some embodiments, after discovering the nearby device, the terminal 100 may display a positioning control element on the picture sharing interface, and the positioning control element may be used to trigger the terminal 100 to position the nearby device. After the user triggers the positioning control element, the terminal 100 may output an operation prompt. The operation prompt is used to indicate the user to shake the terminal 100 leftwards, rightwards, or leftwards and rightwards, to assist the terminal 100 in completing positioning of the nearby device. In this way, a user can be indicated to move the terminal 100, user operations can be standardized, and accuracy of positioning a nearby device can be improved.

For example, as shown in FIG. 5I, after finding the nearby device, the terminal 100 may display a positioning control element 571 on the picture sharing interface 550. The terminal 100 may receive an input operation (for example, tapping) of the user on the positioning control element 571. In response to the input operation, the terminal 100 may display an operation prompt 572 shown in FIG. 5J.

As shown in FIG. 5J, the terminal 100 may display an operation prompt 572 in the area 552. The operation prompt 572 may be a text prompt (for example, "Please hold the device horizontally and move to the left"), and/or a picture prompt, and/or a mechanical vibration prompt, or the like. After the terminal 100 displays the operation prompt 572, the user may complete, based on the operation prompt 572, an operation corresponding to the operation prompt 572 (for example, moving the terminal 100 leftwards).

In a possible implementation, the terminal 100 may sequentially display a plurality of operation prompts, to gradually indicate the user to complete a specified operation.

For example, as shown in FIG. 5K, after detecting that the terminal 100 completes the operation corresponding to the operation prompt 572, the terminal 100 may continue to display an operation prompt 573 on the picture sharing interface 550. The operation prompt 572 may be a text prompt (for example, "Please hold the device horizontally and move to the right"), and/or a picture prompt, and/or a mechanical vibration prompt, or the like. After the terminal 100 displays the operation prompt 573, the user may complete, based on the operation prompt 573, an operation corresponding to the operation prompt 573 (for example, moving the terminal 100 rightwards).

As shown in FIG. 5L, after detecting that the user completes a specified operation or operation combination, the terminal 100 may determine a position of the nearby device relative to the terminal 100 by using the BLUETOOTH technology, and display position information of the nearby device on the picture sharing interface 550.

Optionally, in addition to prompting a moving direction, the operation prompt 572 may further indicate a moving distance or angle of the terminal 100. For example, the operation prompt 572 may be a text prompt "move 0.1 m to 30° left of the front", and after the terminal 100 detects that the terminal 100 moves 0.1 m to 30° left of the front, the terminal 100 may output an operation prompt 573 (for example, "move 0.1 m to 30° right of the rear").

In some embodiments, the user knows a position of a device for receiving, but does not know a device name or a model of the device for receiving. The user may operate the terminal 100 to shake in a direction of the device for receiving. After determining position information of the device for receiving relative to the terminal 100 by using the BLUETOOTH, the terminal 100 may mark a device option corresponding to the device for receiving as a preferred device option.

For example, the user knows a position of the terminal 103 relative to the terminal 100. For example, in this case, the terminal 103 located in a direction of 60° right of the rear of the terminal 100 is the device for receiving. However, the user does not know a device name corresponding to the terminal 103. The user may shake the terminal 100 in a direction to the terminal 103 (for example, shake the terminal 100 to the direction of 60° right of the rear of the terminal 100). As shown in FIG. 5M, after receiving shaking of the user towards the direction to the terminal 103, the terminal 100 may position nearby devices (for example, the terminal 101, the terminal 102, and the terminal 103) by using the BLUETOOTH, and display position information of the nearby devices relative to the terminal 100 on the picture sharing interface 550, and mark the device option corresponding to the terminal 103 as the preferred device option. For example, the terminal 100 may display, on a leftmost side, the device option 555 corresponding to the terminal 103, and display a mark 574 below the device option 555. The mark 574 may be used to prompt the user that the terminal 103 corresponding to the device option 555 is a nearby device in the shaking direction of the user. The mark 574 may be a text mark (for example, "a device in the same direction as you shake"), a picture mark, or the like.

In some embodiments, there are a plurality of nearby devices (for example, the terminal 101, the terminal 102, and the terminal 103) around the terminal 100. A user knows a device name of a device for receiving and a position of the device for receiving relative to the terminal 100, but device names of several devices in the plurality of nearby devices are the same, and the user cannot determine which device is the device for receiving. Therefore, the user may separately query position information of a device corresponding to a device option, and determine, based on the device name and the position information, whether the device corresponding to the device option selected by the user is the device for receiving. After the terminal 100 displays, on the data sharing interface (for example, the picture sharing interface), the device options corresponding to the nearby devices, the terminal 100 may receive an operation of the user, independently position a nearby device, and after positioning is completed, display the position information of the nearby device on the data sharing interface. In this way, the terminal 100 can independently position a device based on a user requirement. Because a relatively small amount of data calculation is required during independent positioning, a positioning speed can be improved.

For example, as shown in FIG. 5N, a device name of the terminal 101 corresponding to the device option 553 may be "HUAWEI P40", a device name of the terminal 102 corresponding to the device option 554 may be "HUAWEI Mate30", and a device name of the terminal 103 corresponding to the device option 555 may be "HUAWEI P40". The user knows that a device name of the device for receiving is "HUAWEI P40", and the user knows that the device for receiving is located in a right direction behind the terminal 100. However, in this case, the device names corresponding to the device option 553 and the device option 555 are both "HUAWEI P40". The user needs to determine which one of the terminal 101 and the terminal 103 is the device for receiving. The terminal 100 may receive an input operation (for example, touching and holding) of the user on the device option 553. In response to the input operation, as shown in FIG. 5O, the terminal 100 may only display the device option 553 in the area 552 of the picture sharing interface 550, and output an operation prompt 581. The operation prompt 581 is used to indicate the user to complete a specified operation, to assist the terminal 100 in completing positioning of a terminal (for example, the terminal 101) corresponding to the device option 553.

As shown in FIG. 5P, after the user completes the specified operation, the terminal 100 may position the terminal corresponding to the device option 553, and display position information (for example, "30° left of the front distance 0.8 m") of the terminal corresponding to the device option 553 on the picture sharing interface 550. Because the user knows that the device for receiving is located in the right direction behind the terminal 100, the user may determine that the terminal 101 corresponding to the device option 553 is not the device for receiving, but the terminal 103 corresponding to the device option 555 is the device for receiving. The user may further tap the device option 555, to share a file or data with the terminal 103.

In some embodiments, when the terminal 101 and the terminal 103 are located in a same direction, but distances of the terminal 101 and the terminal 103 relative to the terminal 100 are different, whether the terminal 101 or the terminal 103 is the device for receiving with a known device name and distance is determined by separately positioning the terminal 101 or the terminal 103 and based on distance information displayed in a positioning result.

In some application scenarios, after triggering the terminal 100 to open the device connection interface, the user may shake the terminal 100 leftwards and rightwards, so that the terminal 100 can position a nearby device by using the BLUETOOTH, and display position information of the nearby device on the device connection interface. In this way, the user can accurately select, from a plurality of device options, a device to be connected.

In the UI embodiment shown in FIG. 6A to FIG. 6K as an example, after a user triggers opening of a BLUETOOTH connection interface, the terminal 100 may display, on the BLUETOOTH connection interface, a device option corresponding to a nearby device whose BLUETOOTH is enabled. The terminal 100 may indicate the user to move the terminal 100 leftwards and rightwards, so that the terminal 100 can display position information of the nearby device relative to the terminal 100 on the BLUETOOTH connection interface.

Figure 6A:
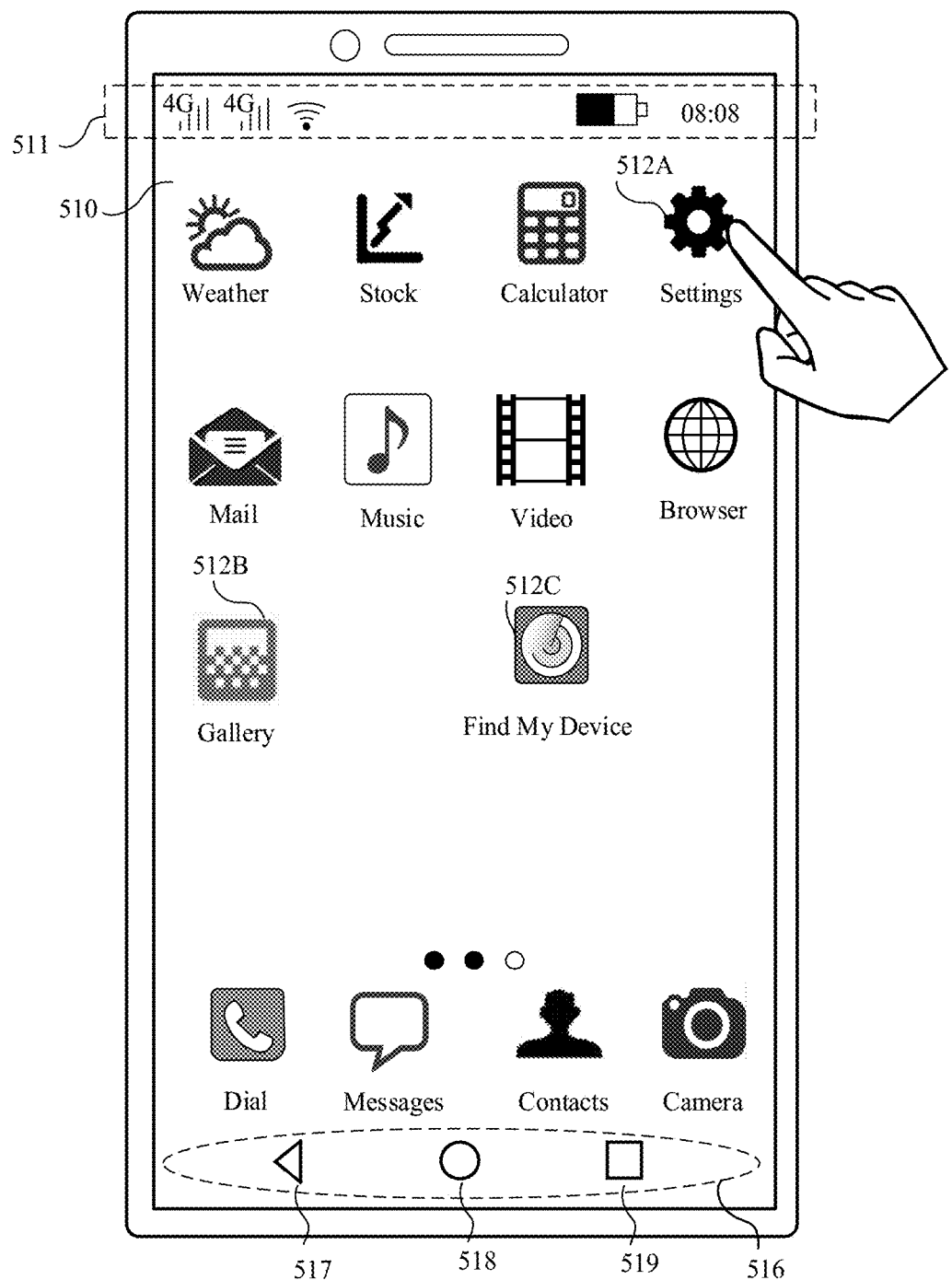
FIG. 6A to FIG. 6K are schematic diagrams of a group of interfaces according to another embodiment of this disclosure.

For example, as shown in FIG. 6A, the terminal 100 may display the interface 510 of a home screen, and the interface 510 displays a page on which application icons are placed. The page includes a plurality of application icons (for example, a weather application icon, a stock application icon, a calculator application icon, a settings application icon 512A, an email application icon, a music application icon, a video application icon, a browser application icon, a gallery application icon 512B, and a Find My Device application icon 512C). For text descriptions of the interface 510, refer to the embodiment shown in FIG. 5A. Details are not described herein again.

The terminal 100 may receive an operation (for example, tapping) performed by the user on the settings application icon 512A. In response to the operation, the terminal 100 may display a settings interface 620 shown in FIG. 6B.

Figure 6B:
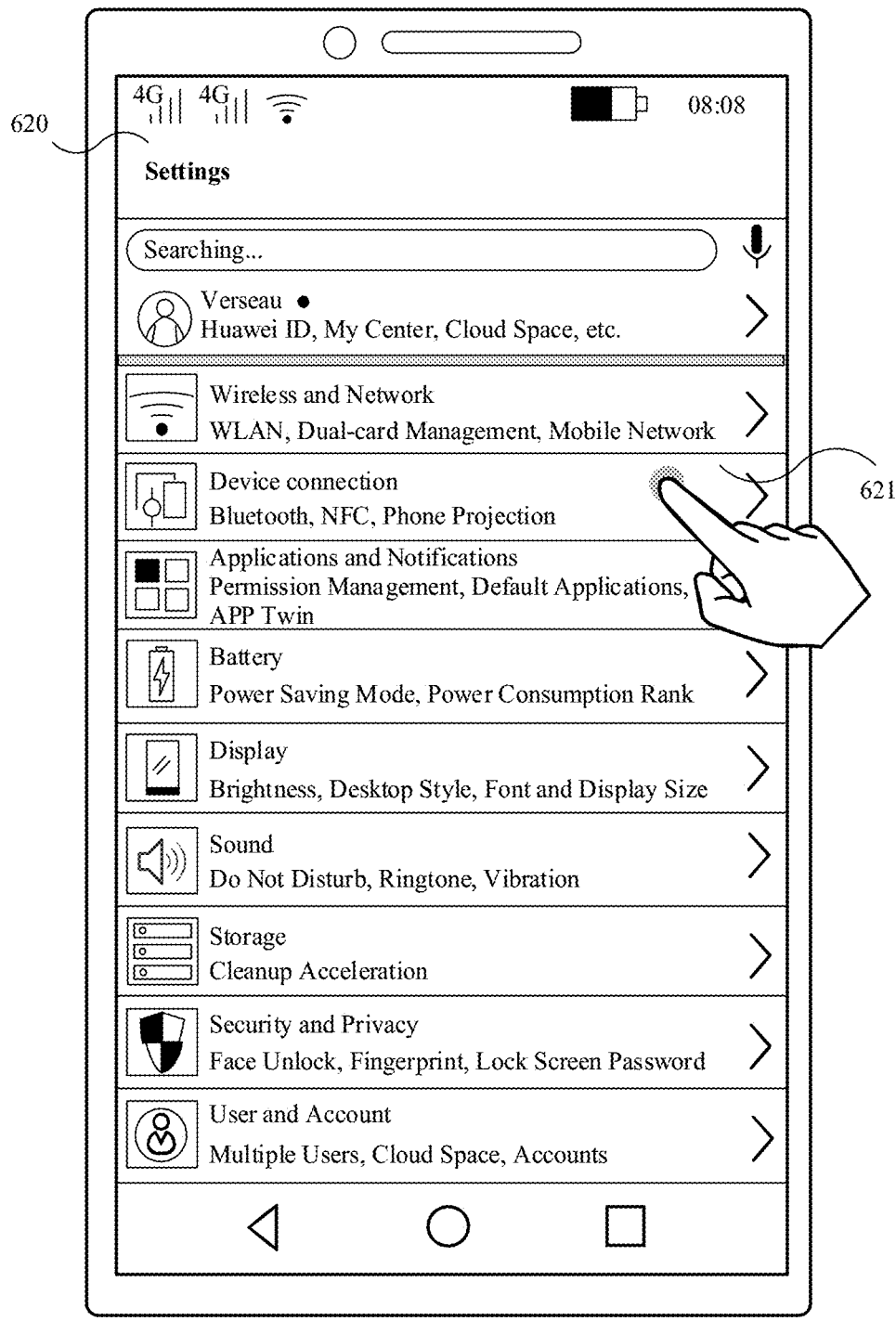

As shown in FIG. 6B, the settings interface 620 displays a wireless and network setting entry, a device connection setting entry 621, an application and notification setting entry, a battery setting entry, a display setting entry, a sound setting entry, a storage setting entry, a security and privacy setting entry, a user and account setting entry, and the like.

The terminal 100 may receive an input operation (for example, tapping) performed by the user on the device connection setting entry 621. In response to the input operation performed on the device connection setting entry 621, the terminal 100 may display a device connection interface 630 shown in FIG. 6C.

Figure 6C:
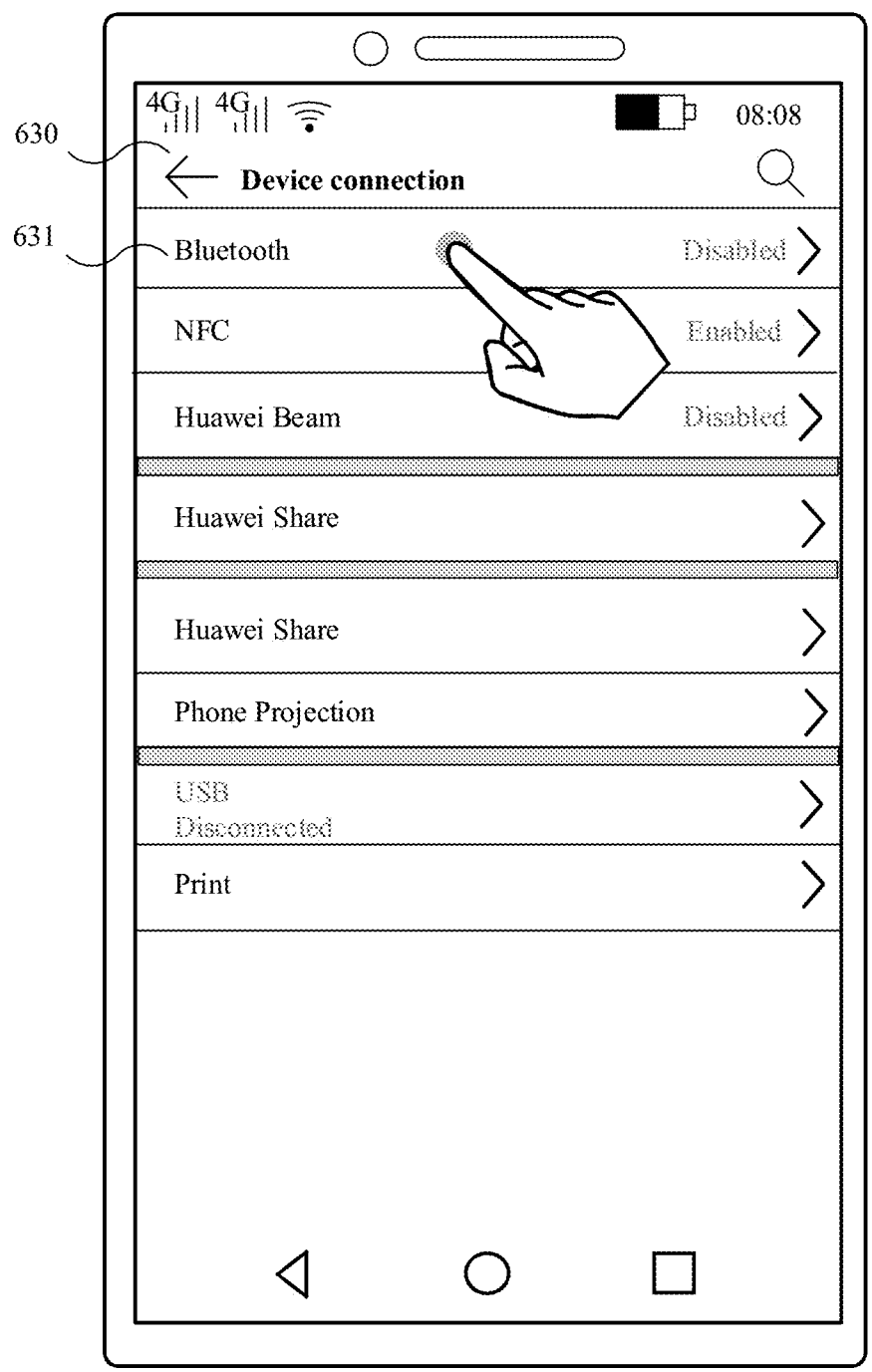

As shown in FIG. 6C, the device connection interface 630 displays a BLUETOOTH setting entry 631, an NFC setting entry, a HUAWEI Beam setting entry, a HUAWEI Share setting entry, a mobile phone projection setting entry, a USB setting entry, a print setting entry, and the like.

The terminal 100 may receive an input operation (for example, tapping) performed by the user on the BLUETOOTH setting entry 631 on the device connection interface 630. In response to the input operation performed on the BLUETOOTH setting entry 631, the terminal 100 may display a BLUETOOTH connection interface 640 shown in FIG. 6D.

Figure 6D:
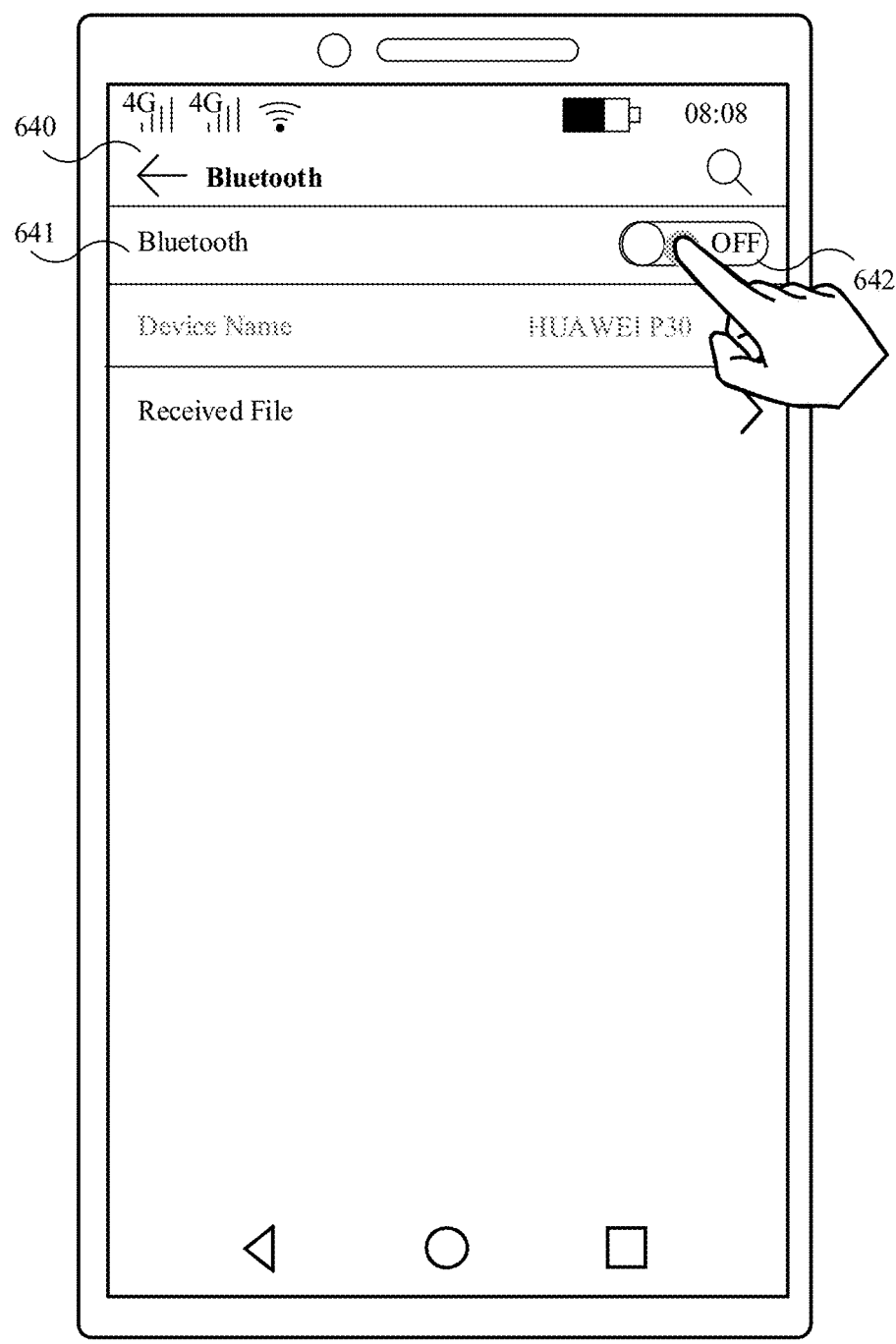

As shown in FIG. 6D, the BLUETOOTH connection interface 640 displays a BLUETOOTH switch entry 641, a device name setting entry, a file receiving setting entry, and the like. A BLUETOOTH switch 642 is displayed in the BLUETOOTH switch entry 641. The BLUETOOTH switch 642 may be used to receive a user operation to trigger the terminal 100 to enable/disable a BLUETOOTH function.

For example, the BLUETOOTH switch 642 is currently in an off state, and the terminal 100 may receive an input operation (for example, tapping) of the user on the BLUETOOTH switch 642. In response to the input operation performed on the BLUETOOTH switch 642, the terminal 100 may enable the BLUETOOTH function.

Figure 6E:
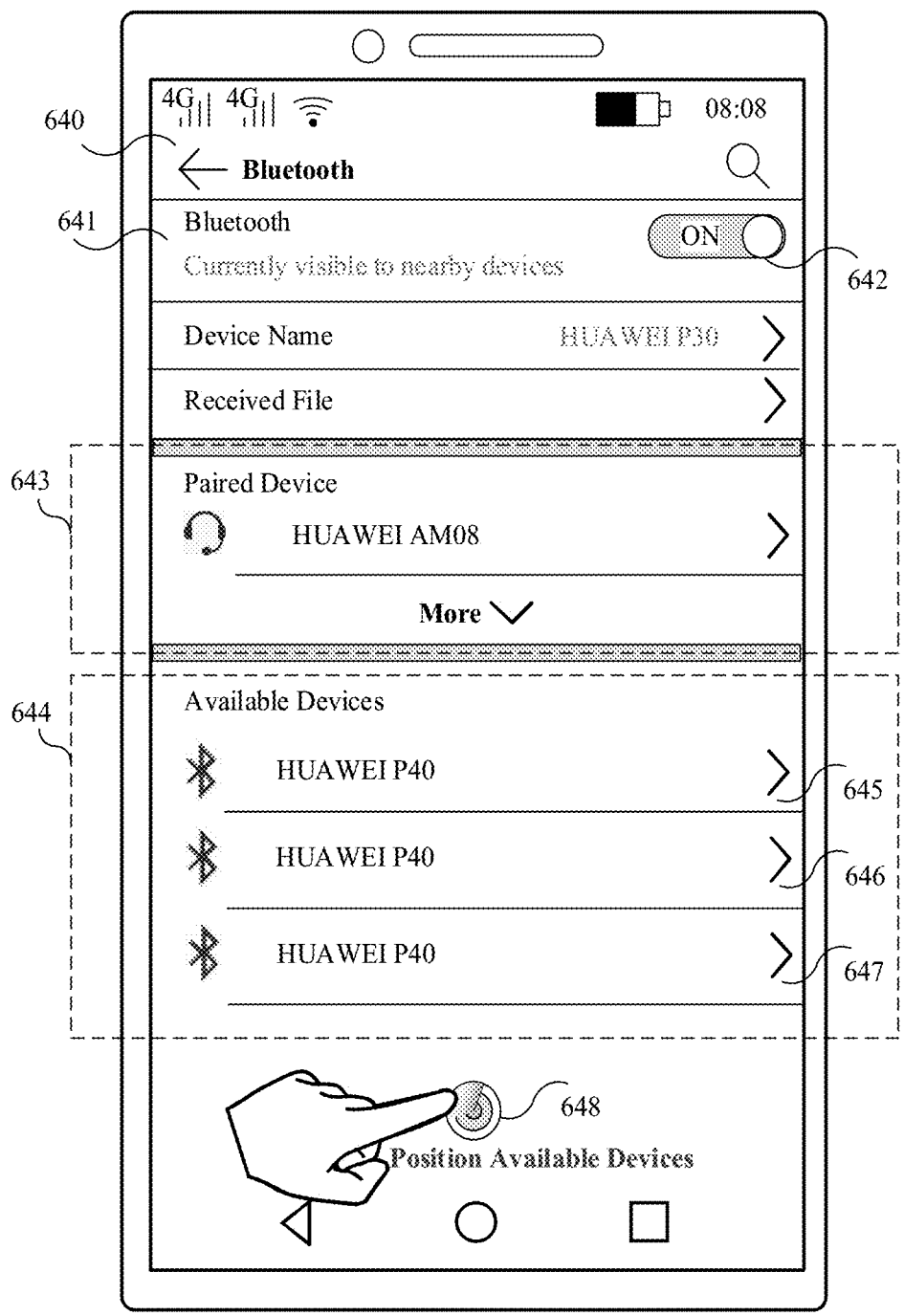

As shown in FIG. 6E, after enabling the BLUETOOTH function, the terminal 100 may display a paired device list 643, an available device list 644, and a positioning control element 648 on the BLUETOOTH connection interface 640. One or more paired device options (for example, a "HUAWEI AM08" device option) may be displayed in the paired device list 643. The available device list 644 may display device options corresponding to one or more unpaired nearby devices, for example, a device option 645, a device option 646, and a device option 647. The device option 645 may correspond to the terminal 101 in the embodiment shown in FIG. 4, and a device name (for example, "HUAWEI P40") of the terminal 101 may be displayed on the device option 645. The device option 646 may correspond to the terminal 102 in the embodiment shown in FIG. 4. A device name (for example, "HUAWEI P40") of the terminal 102 may be displayed on the device option 646. The device option 647 may correspond to the terminal 103 in the embodiment shown in FIG. 4. A device name (for example, "HUAWEI P40") of the terminal 103 may be displayed on the device option 647. The positioning control element 648 may be used to trigger the terminal 100 to position a nearby device by using the BLUETOOTH.

The terminal 100 may receive an input operation (for example, tapping) of the user on the positioning control element 648. In response to the input operation, the terminal 100 may output an operation prompt box 651 shown in FIG. 6F.

Figure 6F:
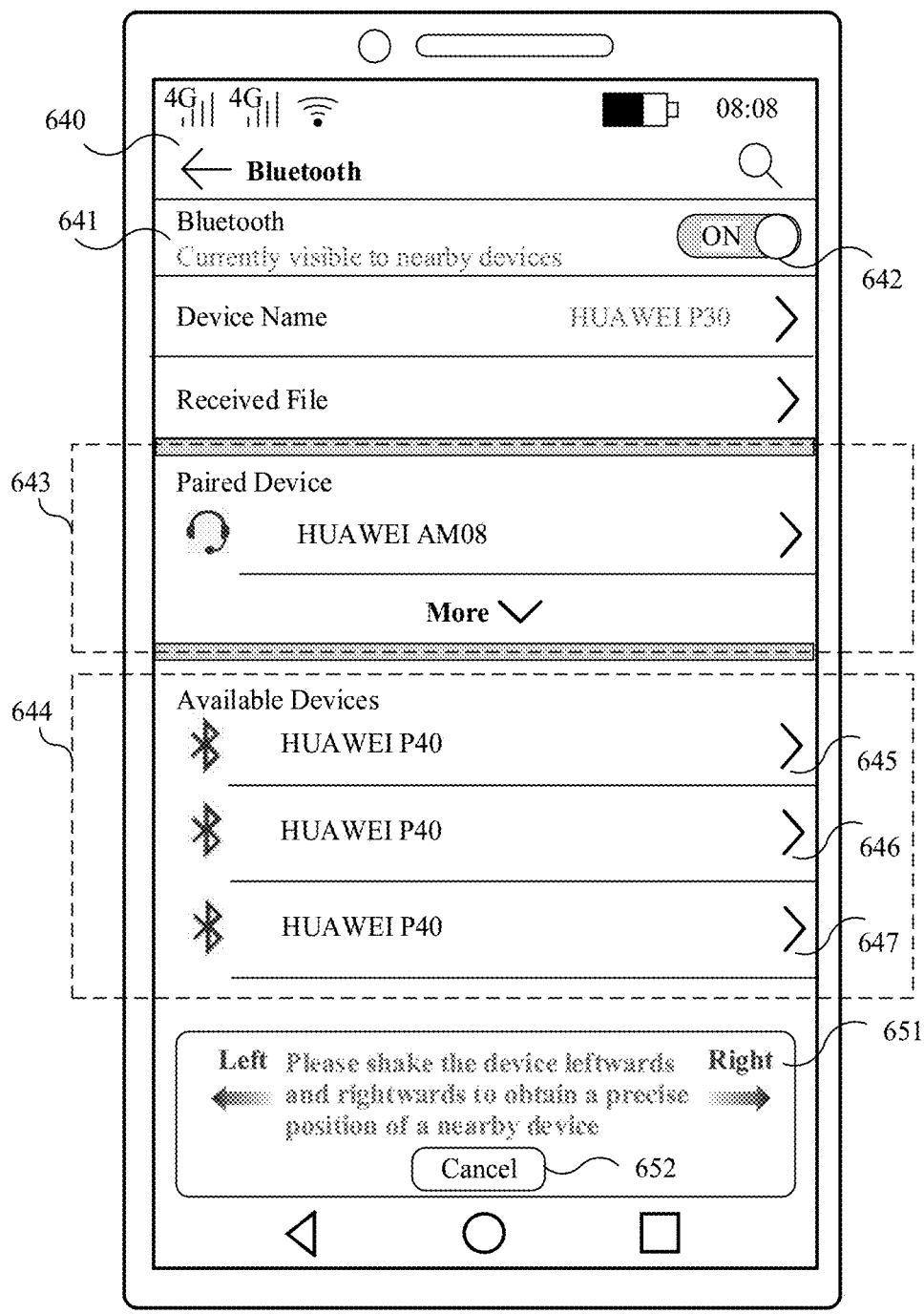

As shown in FIG. 6F, the terminal 100 may display the operation prompt box 651 on the BLUETOOTH connection interface 640. The operation prompt box 651 may be used to indicate the user to complete a specified operation, to assist the terminal 100 in positioning the nearby device by using the BLUETOOTH. The operation prompt box 651 may further include a cancel button 652, and the cancel button 652 may be used to trigger the terminal 100 to cancel positioning of the nearby device by using the BLUETOOTH. The operation prompt box 651 may display a text prompt (for example, "Please shake the device leftwards and rightwards to obtain a precise position of a nearby device"), a picture prompt, and the like.

Figure 6G:
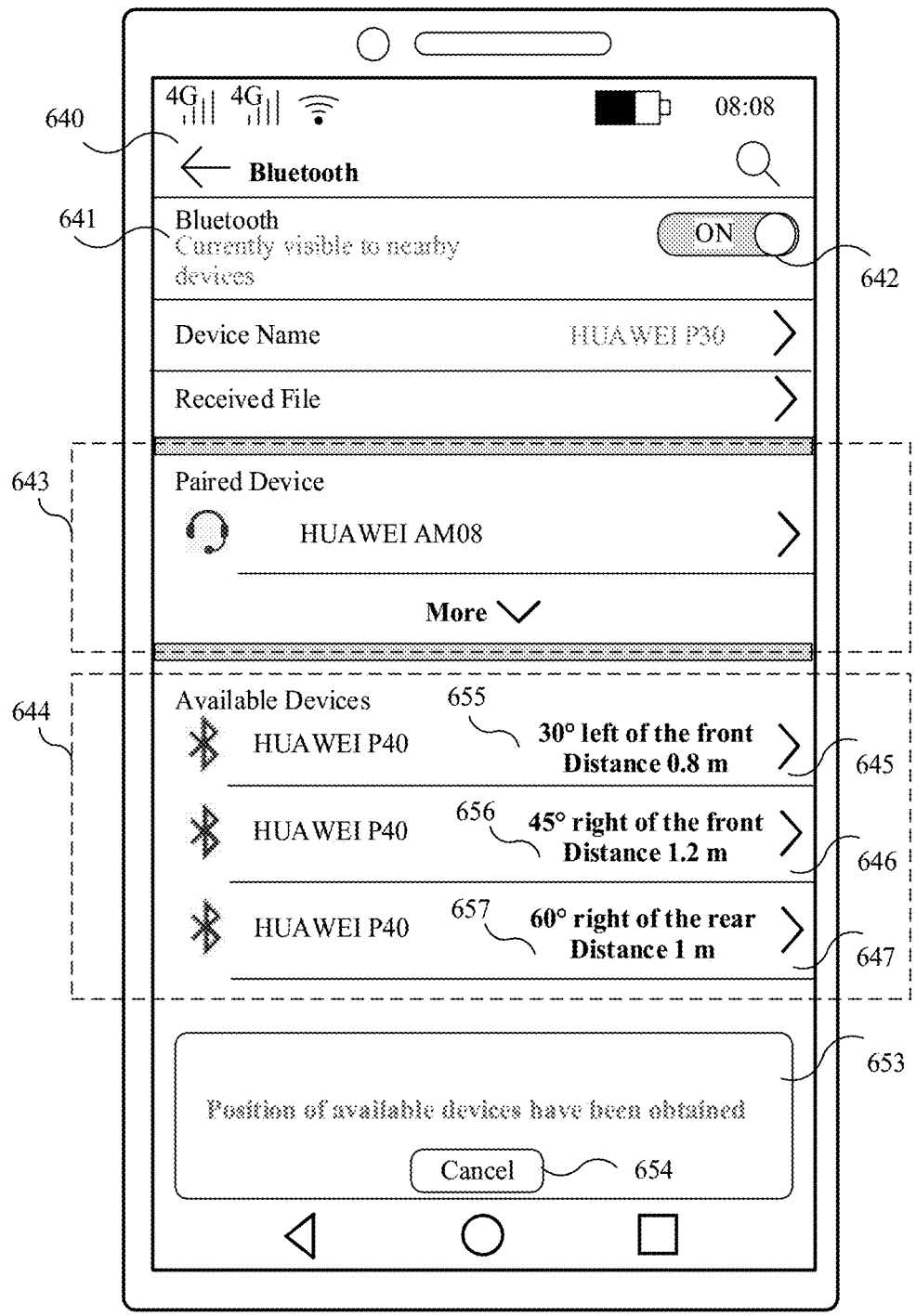

As shown in FIG. 6G, after the terminal 100 detects that the user assists the terminal 100 to complete the specified operation, the terminal 100 may locate the nearby device by using the BLUETOOTH, and display position information of the nearby device relative to the terminal 100 on a device option corresponding to the nearby device on the BLUETOOTH connection interface 640. For example, the device option 645 may display position information 655 of the terminal 101 corresponding to the device option 645 (for example, 30° left of the front distance 0.8 m). The device option 646 may display position information 656 of the terminal 102 corresponding to the device option 646 (for example, 45° right of the front distance 1.2 m). The device option 647 may display position information 657 of the terminal 103 corresponding to the device option 647 (for example, 60° right of the rear distance 1 m).

In a possible implementation, as shown in FIG. 6G, the terminal 100 may further display a positioning completion prompt box 653 on the BLUETOOTH connection interface after completing positioning of the nearby device. The positioning completion prompt box 653 may be used to notify the user that the positioning of the nearby device is completed. The positioning completion prompt box 653 may include a cancel button 654, and the cancel button 654 may be used to trigger to cancel display of the position information of the nearby device.

In a possible implementation, the terminal 100 may receive and respond to the leftwards and rightwards shake operation of the user again, reposition the nearby device, and refresh the position information of the nearby device displayed on the BLUETOOTH connection interface.

The terminal 100 may receive an input operation performed by the user on a device option (for example, the device option 645) on the BLUETOOTH connection interface 640. In response to the input operation (for example, tapping), the terminal 100 may send a BLUETOOTH connection request to a device (for example, the terminal 101) corresponding to the device option, to establish a BLUETOOTH connection to the device corresponding to the device option.

In some embodiments, the terminal 100 establishes a BLUETOOTH connection to a BLUETOOTH device (such as a BLUETOOTH headset or a BLUETOOTH speaker), but the user cannot find the accessory device because the user cannot see a position of the accessory device. Therefore, the terminal 100 may receive and respond to a shake operation of the user, position the connected accessory device, and display a directional position of the BLUETOOTH device relative to the terminal 100. This can assist the user in finding a nearby connected BLUETOOTH device, thereby improving user experience.

Figure 6H:
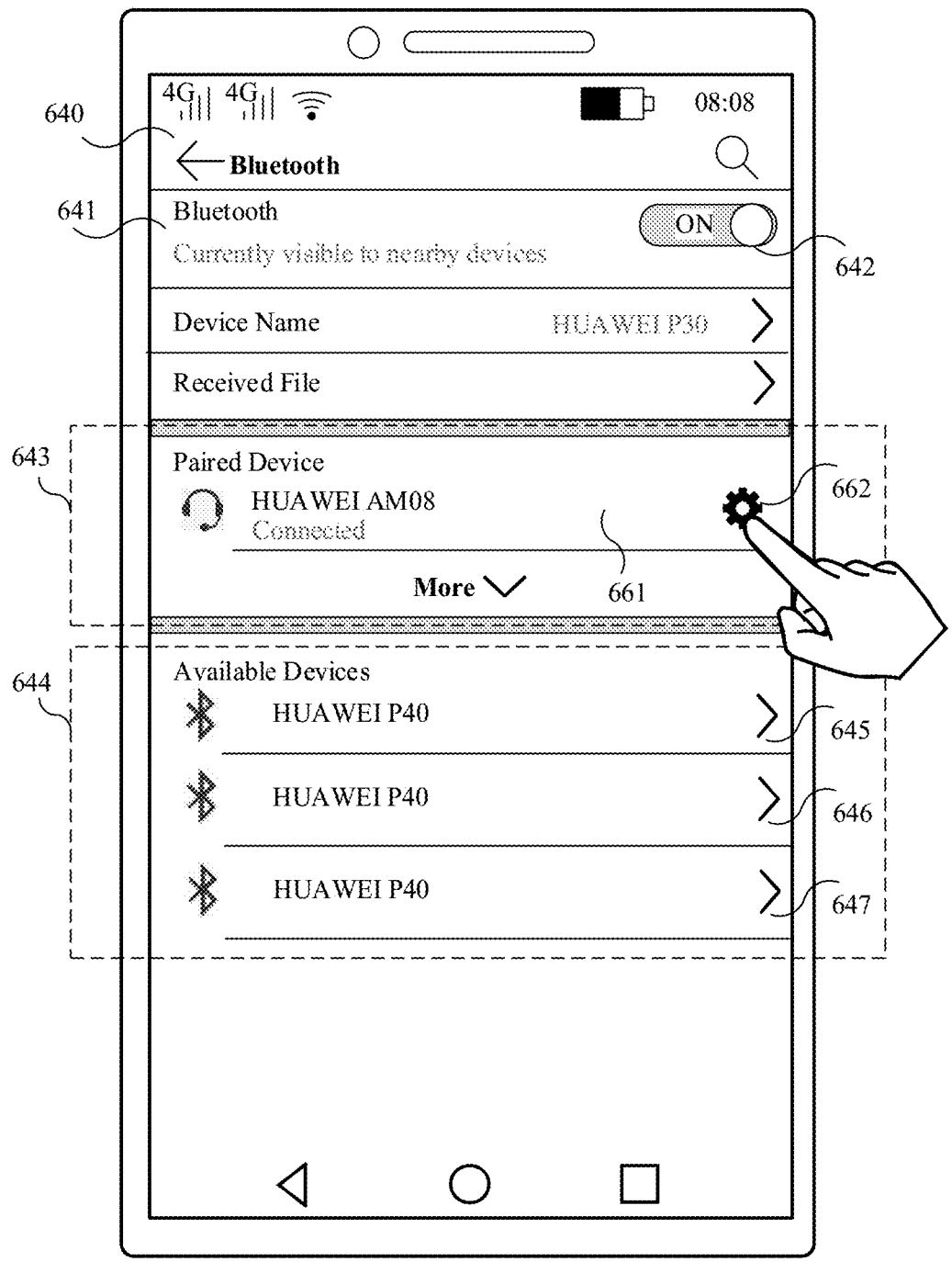

For example, as shown in FIG. 6H, the terminal 100 displays the BLUETOOTH connection interface 640. The terminal 100 pairs with a BLUETOOTH device corresponding to the device option 661 and establishes a BLUETOOTH connection. A device name of the BLUETOOTH device may be "HUAWEI AM08". A setting control element 662 corresponding to the BLUETOOTH device is displayed on the device option 661.

The terminal 100 may receive an operation (for example, tapping) performed by the user on the setting control element 662. In response to the operation, the terminal 100 may display a BLUETOOTH device setting interface 670 shown in FIG. 6I.

Figure 6I:
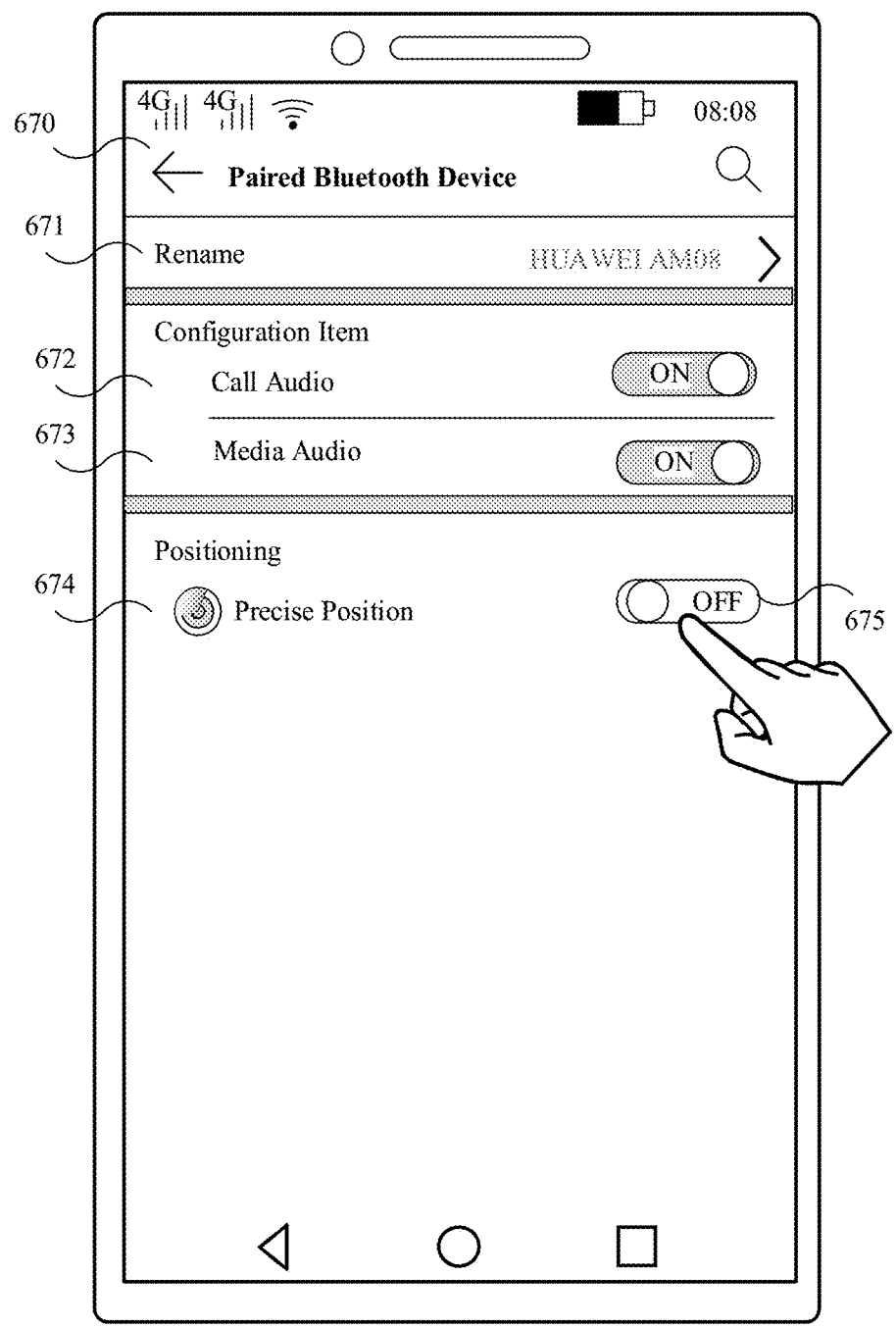

As shown in FIG. 6I, the BLUETOOTH device setting interface 670 may include a renaming setting entry 671, a call audio setting entry 672, a media audio setting entry 673, and a precise positioning setting entry 674. The renaming setting entry 671 may be used to modify the device name of the BLUETOOTH device. The call audio setting entry 672 may be used to trigger enabling or disabling of transferring a call on the terminal 100 to the BLUETOOTH device. The media audio setting entry 673 may be used to trigger enabling or disabling of outputting audio data on the terminal 100 to the BLUETOOTH device for playing. The precise positioning setting entry 674 may include a positioning switch control element 675. The positioning switch control element 675 may be configured to trigger the terminal 100 to enable or disable positioning of the BLUETOOTH device.

The terminal 100 may receive an input operation (for example, tapping) of the user on the positioning switch control element 675. In response to the input operation, the terminal 100 may switch the positioning switch control element 675 from an off state to an on state, and output an operation prompt box 676 shown in FIG. 6J.

Figure 6J:
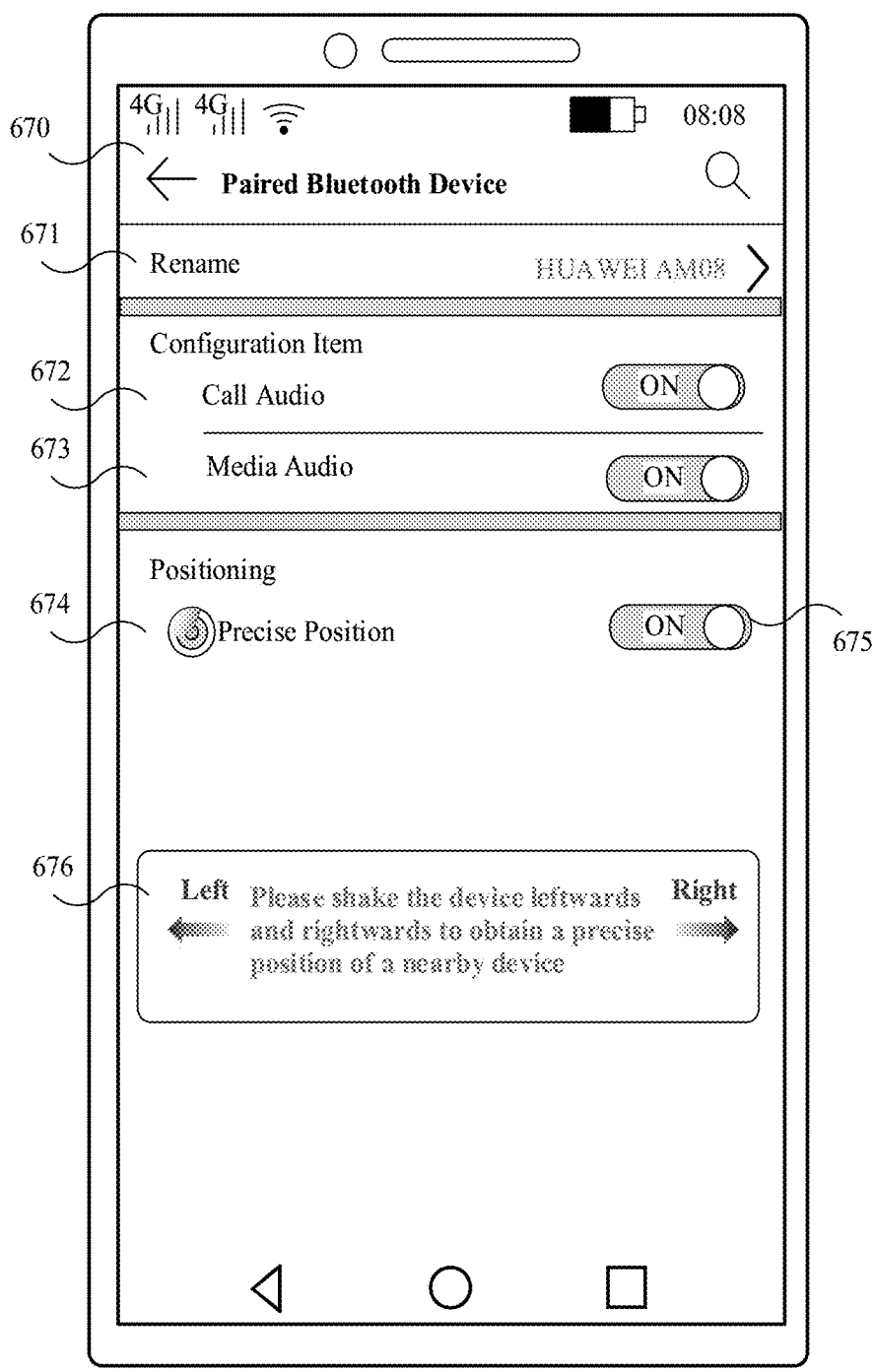

As shown in FIG. 6J, when the terminal 100 switches the positioning switch control from the off state to the on state, the terminal 100 may display the operation prompt box 676 on the BLUETOOTH device setting interface 670. The operation prompt box 676 may be used to indicate the user to complete a specified operation, to assist the terminal 100 in positioning the nearby device by using the BLUETOOTH. The operation prompt box 676 may display a text prompt (for example, "Please shake the device leftwards and rightwards to obtain a precise position of a nearby device"), a picture prompt, and the like.

Figure 6K:
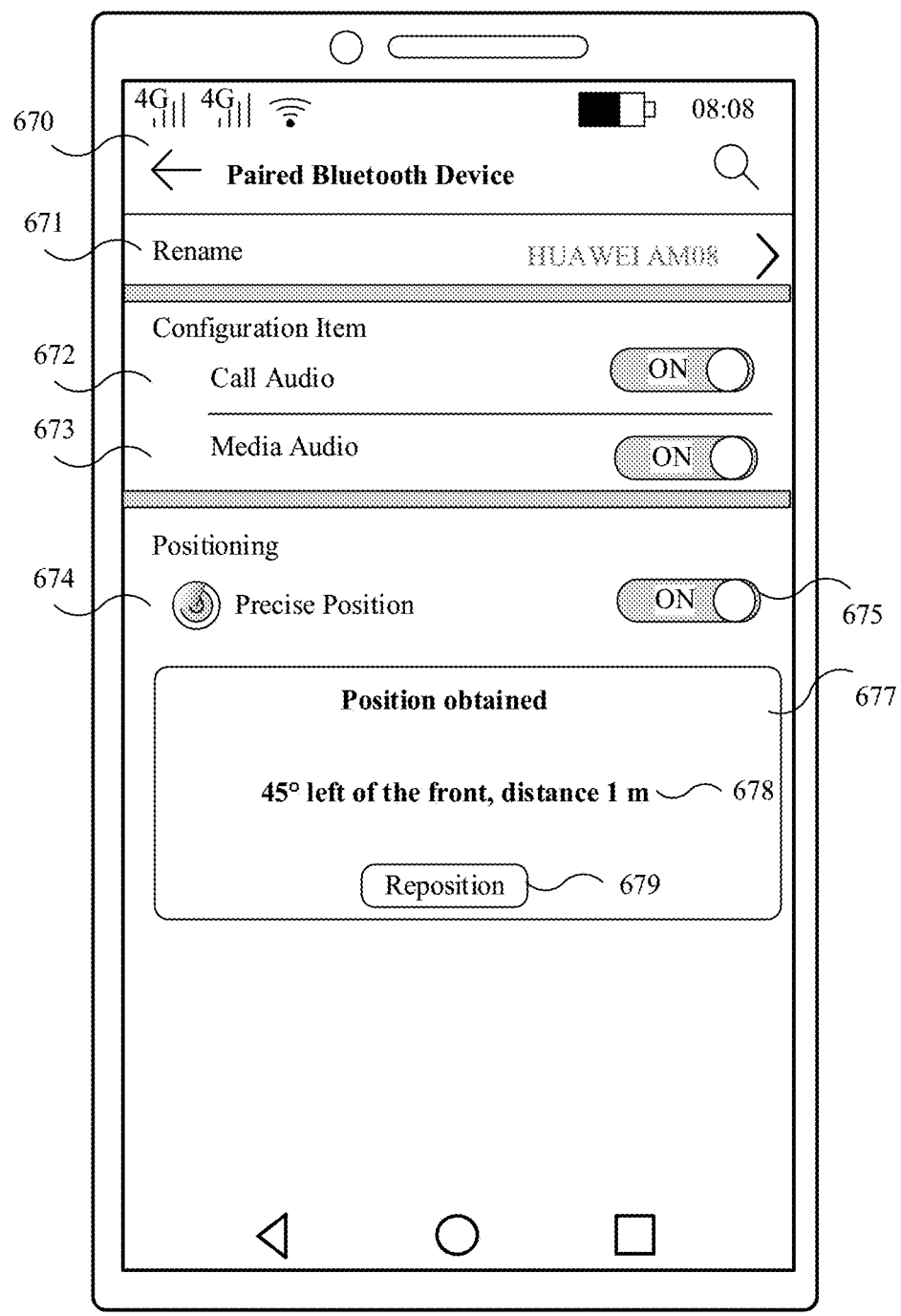

As shown in FIG. 6K, after the terminal 100 detects that the user assists the terminal 100 in completing the specified operation, the terminal 100 may locate the BLUETOOTH device (for example, the device name is "HUAWEI AM 08") by using the BLUETOOTH, and display position information of the BLUETOOTH device relative to the terminal 100 on the BLUETOOTH device setting interface 670. For example, after positioning the BLUETOOTH device by using the BLUETOOTH, the terminal 100 may display a position prompt box 677. The position prompt box 677 includes position information 678 (for example, 45° left of the front, distance 1 m) of the BLUETOOTH device relative to the terminal 100 and a repositioning control element 679.

The repositioning control element 679 may be used to trigger the terminal 100 to reposition the BLUETOOTH device.

In some application scenarios, when an accessory device (for example, a BLUETOOTH headset or a BLUETOOTH speaker) of the terminal 100 is lost in a corner, and the accessory device is not connected to the terminal 100, a user cannot find the accessory device by naked eyes. In this embodiment of this disclosure, the terminal 100 may receive and respond to a leftwards and rightwards shake operation of the user, position the accessory device relative to the terminal 100 by using the BLUETOOTH, and display, on a touchscreen, a directional position of the accessory device relative to the terminal 100. This can assist the user in finding a nearby accessory device, thereby improving user experience.

Figure 7A:
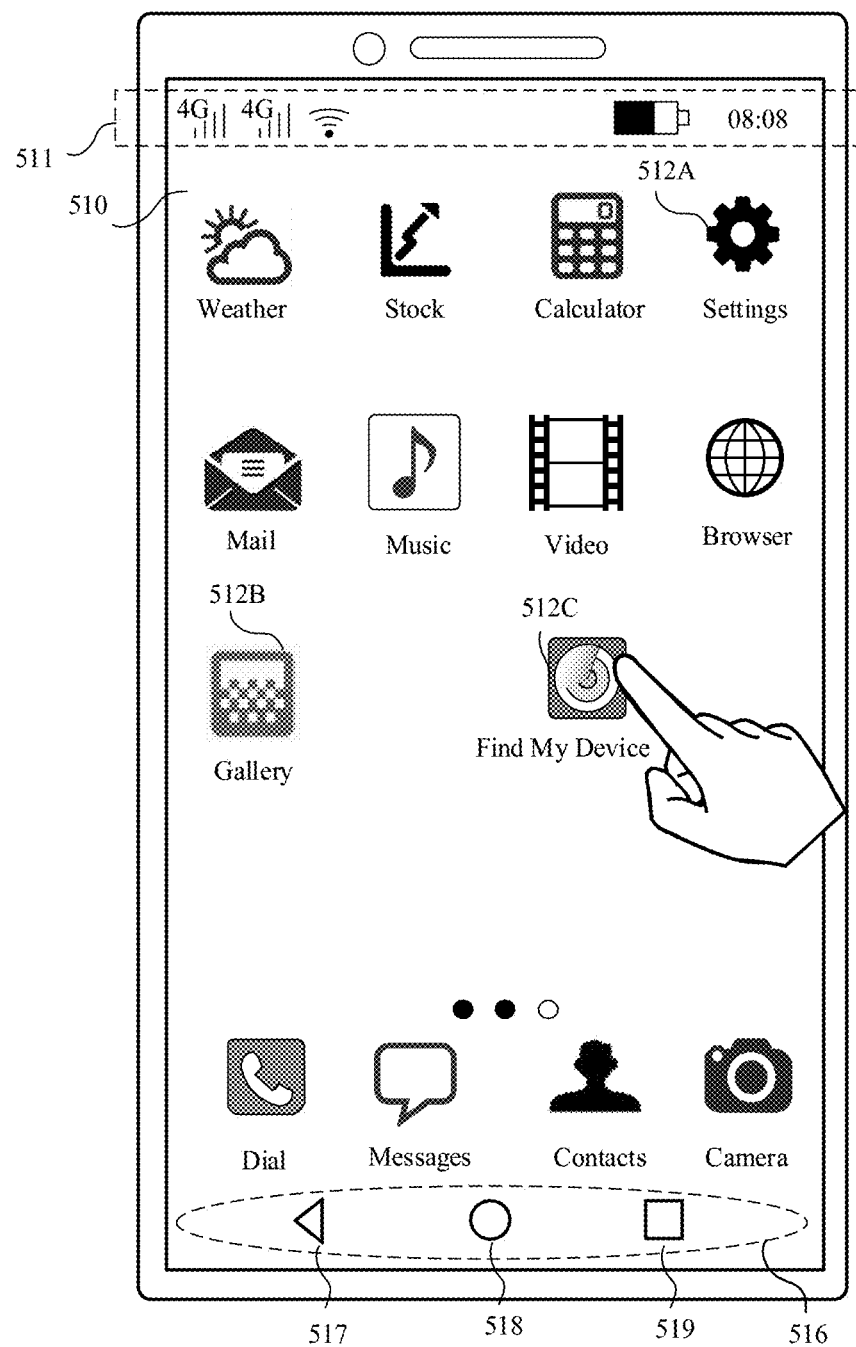
FIG. 7A to FIG. 7G are schematic diagrams of a group of interfaces according to another embodiment of this disclosure.

For example, as shown in FIG. 7A, the terminal 100 may display the interface 510 of a home screen. For text descriptions of the interface 510, refer to the embodiment shown in FIG. 5A. Details are not described herein again. The terminal 100 may receive an operation (for example, tapping) performed by the user on the Find My Device application icon 512C. In response to the operation, the terminal 100 may display an application interface 710 shown in FIG. 7B.

Figure 7B:
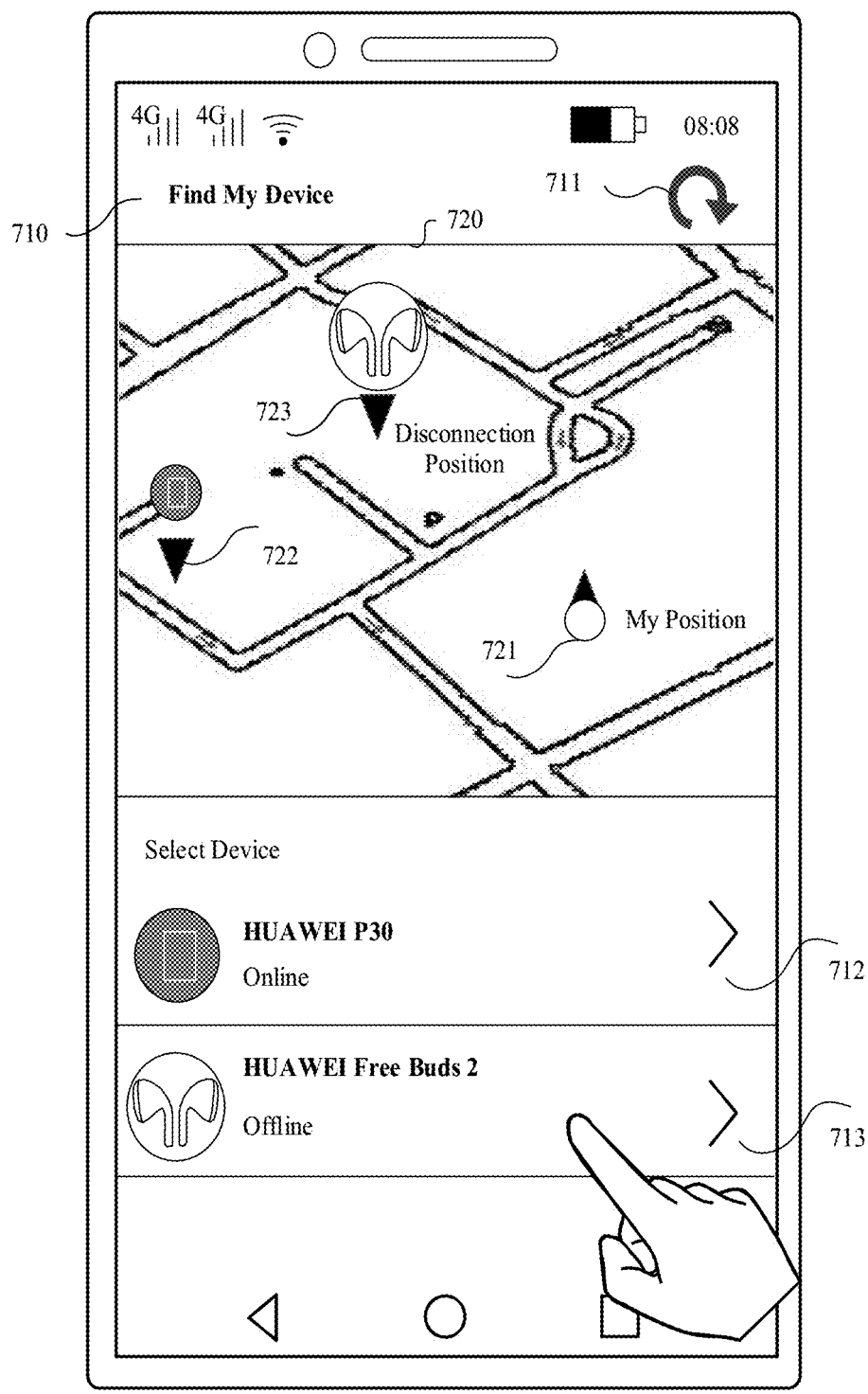

As shown in FIG. 7B, a title of the application interface 710 may be "Find My Device". The application interface 710 may include a map 720, a position refresh control element 711, and one or more device options (for example, a device option 712 and an accessory device option 713). The map 720 includes a position mark 721 of the terminal 100 and a position mark of one or more accessory devices. For example, a device corresponding to the device option 712 may be a mobile phone, and a device name of the mobile phone may be "HUAWEI P30". A device corresponding to the device option 713 may be a BLUETOOTH headset, and a device name of the BLUETOOTH headset may be "HUAWEI Free Buds 2".

The map 720 may include a position mark (for example, a position mark 721) of the terminal 100 and position marks (for example, a position mark 722 and a position mark 723) of one or more other devices. The position mark 721 may be used to indicate a current position of the terminal 100 on the map 720. Currently, the mobile phone "HUAWEI P30" may send a GPS position to the terminal 100. Therefore, the position mark 722 may be used to indicate the position of the mobile phone "HUAWEI P30" on the map 720. Currently, the BLUETOOTH headset "HUAWEI Free Buds 2" cannot send a GPS position to the terminal 100, or the BLUETOOTH headset "HUAWEI Free Buds 2" does not have a GPS positioning function. Therefore, the position mark 723 may be used to indicate a position that is of the BLUETOOTH headset "HUAWEI Free Buds 2" in the map 720 and at which the BLUETOOTH headset "HUAWEI Free Buds 2" is disconnected from the terminal 100 last time. The position refresh control element 711 is used to trigger the terminal 100 to update position marks of the display terminal 100 and other devices.

The terminal 100 may receive an operation (for example, tapping) performed by the user on the device option 713. In response to the operation, the terminal 100 may display a device searching interface 730 shown in FIG. 7C.

Figure 7C:
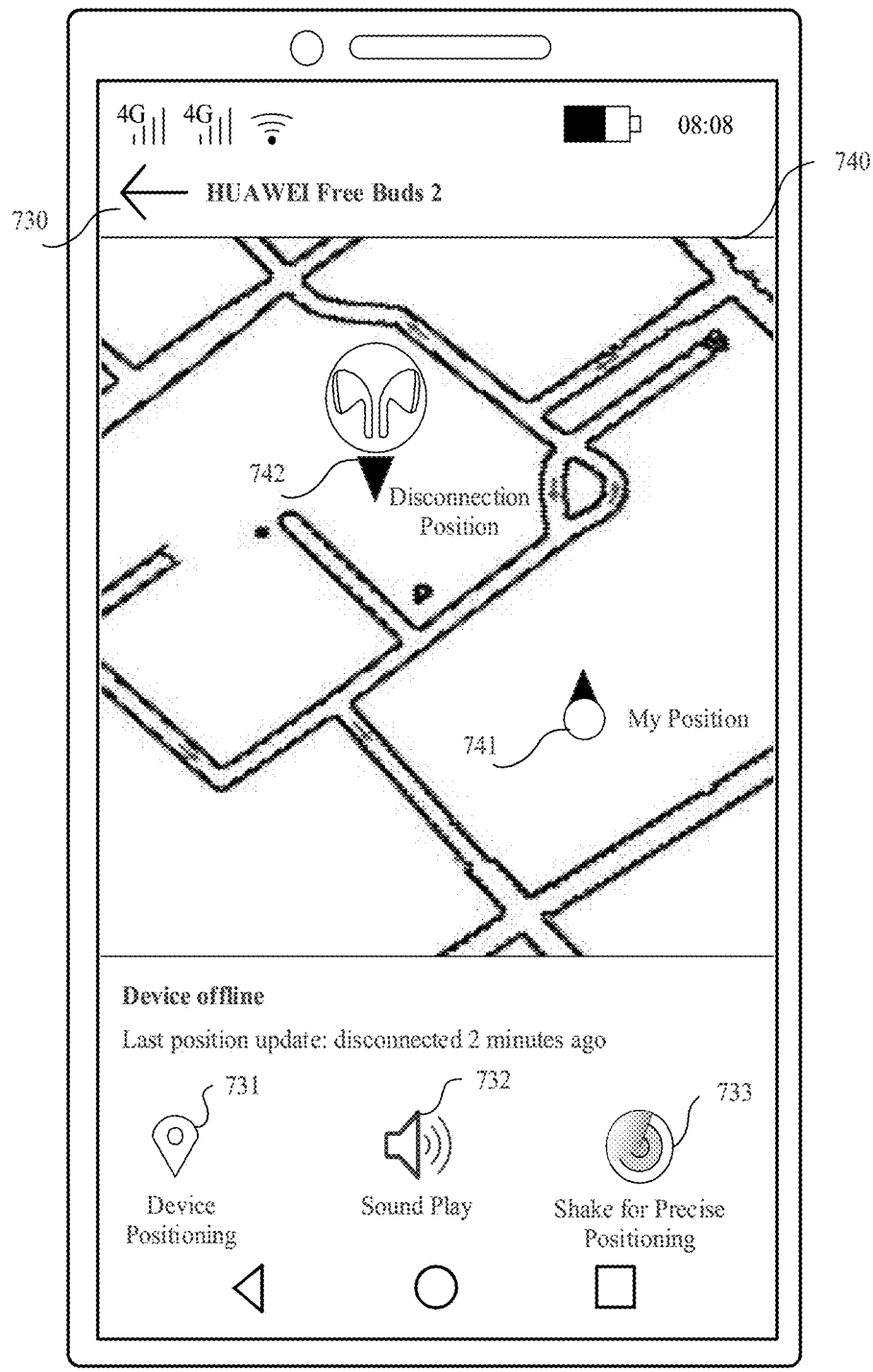

As shown in FIG. 7C, a device corresponding to the device option 713 may be a BLUETOOTH headset. A name of the BLUETOOTH headset may be displayed on a title on the device searching interface 730, for example, "HUAWEI Free Buds 2". The device searching interface 730 includes a map 740, a device positioning control element 731, a sound play control element 1132, and a precise positioning control element 733. The map 740 displays a position mark 741 of the terminal 100 and a position mark 742 of the BLUETOOTH headset. The position mark 741 is used to indicate a current position of the terminal 100 on the map 740. Because the terminal 100 cannot acquire a GPS position of the BLUETOOTH headset, the position mark 742 is used to indicate a position that is of the BLUETOOTH headset in the map 740 and at which the BLUETOOTH headset is disconnected from the terminal 100. Same as the mark 723 in FIG. 7B, the position mark 742 is used to indicate a position at which the BLUETOOTH headset is disconnected from the terminal 100.

The device positioning control element 731 may be used to trigger the terminal 100 to update and display position marks of the terminal 100 and the BLUETOOTH headset on the map. The sound play control element 732 may be configured to trigger the terminal 100 to send a sound play request to the BLUETOOTH headset, to request the BLUETOOTH headset to play a sound. The precise positioning control element 733 may be configured to trigger the terminal 100 to measure a position of a nearby device by using the BLUETOOTH. In this way, a position of a nearby device is measured by using BLUETOOTH, to help a user find an accessory device when the accessory device cannot perform positioning by using the GPS.

Figure 7D:
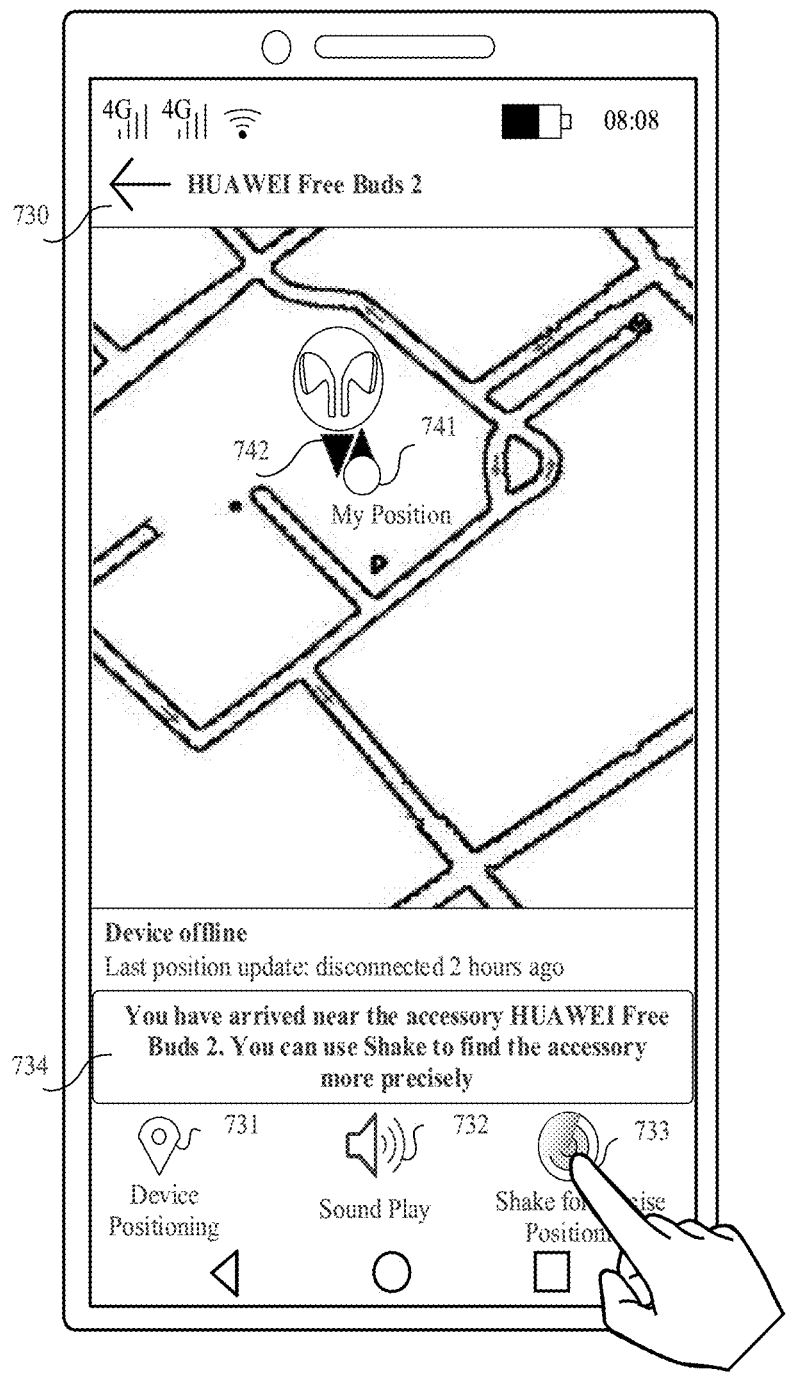

As shown in FIG. 7D, when the position of the terminal 100 changes, a position of the position mark 741 on the map 740 also changes on the map. When the terminal 100 moves to a vicinity (for example, within a distance of 2 m) of a geographical position indicated by the position mark 742, the terminal 100 may display prompt information 734, which is used to prompt the user to trigger the terminal 100 to accurately position an accessory device (for example, a BLUETOOTH headset) by using the BLUETOOTH. For example, the prompt information 734 may be a text prompt (for example, "You have reached an accessory 'HUAWEI Free Buds 2', and you can use a shake function to find the accessory more accurately"), and this is not limited to a text prompt. The prompt information 734 may alternatively be a picture prompt, a sound prompt, or the like.

The terminal 100 may receive an operation (for example, tapping) performed by the user on the precise positioning control element 733. In response to the operation, the terminal 100 may display a precise positioning interface 750 shown in FIG. 7E. In addition, the terminal 100 enables the BLUETOOTH function, and searches for a nearby device by using the BLUETOOTH.

Figure 7E:
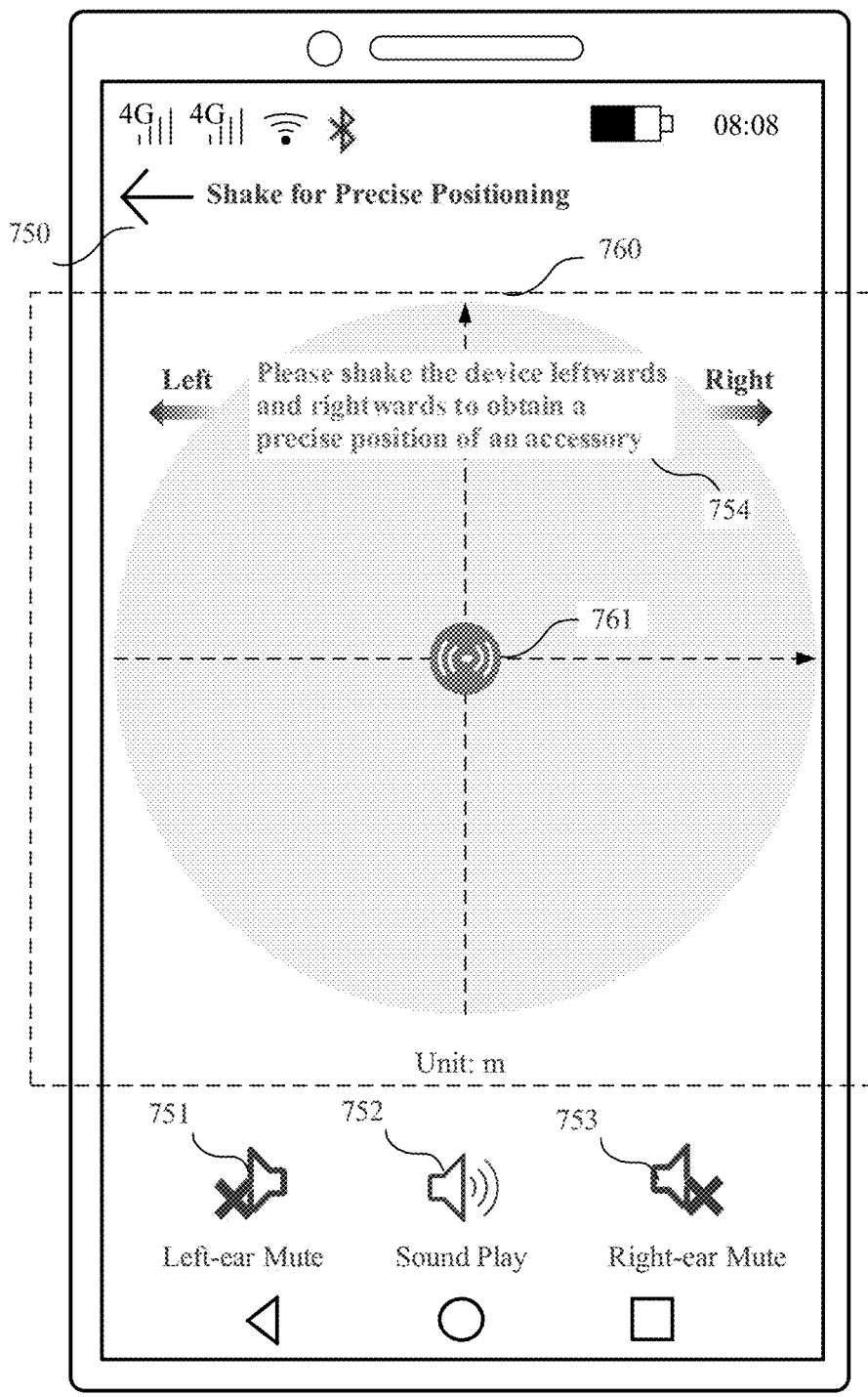

As shown in FIG. 7E, the precise positioning interface 750 may include a coordinate graph 760, a left-ear mute control element 751, a sound play control element 752, and a right-ear mute control element 753. A central location of the coordinate graph 760 may have a position mark 761 corresponding to the terminal 100. The terminal 100 may further display an operation prompt 754 on the precise positioning interface 750. The operation prompt 754 may be used to prompt the user to complete a specified operation, to assist the terminal 100 in completing accessory positioning by using the BLUETOOTH. The operation prompt 754 may be a text prompt (for example, "Please shake the device leftwards and rightwards to obtain a precise position of the accessory"), a picture prompt, a sound prompt, or the like.

The terminal 100 may receive and respond to an operation of moving leftwards and rightwards by the user, position the accessory device by using the BLUETOOTH, and display position information of the accessory device in the coordinate graph 760.

Figure 7F:
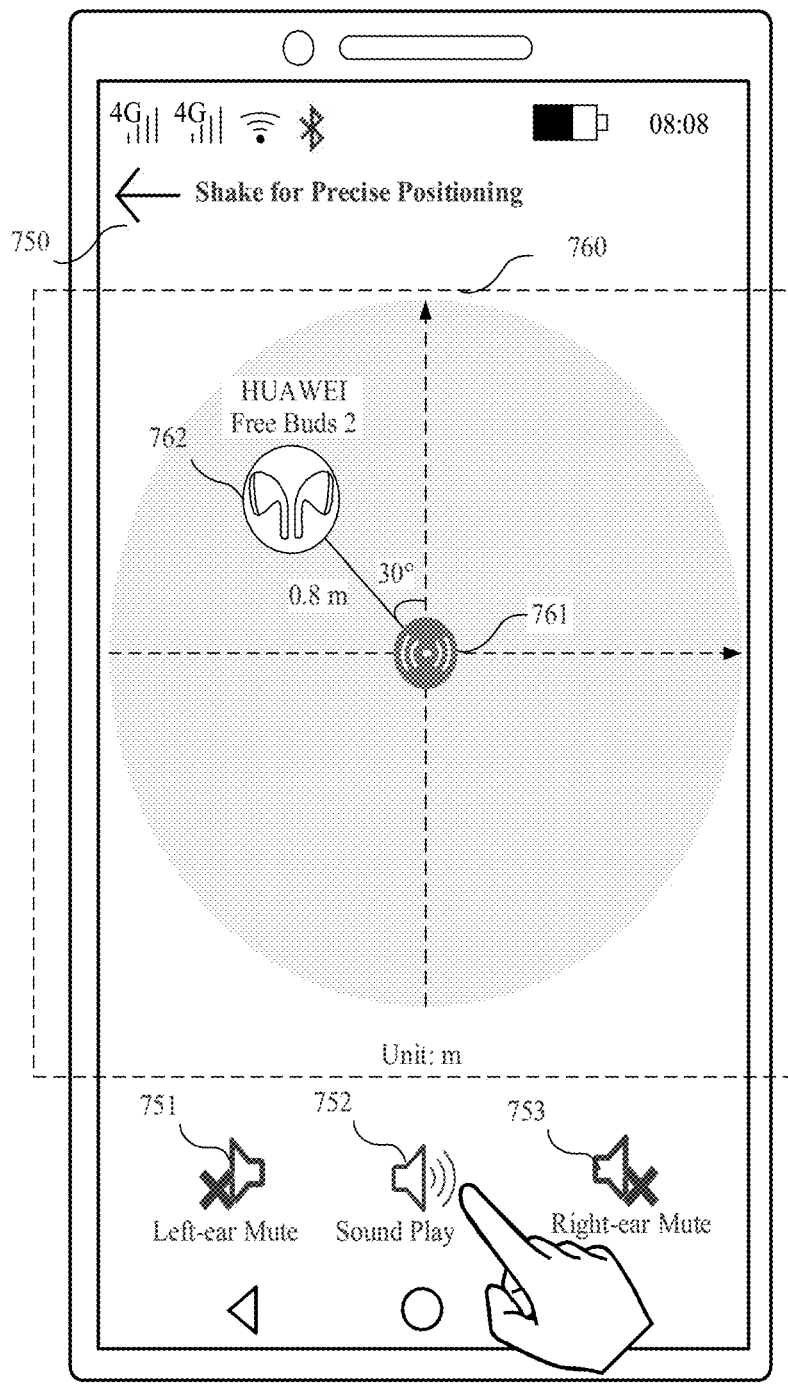

As shown in FIG. 7F, after determining the position of the accessory device by using the BLUETOOTH, the terminal 100 may display a position mark 762 of the accessory device in the coordinate graph 760, and display the position information of the accessory device relative to the terminal 100 around the position mark 762 (for example, the accessory device is 0.8 m away from the terminal 100 in a direction of 30° left of the front of the terminal 100).

In some embodiments, the terminal 100 may further send a sound play request to the accessory device by using BLE broadcast, to request the accessory device to play a sound. In this way, the user can locate the accessory device by listening to the sound, and quickly find a position of the accessory device.

For example, as shown in FIG. 7F, the terminal 100 may receive an operation (for example, tapping) performed by the user on the sound play control element 752. In response to the operation, the terminal 100 may send the sound play request to the accessory device (for example, a BLUETOOTH headset). The accessory device (for example, a BLUETOOTH headset) may play a specified sound (for example, a piece of music or a piece of voice) in response to the sound play request.

Figure 7G:
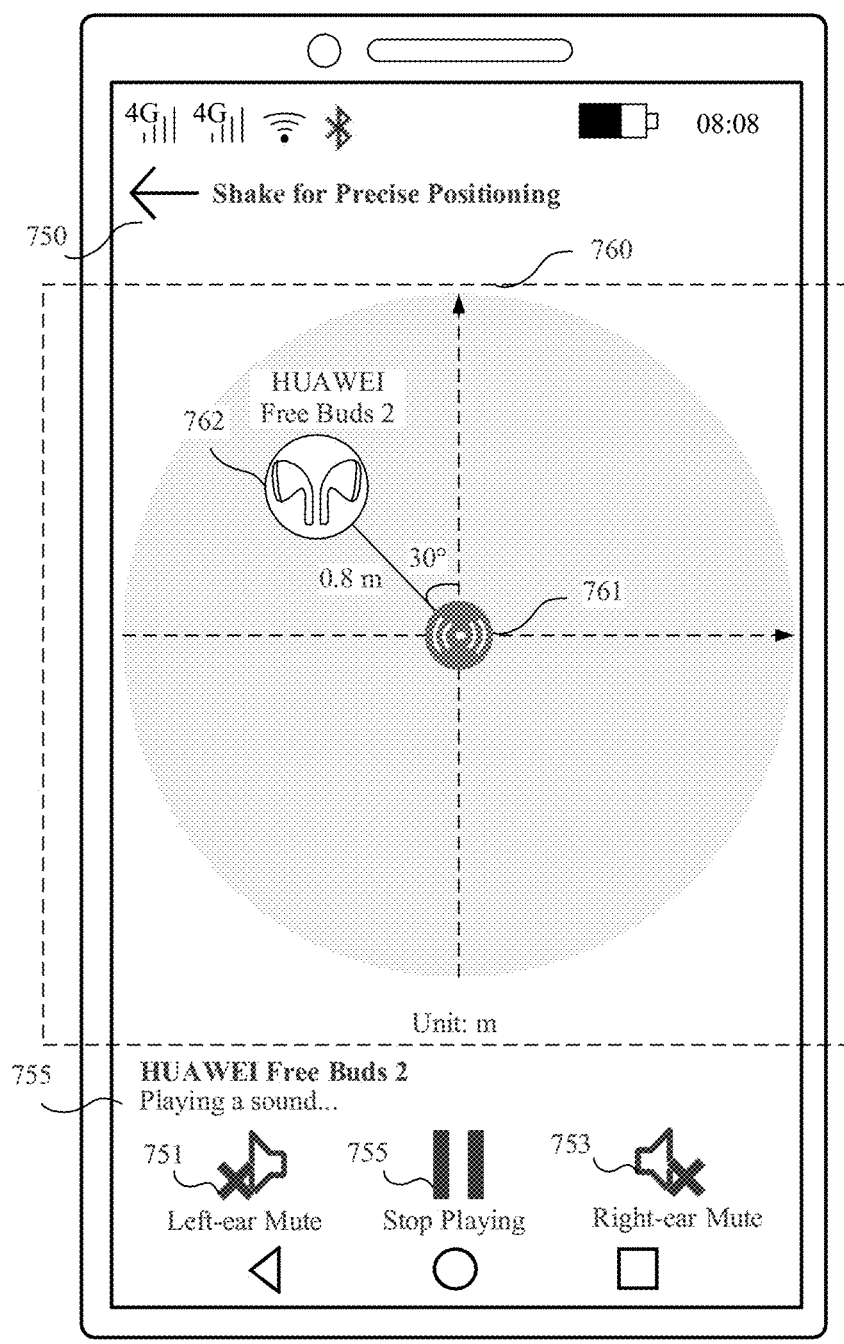

As shown in FIG. 7G, after receiving the sound play request, the accessory device (for example, a BLUETOOTH headset) may return a sound play response to the terminal 100. After receiving the sound play response, the terminal 100 may display prompt information 755, and replace the sound play control element 752 with a stop play control element 754 for display. The prompt information 755 may be used to prompt the user that the accessory device is currently playing a sound. The prompt information 755 may be a text prompt, for example, "HUAWEI Free Buds 2 is playing a sound . . . ." The prompt information 755 is not limited thereto. The prompt information 755 may also be a prompt of another type such as a picture or a sound. The stop play control element 754 is configured to trigger the terminal 100 to send a play stop request to the accessory device (for example, a BLUETOOTH headset), to request the accessory device (for example, the BLUETOOTH headset) to stop playing the sound.

In some embodiments, the accessory device may be a BLUETOOTH headset. BLUETOOTH headsets of some types (for example, a True Wireless Stereo (TWS) type) may include a left-ear headset and a right-ear headset, and the left-ear headset and the right-ear headset are separated in a mechanical structure. The terminal 100 may control, through BLUETOOTH Low Energy broadcast, the BLUETOOTH headset to play a sound only by using the left-ear headset or play a sound only by using the right-ear headset. For example, the terminal 100 may receive an operation (for example, tapping) performed by the user on the left-ear mute control element 751. In response to the operation, the terminal 100 may send a left-ear mute request to the BLUETOOTH headset. After receiving the left-ear mute request, the BLUETOOTH headset may prohibit the left-ear headset from playing a sound. The terminal 100 may receive an operation (for example, tapping) performed by the user on the right-ear mute control element 753. In response to the operation, the terminal 100 may send a right-ear mute request to the BLUETOOTH headset. After receiving the right-ear mute request, the BLUETOOTH headset may prohibit the right-ear headset from playing a sound. In this way, the user can conveniently find a single left-ear headset or right-ear headset.

The following describes a software system architecture provided in an embodiment of this disclosure.

Figure 8:
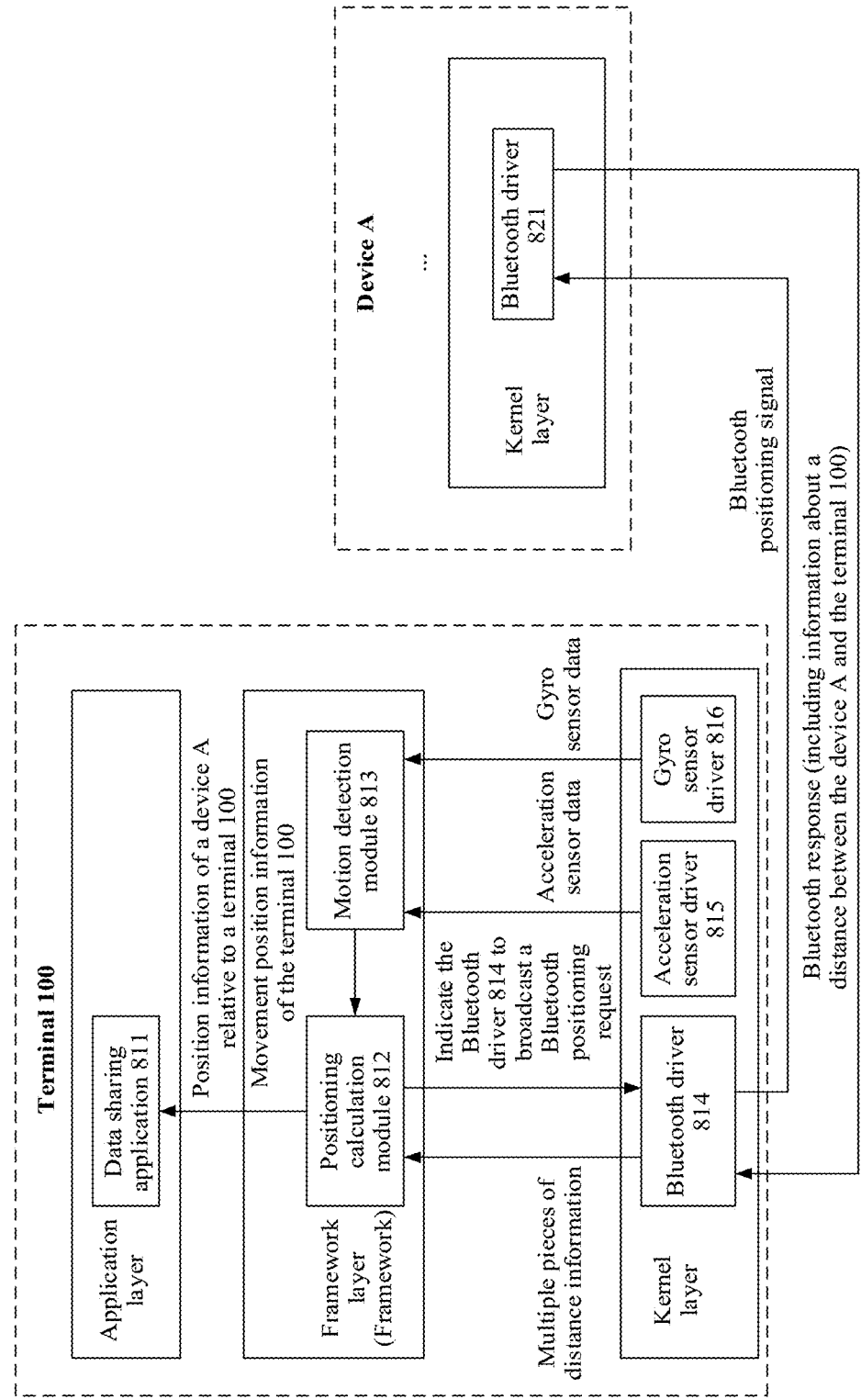
FIG. 8 is a schematic diagram of a software frame of a system according to an embodiment of this disclosure.

Refer to FIG. 8. FIG. 8 is a schematic diagram of a software system architecture according to an embodiment of this disclosure. The software system may include the terminal 100 and one or more nearby devices. In the embodiment shown in FIG. 8, one nearby device (for example, a device A) is used as an example for description.

As shown in FIG. 8, the terminal 100 may include an application layer, a framework layer (Framework), and a kernel layer.

The application layer may include a series of applications. For example, the applications may include applications such as a data sharing application 811 (for example, "HUAWEI Share"), a Camera application, a Gallery application, a Calendar application, a Call application, a Map application, a Navigation application, a WLAN application, a BLUETOOTH application, a Music application, a Video application, and a Messages application.

The framework layer provides an application programming interface (API) and a programming framework for the applications at the application layer. The application framework layer includes some predefined functions. The framework layer may include a positioning calculation module 812 and a motion detection module 813.

The kernel layer is a layer between hardware and software. The kernel layer includes at least a BLUETOOTH driver 814, an acceleration sensor driver 815, a display driver (not shown in the figure), and an audio driver (not shown in the figure).

The following describes a working process of the software system as an example with reference to a data sharing scenario.

When the terminal 100 receives an operation of moving the terminal 100 leftwards and rightwards by a user, an acceleration sensor on the terminal 100 may report acceleration data to the acceleration sensor driver 815, and the acceleration sensor driver 815 may report the acceleration data to the motion detection module 813. A gyro sensor may send gyro data to the gyro sensor driver 816. The gyro sensor driver 816 may report the gyro data to the motion detection module 813. The motion detection module 813 may determine position information of the terminal 100 in a moving process based on the acceleration data and the gyro data, and send the position information of the terminal 100 in the moving process to the positioning calculation module 812. The positioning calculation module 812 may indicate the BLUETOOTH driver 814 to broadcast a BLUETOOTH positioning signal for more than three times, and record a position of the terminal 100 in the moving process each time the terminal 100 broadcasts the BLUETOOTH positioning signal.

The BLUETOOTH driver 814 may indicate a BLUETOOTH module (not shown in the figure) to broadcast the BLUETOOTH positioning signal for three or more times. After receiving the BLUETOOTH positioning signal broadcast by the terminal 100, a BLUETOOTH module of the device A may report the BLUETOOTH positioning signal to a BLUETOOTH driver 821 of the device A. The device A may calculate a distance between the device A and the terminal 100 based on signal strength of the received BLUETOOTH positioning signal, and indicate, by using the BLUETOOTH driver 821, the BLUETOOTH module of the device A to return a BLUETOOTH response to the terminal 100. The BLUETOOTH response includes information about the distance between the device A and the terminal 100. The BLUETOOTH driver 814 on the terminal 100 may report, to the positioning calculation module 812, a plurality of pieces of information about the distance between the device A and the terminal 100 that are received by the BLUETOOTH module.

The positioning calculation module 812 may calculate position information of the device A relative to the terminal 100 based on the positions that are of the terminal 100 and at which the BLUETOOTH positioning signal is sent each time and the plurality of pieces of information about the distance between the device A and the terminal 100. The positioning calculation module 812 may report the position information of the device A relative to the terminal 100 to an upper-layer application (for example, the data sharing application 811). The data sharing application 811 may display the position information of the device A relative to the terminal 100.

In a possible implementation, the BLUETOOTH driver 821 on the device A may directly send, to the BLUETOOTH driver 814 of the terminal 100, the received signal strength value when the BLUETOOTH positioning signal is received, and the BLUETOOTH driver 814 sends the received signal strength value to the positioning calculation module 812. The positioning calculation module 812 calculates the information about the distance between the device A and the terminal 100 based on the received signal strength value.

In a possible implementation, the BLUETOOTH driver 814 sends, to the positioning calculation module 812, signal strength values of BLUETOOTH signals broadcast by the device A and received at two or more positions in the moving process of the terminal 100. The positioning calculation module 812 may calculate the distance between the device A and the terminal 100 based on the received signal strength value of the BLUETOOTH signal broadcast by the device A.

The following describes how to position the nearby device by using the BLUETOOTH in a process in which the terminal 100 is moved leftwards and rightwards by the user in this embodiment of this disclosure.

Figure 9A:
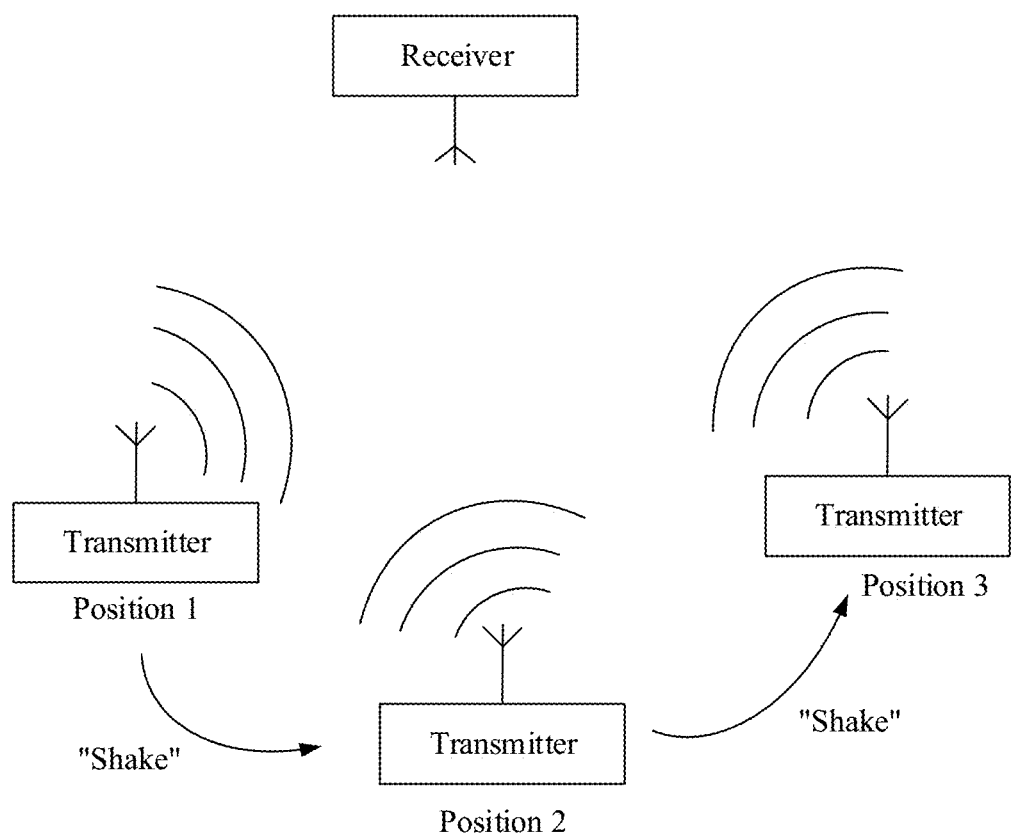
FIG. 9A is a schematic diagram of a principle of BLUETOOTH positioning according to an embodiment of this disclosure.

Refer to FIG. 9A. FIG. 9A is a principle diagram of BLUETOOTH positioning according to an embodiment of this disclosure. As shown in FIG. 9A, the transmitter may be a BLUETOOTH signal transmitter, and the transmitter may be integrated into the terminal 100. The receiver may be a BLUETOOTH signal receiver, and the receiver may be integrated into the terminal 101, the terminal 102, and the terminal 103. In FIG. 9A, an example in which the terminal 100 sends BLUETOOTH positioning signals at three different positions is used to describe a BLUETOOTH positioning principle provided in this disclosure.

1. In a shaking process of the terminal 100, the transmitter may send a BLUETOOTH positioning signal to a surrounding device through BLE or BR/EDR from three different positions (for example, a position 1, a position 2, and a position 3). After receiving a BLUETOOTH positioning request sent by the transmitter, the receiver of the nearby device may detect a signal strength value of the received BLUETOOTH positioning signal, and determine distances (that is, distances between the terminal 100 and the nearby device) between the transmitter and the receiver at the three positions based on the signal strength values at the three different positions, and returns values of the three distances to the terminal 100.

A calculation formula for calculating the distance based on the signal strength value may be shown in the following formula (1):

$$d = 10^{\frac{|RSSI|-A}{10n}} \qquad \text{Formula (1)}$$

In the foregoing formula (1), d is a calculated distance value, RSSI is a received signal strength value, A is a signal strength value when a distance between the transmitter and the receiver is 1 meter, and n is a preset environment attenuation factor.

2. After calculating the distance between the nearby device and the terminal 100, the nearby device (the terminal 101, the terminal 102, or the terminal 103) may return the values of distances between the terminal 100 and the nearby device at the three positions to the terminal 100.

3. After receiving the distance information of the three positions returned by the nearby device, the terminal 100 may determine the position of the nearby device based on the values of the three distances and the information about the three positions at which the terminal 100 sends the BLUETOOTH positioning signal.

Figure 9B:
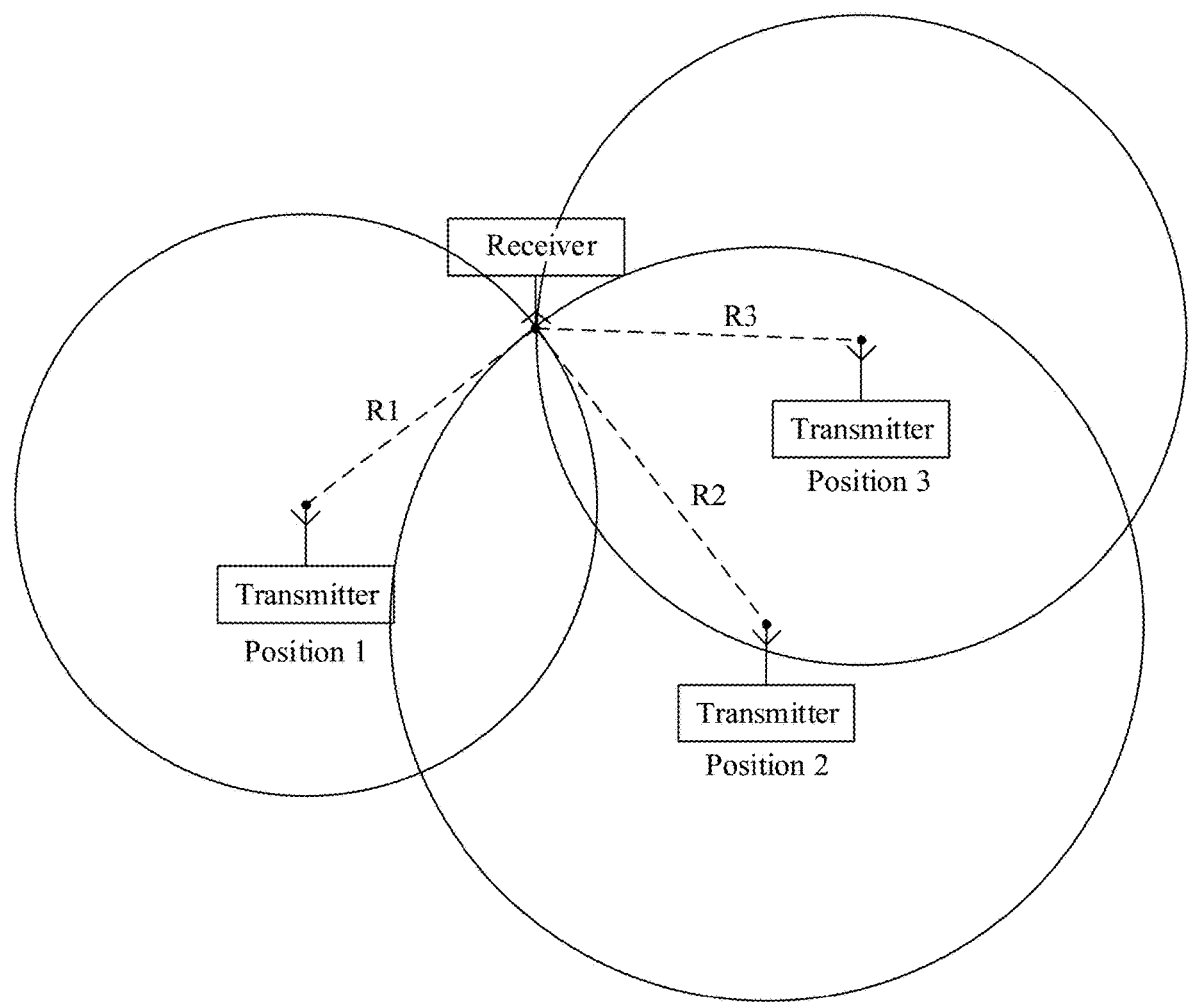
FIG. 9B is a schematic diagram of a principle of determining a position of a nearby device based on distances between three positions according to an embodiment of this disclosure.

FIG. 9B is a schematic diagram of a principle of determining a position of a nearby device based on distances between three positions according to an embodiment of this disclosure. As shown in FIG. 9B, the three positions at which the transmitter of the terminal 100 sends the BLUETOOTH positioning signal are used as centers of circles, and distance values corresponding to the positions are radiuses. Three circles are draw, the three circles may intersect at one point, and an intersection point of the three circles may be the position of the nearby device.

The following describes a procedure of a device positioning method provided in this disclosure.

Figure 10:
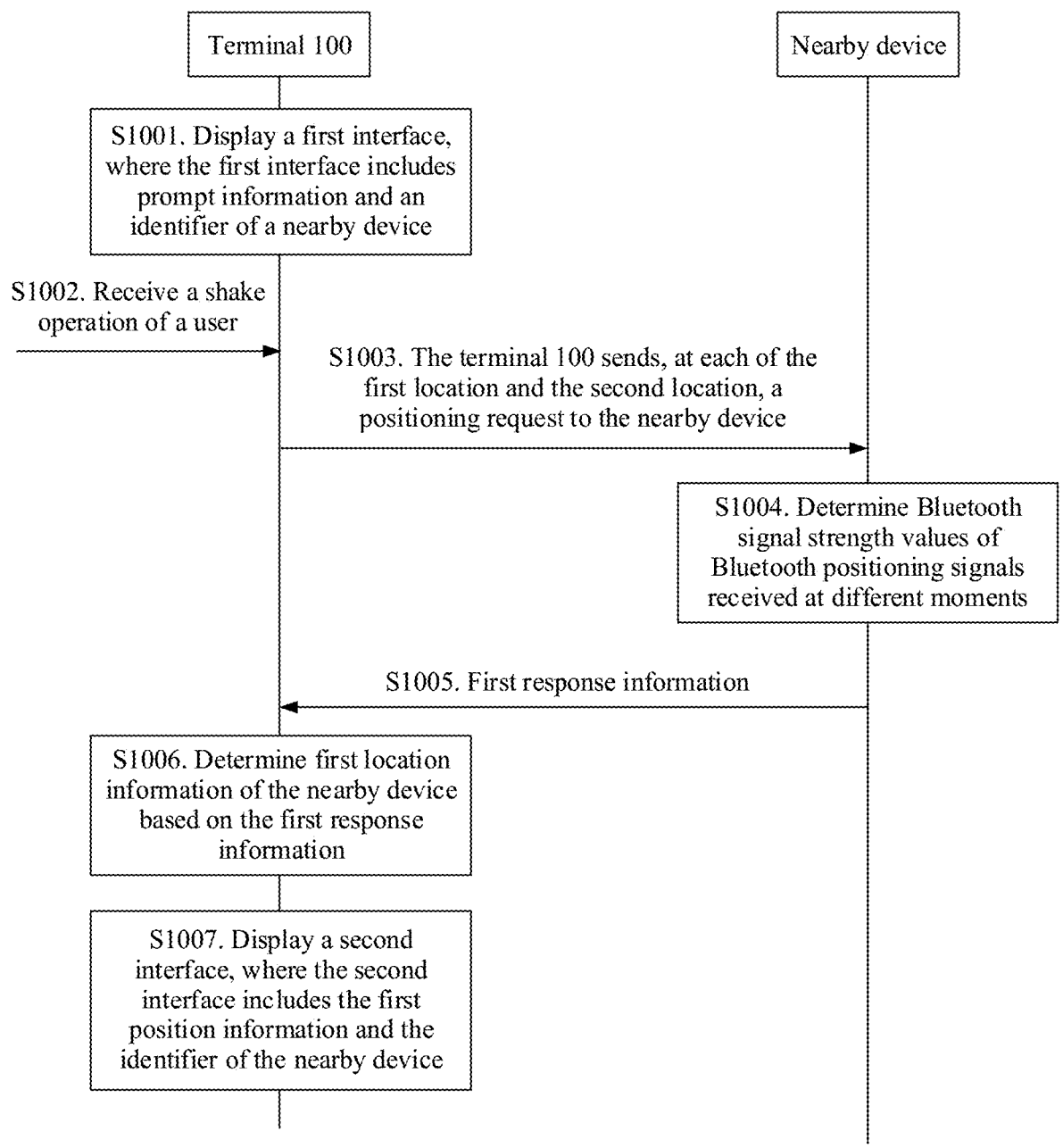
FIG. 10 is a flowchart of a device positioning method according to an embodiment of this disclosure.

Refer to FIG. 10. FIG. 10 is a flowchart of a device positioning method. Devices in the method flowchart include the terminal 100 (which may be referred to as a first electronic device) and a nearby device (which may be referred to as a second electronic device or a third electronic device). The nearby device may be any one of the terminal 101, the terminal 102, or the terminal 103 shown in FIG. 4. The nearby device may also be the BLUETOOTH device or the accessory device in the foregoing embodiments. For example, for positions of the terminal 100, the terminal 101, the terminal 102, and the terminal 103, refer to the system architecture shown in FIG. 4.

As shown in FIG. 10, the method includes the following steps.

S1001. The terminal 100 displays a first interface. The first interface includes prompt information and an identifier of the nearby device.

The prompt information may be used to prompt a user to shake the terminal 100. The identifier of the nearby device may be a device name or a device model (for example, "HUAWEI P40").

The first interface may be the foregoing data sharing interface, BLUETOOTH connection interface, BLUETOOTH device setting interface, or device searching interface.

When the first interface is the data sharing interface, the data sharing interface may display a file object selected by the user, the identifier of the nearby device, and the prompt information.

For example, the file object may be a file object such as a picture, a video, or a document. For the data sharing interface, refer to the picture sharing interface 550 shown in FIG. 5E. For specific content, refer to the foregoing embodiments. Details are not described herein again.

When the first interface is the BLUETOOTH connection interface, for example, for the BLUETOOTH connection interface, refer to the BLUETOOTH connection interface 640 shown in FIG. 6F. For specific content, refer to the foregoing embodiments. Details are not described herein again.

For the BLUETOOTH device setting interface, refer to the BLUETOOTH device setting interface 670 shown in FIG. 6J. Details are not described herein again.

For the device searching interface, refer to the foregoing precise positioning interface 750 shown in FIG. 7E. Details are not described herein again.

S1002. The terminal 100 may receive a shake operation of the user.

The shake operation may be that the user holds the terminal 100 and shakes the terminal 100 leftwards and rightwards, or may be that the user shakes the terminal 100 only to the left, or shakes the terminal 100 only to the right. A track of the shake operation may be a straight line, or may be a curve. This is not limited in this disclosure.

S1003. The terminal 100 sends a BLUETOOTH positioning signal to the nearby device by using BLUETOOTH separately at two or more positions, for example, a first position and a second position.

In a process in which the terminal 100 is shaken by the user, the terminal 100 may send a positioning request to the nearby device separately at two positions by using the BLUETOOTH. The terminal 100 may send the BLUETOOTH positioning signal to the nearby device by using BLE broadcast. When the terminal 100 establishes a BR/EDR connection to the nearby device, the terminal 100 may send the BLUETOOTH positioning signal to the nearby device by using classic BLUETOOTH.

S1004. The nearby device determines BLUETOOTH signal strength values of BLUETOOTH positioning signals received at different moments.

It may be understood that the nearby device receives, at a first moment, the BLUETOOTH positioning signal sent by the terminal 100 at the first position, and the nearby device receives, at a second moment, the BLUETOOTH positioning signal sent by the terminal 100 at the second position.

In a possible implementation, the nearby device determines, based on the BLUETOOTH signal strength values of BLUETOOTH positioning signals received at different moments, distances to BLUETOOTH positioning signal sending positions (for example, the first position and the second position) of the terminal 100.

For a process in which the nearby device calculates the distance based on the BLUETOOTH signal strength value, refer to the foregoing formula (1). Details are not described herein again.

S1005. The nearby device returns first response information to the terminal 100.

In a possible implementation, the first response information includes a distance between the nearby device and a position at which the positioning request of the terminal 100 is sent.

In a possible implementation, the first response information includes signal strength values of the two or more BLUETOOTH positioning signals received by the nearby device. After detecting the signal strength value of the received BLUETOOTH positioning signal, the nearby device may directly return the signal strength value of the received BLUETOOTH positioning signal to the terminal 100. The terminal 100 may calculate values of distances between each of the two or more positions and the nearby device according to the foregoing formula (1).

In a possible implementation, the nearby device may continuously broadcast a BLUETOOTH signal, and the terminal 100 may detect, separately at three positions, signal strength values of received BLUETOOTH signals broadcast by the nearby device. The terminal 100 may calculate, based on the signal strength values at the three positions and according to the foregoing formula (1), the values of the distances between the terminal 100 and the nearby devices at the three positions.

S1006. The terminal 100 determines first position information of the nearby device based on the response information.

The first position information of the nearby device includes a first direction and/or a first distance of the nearby device. The first direction is a direction of the nearby device relative to the terminal 100, and the first distance is a distance between the nearby device and the terminal 100.

Figure 11A:
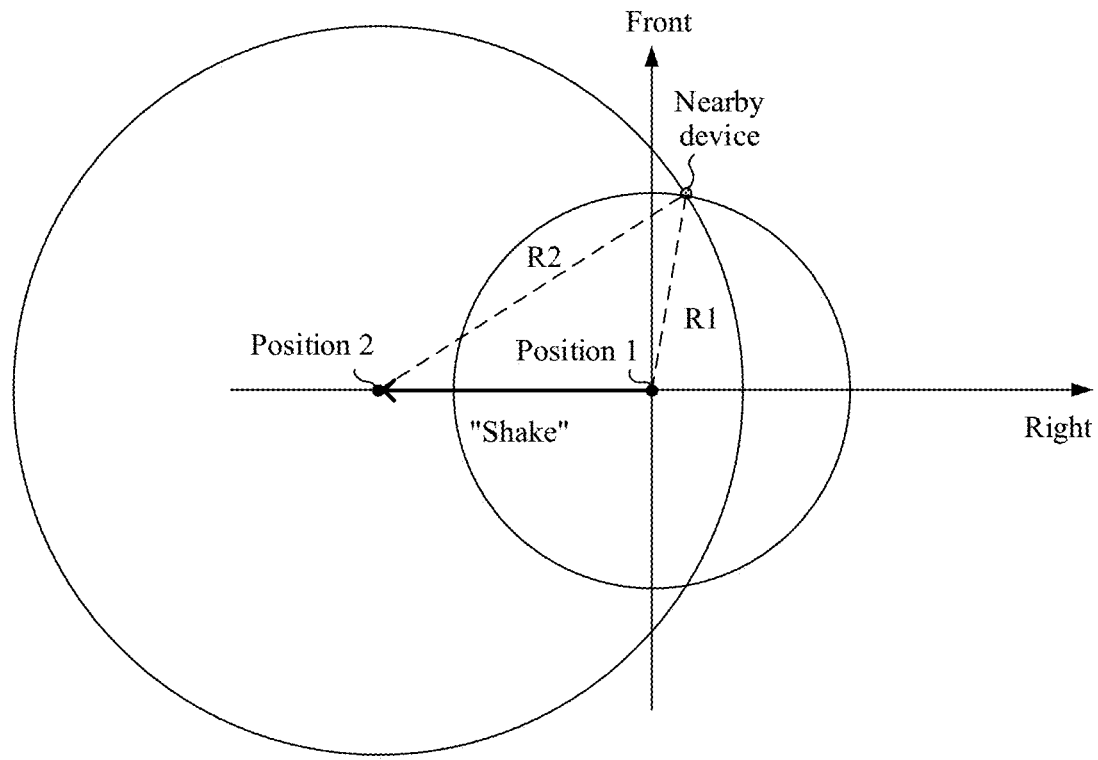
FIG. 11A is a schematic diagram of a principle of determining a position of a nearby device by sending positioning requests at two positions according to an embodiment of this disclosure.

As shown in FIG. 11A, the terminal 100 may establish a coordinate system by using the due front of the terminal 100 (that is, a 0° direction of the terminal 100 in the embodiment shown in FIG. 4) as a forward direction of a longitudinal axis, and using the due right of the terminal 100 (that is, a 90° direction of the terminal 100 in the embodiment shown in FIG. 4) as a forward direction of a transverse axis. A start position of shaking of the terminal 100 may be an origin of the coordinate system. In the process in which the terminal 100 is shaken by the user, the terminal 100 may send the BLUETOOTH positioning signal to the nearby device separately at a location point 1 and a location point 2. The terminal 100 may measure coordinates of the location point 1 and the location point 2 in the coordinate system based on the acceleration sensor and the gyro sensor. A distance between the terminal 100 at the location point 1 and the nearby device may be R1, and a distance between the terminal 100 at the location point 2 and the nearby device may be R2.

The terminal 100 may draw a circle in the coordinate system by using the location point 1 as a center and R1 as a radius, and the terminal 100 may draw a circle in the coordinate system by using the location point 2 as a center and R2 as a radius. There are two intersection points of the two circles. The terminal 100 may use an intersection point located in front of the terminal 100 (that is, in the forward direction of the longitudinal axis in the coordinate system) as a location point of the nearby device. Because the terminal 100 has measured the coordinates of the location point 1 and the location point 2, the terminal 100 can calculate coordinates of the intersection point of the two circles (that is, coordinates of the nearby device). Then, the terminal 100 may calculate a distance and a direction (that is, position information of the nearby device) of the nearby device relative to the origin of the coordinate system based on the coordinates of the intersection points of the two circles.

Figure 11B:
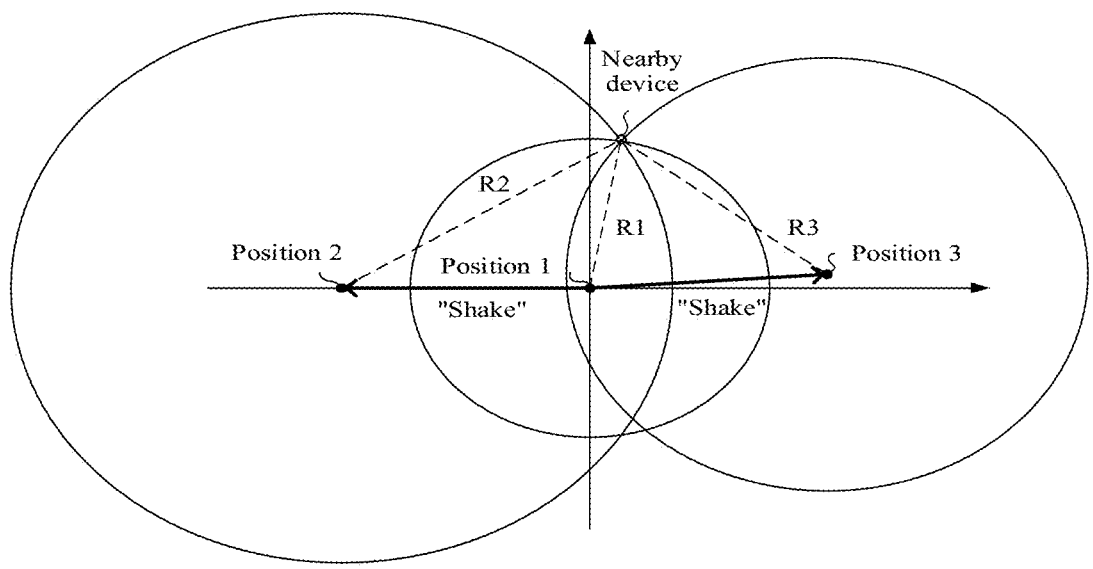
FIG. 11B is a schematic diagram of a principle of determining a position of a nearby device by sending positioning requests at three positions according to an embodiment of this disclosure.

As shown in FIG. 11B, the terminal 100 may establish a coordinate system by using the due front of the terminal 100 (that is, a 0° direction of the terminal 100 in the embodiment shown in FIG. 4) as a forward direction of a longitudinal axis, and using the due right of the terminal 100 (that is, a 90° direction of the terminal 100 in the embodiment shown in FIG. 4) as a forward direction of a transverse axis. A start position of shaking of the terminal 100 may be an origin of the coordinate system. In a process in which the terminal 100 is shaken, the terminal 100 may send the BLUETOOTH positioning signal to the nearby device separately at the location point 1, the location point 2, and a location point 3. The terminal 100 may measure coordinates of the location point 1, the location point 2, and the location point 3 in the coordinate system based on the acceleration sensor and the gyro sensor. The distance between the terminal 100 at the location point 1 and the nearby device may be R1, the distance between the terminal 100 at the location point 2 and the nearby device may be R2, and a distance at the location point 3 between the terminal 100 and the nearby device may be R3.

The terminal 100 may draw a circle in the coordinate system by using the location point 1 as a center and R1 as a radius. The terminal 100 may draw a circle in the coordinate system by using the location point 2 as a center and R2 as a radius. The terminal 100 may draw a circle in the coordinate system by using the location point 3 as a center and R3 as a radius. Intersection point of the three circles is a location of the nearby device in the coordinate system. Because the terminal 100 has measured the coordinates of the location point 1, the coordinates of the location point 2, and coordinates of the location point 3, the terminal 100 can calculate coordinates of the intersection point of the three circles (that is, coordinates of the nearby device). Then, the terminal 100 may calculate the distance and the direction (that is, the position information of the nearby device) of the nearby device relative to the origin of the coordinate system based on the coordinates of the intersection point of the three circles.

In a possible implementation, the start position at which the terminal 100 is shaken may be another point other than the origin of the coordinate system. For example, in the process in which the terminal 100 is shaken, the terminal 100 may sequentially send the BLUETOOTH positioning signal to the nearby device at the location point 2, the location point 1, and the location point 3. Alternatively, the BLUETOOTH positioning signal is sequentially sent to the nearby device at the location point 3, the location point 1, and the location point 2. Alternatively, the BLUETOOTH positioning signal is sequentially sent to the nearby device at the location point 2, the location point 3, and the location point 1.

In a possible implementation, when a track of shaking the terminal 100 is a strict straight line, the foregoing three circles may intersect at two points, and the terminal 100 may use an intersection point in a first quadrant or a second quadrant in the coordinate system as the location point of the nearby device. Alternatively, the terminal 100 may output a prompt to prompt the user to shake the mobile phone again, to reposition the nearby device by using the BLUETOOTH.

S1007. The terminal 100 displays a second interface, and the second interface includes the first position information and an identifier of the BLUETOOTH device.

When the first interface is the data sharing interface (for example, the picture sharing interface), as shown in FIG. 5F, the terminal 100 may display the position information of the nearby device on the picture sharing interface 550. For example, the nearby device may be the terminal 101, the position information of the terminal 101 may be "30° left of the front distance 0.8 m", and a device name (that is, a device identifier) of the terminal 101 may be "HUAWEI P40".

In a possible implementation, when there are a plurality of nearby devices around the terminal 100, for example, there are the terminal 101, the terminal 102, and the terminal 103, the terminal 100 may display an identifier of a third electronic device in the plurality of BLUETOOTH devices at a specified location (for example, on a leftmost side of the second interface). The third electronic device is closest to the first position or the last position at which the BLUETOOTH positioning signal is sent.

In a possible implementation, when there is the plurality of nearby devices around the terminal 100, for example, there are the terminal 101, the terminal 102, and the terminal 103, the terminal 100 may mark a preferred nearby device.

Figure 12A:
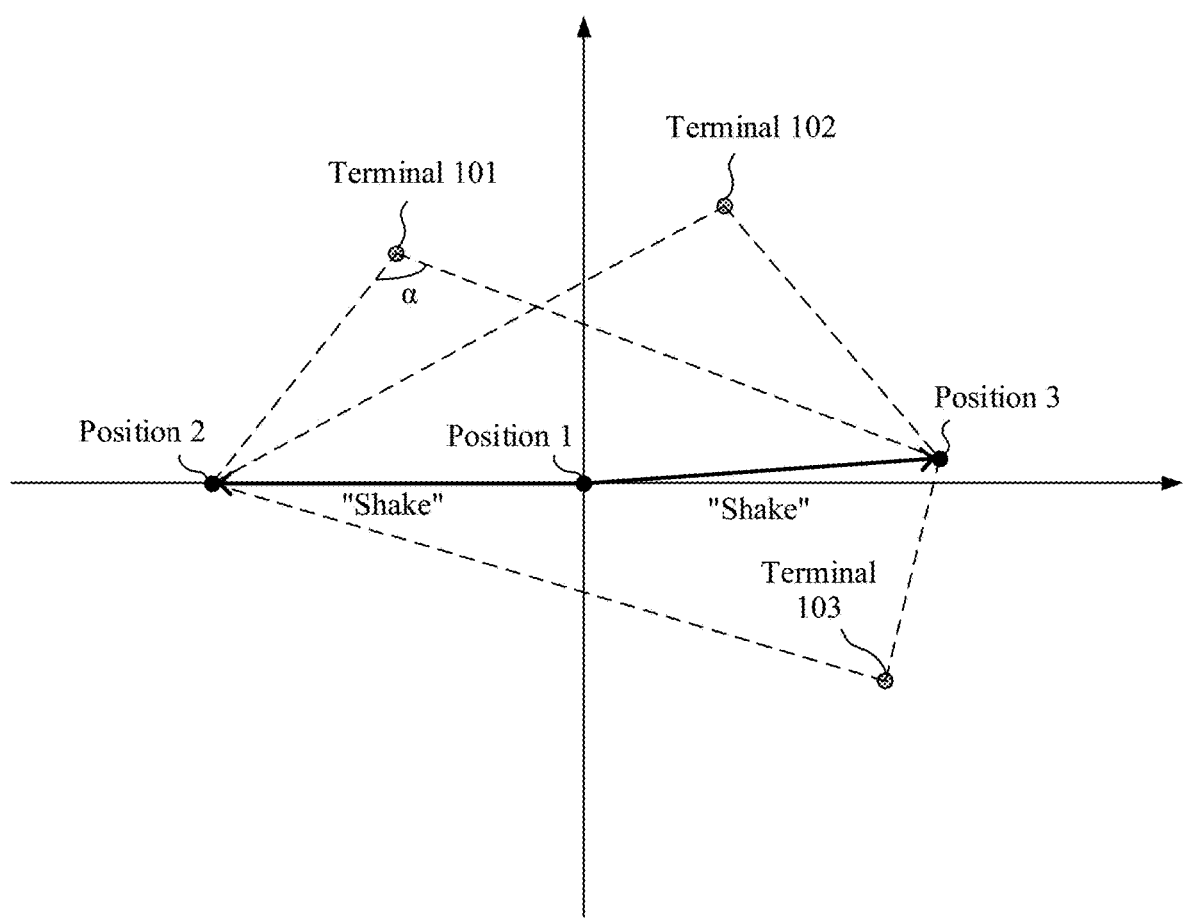
FIG. 12A is a schematic diagram of a principle of determining a preferred device through bidirectional shaking according to an embodiment of this disclosure.

For example, when the terminal 100 detects that the shake operation of the user is a left-right shake, the terminal 100 may use a device closest to the due front of the terminal 100 as the preferred device. As shown in FIG. 12A, the nearby devices around the terminal 100 may include the terminal 101, the terminal 102, and the terminal 103. The terminal 100 may use a nearby device with a largest included angle α as the preferred device. The included angle α may be an included angle of two straight lines formed by a location point of the nearby device and two other location points that are relatively far away from each other. For example, the included angle α of the terminal 101 is an included angle between a straight line on which the location point 2 and a location of the terminal 101 are located and a straight line on which the location point 3 and the location of the terminal 101 are located. A nearby device with a largest included angle α is closest to the due front of the terminal 100. For example, if the included angle α of the terminal 101 is the largest, the terminal 100 may mark, on the data sharing interface, a device option corresponding to the terminal 101 as a preferred device option.

Figure 12B:
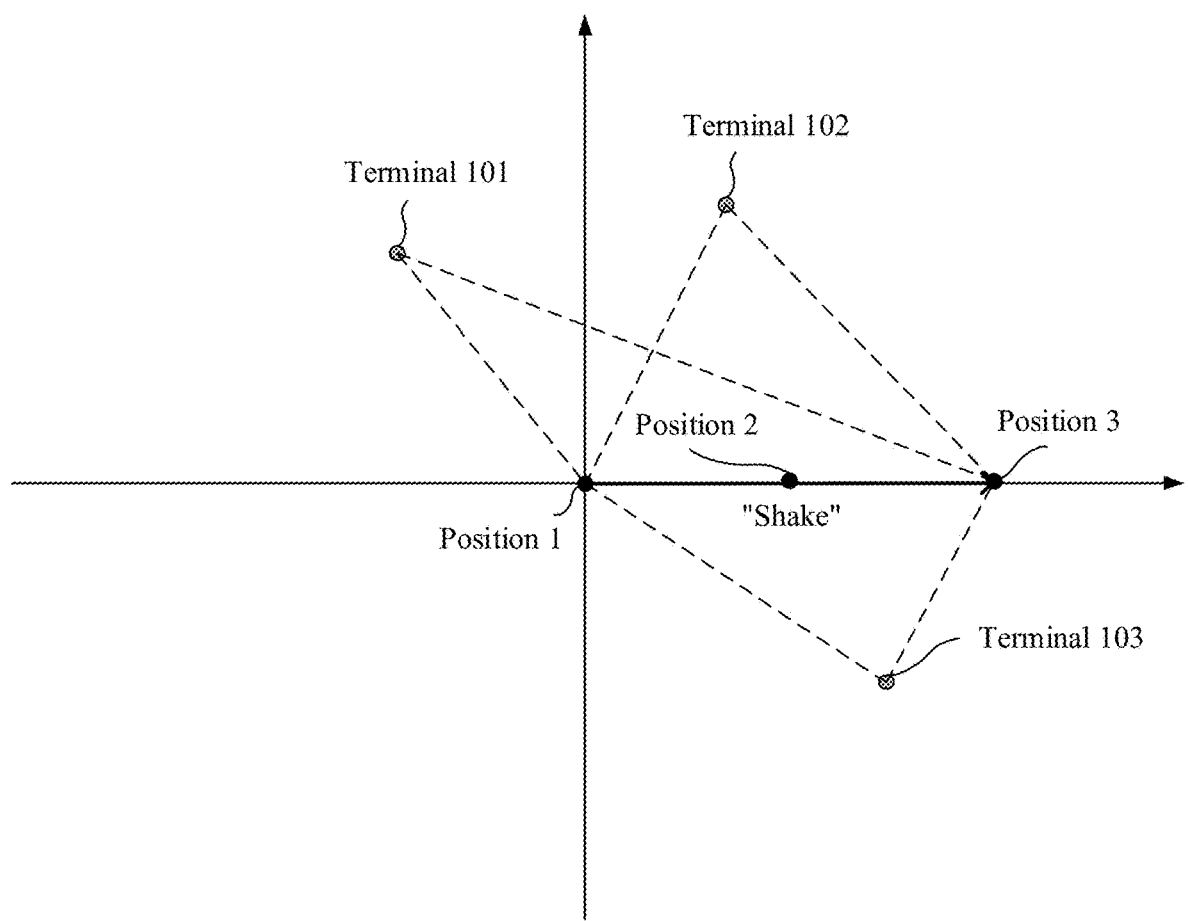
FIG. 12B is a schematic diagram of a principle of determining a preferred device through unidirectional shaking according to an embodiment of this disclosure.

For another example, when the terminal 100 detects that the shake operation of the user is a unidirectional left shake or a unidirectional right shake, the terminal 100 may use a device whose shake operation direction is farthest or closest to the start position as the preferred device. As shown in FIG. 12B, the nearby devices around the terminal 100 may include the terminal 101, the terminal 102, and the terminal 103. The terminal 100 may detect that the shake operation of the user is a unidirectional right shake, that is, send the BLUETOOTH positioning signal to the nearby device sequentially at the location point 1, the location point 2, and the location point 3. If the terminal 103 is at the rightmost side of the terminal 100, the terminal 100 may mark, on the data sharing interface, a device option corresponding to the terminal 103 as the preferred device option.

When the first interface is the BLUETOOTH connection interface, as shown in FIG. 6G, the terminal 100 may display the position information of the BLUETOOTH device relative to the terminal 100 on a device option corresponding to the BLUETOOTH device in the BLUETOOTH connection interface 640. For specific content, refer to the foregoing embodiment shown in FIG. 6G. Details are not described herein again.

When the first interface is the device searching interface, as shown in FIG. 7F, after determining the position of the accessory device by using the BLUETOOTH, the terminal 100 may display the position mark 762 of the accessory device in the coordinate graph 760, and display the position information of the accessory device relative to the terminal 100 around the position mark 762 (for example, the accessory device is 0.8 m away from the terminal 100 in a direction of 30° left of the front of the terminal 100). For specific content, refer to the embodiment shown in FIG. 7F. Details are not described herein again.

In some embodiments, when the first interface is the foregoing data sharing interface, the terminal 100 may receive a selection operation performed by the user for the nearby device. For example, the selection operation may be an input operation (for example, tapping) of the user for the device option 561 in the embodiment shown in FIG. 5F. The terminal 100 sends the data sharing request to the nearby device. The terminal 100 establishes the data transmission connection to the nearby device. The data transmission connection may be a communication connection such as WI-FI P2P, WI-FI SoftAP, or UWB. After the receiving device establishes the file transfer connection to the terminal 100, the terminal 100 may transmit the file data selected by the user to the nearby device.

In a possible implementation, when the first interface is the foregoing data sharing interface, if the terminal 100 finds, by using the BLUETOOTH, only one nearby device around the terminal 100, the terminal 100 may determine position information of the nearby device relative to the terminal 100 in response to the shake operation of the user, display the position information on the data sharing interface, and establish the data transmission connection to the nearby device.

According to the device positioning method provided in this disclosure, before a user selects a nearby device that needs to be connected, a terminal may prompt the user to move the terminal leftwards and rightwards. Then, the terminal may send a BLUETOOTH positioning signal to the nearby device by using BLUETOOTH at two or more positions in a moving process, and receive a distance value calculated by the nearby device based on a signal strength value of a received BLUETOOTH positioning signal. Then, the terminal 100 determines a position of the nearby device relative to the terminal 100 based on information of the two or more positions and information about a distance between the terminal 100 and the nearby device, and outputs the position of the nearby device to the user. In this way, when sharing data, the user can accurately select a receiving device that needs to be connected for sharing, thereby providing convenience for the user.

In conclusion, the foregoing embodiments are merely intended for describing the technical solutions of this disclosure, but not for limiting this disclosure. Although this disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this disclosure.

What is claimed is:

1. A device positioning method implemented by a first electronic device, wherein the device positioning method comprises:
    displaying a first interface, wherein the first interface comprises first prompt information and a first identifier of a second electronic device, and wherein the first prompt information prompts a user to shake the first electronic device;
    detecting a shake operation performed on the first electronic device;
    sending, in response to the shake operation and at each of a first position and a second position, a BLUETOOTH positioning signal to the second electronic device;
    receiving, in response to sending the BLUETOOTH positioning signal, first response information from the second electronic device;
    determining, based on the first response information, first position information of the second electronic device, wherein the first position information comprises a first direction of the second electronic device or a first distance of the second electronic device, and wherein the first distance is between the first electronic device and the second electronic device; and displaying a second interface, wherein the second interface comprises the first position information and the first identifier.

2. The device positioning method of claim 1, wherein receiving the first response information comprises:

receiving, in response to sending the BLUETOOTH positioning signal to the second electronic device at the first position, a first signal strength value of the BLUETOOTH positioning signal from the second electronic device; and receiving, in response to sending the BLUETOOTH positioning signal to the second electronic device at the second position, a second signal strength value of the BLUETOOTH positioning signal from the second electronic device, and wherein determining the first position information comprises:

determining, based on the first signal strength value, a second distance between the second electronic device and the first position;

determining, based on the second signal strength value, a third distance between the second electronic device and the second position; and determining, based on the second distance, the third distance, the first position, and the second position, the first position information.

3. The device positioning method of claim 1, wherein receiving the first response information comprises:

receiving, from the second electronic device, a second distance that is between the second electronic device and the first position; and receiving a third distance that is between the second electronic device and the second position, and wherein determining the first position information comprises determining, based on the second distance, the third distance, the first position, and the second position, the first position information.

4. The device positioning method of claim 1, further comprising sending, at a third position, the BLUETOOTH positioning signal to the second electronic device, wherein the first position, the second position, and the third position are not in a straight line, and wherein receiving the first response information comprises:

receiving, in response to sending the BLUETOOTH positioning signal at the first position, a first response from the second electronic device;

receiving, in response to sending the BLUETOOTH positioning signal at the second position, a second response from the second electronic device; and receiving, in response to sending the BLUETOOTH positioning signal at the third position, a third response from the second electronic device.

5. The device positioning method of claim 1, wherein the first interface is a data sharing interface, and wherein the data sharing interface comprises a file object from the user, the first identifier, and the first prompt information.

6. The device positioning method of claim 5, further comprising:

detecting a first operation of selecting the second electronic device;

establishing, in response to the first operation, a data transmission connection to the second electronic device; and sending, by using the data transmission connection, the file object to the second electronic device.

7. The device positioning method of claim 5, further comprising:

establishing, in response to the shake operation, a data transmission connection to the second electronic device; and sending, by using the data transmission connection, the file object to the second electronic device.

8. The device positioning method of claim 1, wherein the first interface further comprises a second identifier of a third electronic device, wherein the device positioning method further comprises:

sending, in response to the shake operation and at each of the first position and the second position, the BLUETOOTH positioning signal to the third electronic device;

receiving second response information from the third electronic device; and determining, based on the second response information, second position information of the third electronic device, wherein the second position information comprises a second direction of the third electronic device or a second distance of the third electronic device, wherein the second distance is between the first electronic device and the third electronic device, and wherein the second interface further comprises the second position information and the second identifier.

9. The device positioning method of claim 8, wherein the third electronic device is closest among the second electronic device and the third electronic device to the first position, and wherein the device positioning method further comprises displaying the second identifier at a specified position of the second interface.

10. The device positioning method of claim 8, wherein the third electronic device is closest among the second electronic device and the third electronic device to the second position, and wherein the device positioning method further comprises displaying the second identifier at a specified position of the second interface.

11. The device positioning method of claim 1, wherein the first interface is a BLUETOOTH connection interface, and wherein the device positioning method further comprises:

detecting a first operation of selecting the second electronic device; and establishing, in response to the first operation, a BLUETOOTH connection to the second electronic device.

12. The device positioning method of claim 1, wherein the first interface is a BLUETOOTH device setting interface, and wherein the device positioning method further comprises establishing, by the first electronic device, a BLUETOOTH connection to the second electronic device.

13. The device positioning method of claim 1, wherein the first interface is an accessory search interface, wherein the accessory search interface comprises a sound play control element, wherein the device positioning method further comprises:

disconnecting a BLUETOOTH connection to the second electronic device;

detecting a first operation performed on the sound play control element; and sending, in response to the first operation, a sound play request to the second electronic device through BLUETOOTH Low Energy, and wherein the sound play request requests the second electronic device to play a preset sound.

14. The device positioning method of claim 1, wherein sending the BLUETOOTH positioning signal comprises:

broadcasting, at each of the first position and the second position, the BLUETOOTH positioning signal to the second electronic device through BLUETOOTH Low Energy when the first electronic device has not established a BLUETOOTH connection to the second electronic device;

broadcasting, at each of the first position and the second position, the BLUETOOTH positioning signal to the second electronic device through BLUETOOTH Low Energy; or sending the BLUETOOTH positioning signal to the second electronic device by using the BLUETOOTH connection when the first electronic device has established the BLUETOOTH connection to the second electronic device.

15. The device positioning method of claim 1, wherein determining the first position information comprises:

determining, based on the first response information, a second distance between the second electronic device and the first position and a third distance between the second electronic device and the second position;

determining a first circle by using the first position as a first circle center and by using the second distance as a first radius;

determining a second circle by using the second position as a second circle center and by using the third distance as a second radius; and determining, based on an intersection point of the first circle and the second circle, the first position information.

16. The device positioning method of claim 1, wherein the first prompt information prompts the user to shake the first electronic device from the first position to the second position.

17. The device positioning method of claim 16, further comprising:

displaying second prompt information, wherein the second prompt information prompts the user to shake the first electronic device from the second position to a third position; and sending, at the third position, the BLUETOOTH positioning signal to the second electronic device.

18. The device positioning method of claim 1, wherein before displaying the first interface, the device positioning method further comprises:

displaying a third interface, wherein the third interface comprises the first identifier;

detecting a first operation performed on the first identifier; and displaying, in response to the first operation, the first interface.

19. A first electronic device, comprising:

a memory configured to store instructions; and a processor coupled to the memory and configured to execute the instructions to cause the first electronic device to:

display a first interface, wherein the first interface comprises first prompt information and a first identifier of a second electronic device, and wherein the first prompt information prompts a user to shake the first electronic device;

detect a shake operation performed on the first electronic device;

send, in response to the shake operation and at each of a first position and a second position, a BLUETOOTH positioning signal to the second electronic device;

receive, in response to sending the BLUETOOTH positioning signal, first response information from the second electronic device;

determine, based on the first response information, first position information of the second electronic device, wherein the first position information comprises a first direction of the second electronic device or a first distance of the second electronic device, and wherein the first distance is between the first electronic device and the second electronic device; and display a second interface, wherein the second interface comprises the first position information and the first identifier.

20. A computer program product comprising instructions stored on a non-transitory computer-readable medium that, when executed by a processor, cause a first electronic device to:

display a first interface, wherein the first interface comprises first prompt information and a first identifier of a second electronic device, and wherein the first prompt information prompts a user to shake the first electronic device;

detect a shake operation performed on the first electronic device;

send, in response to the shake operation and at each of a first position and a second position, a BLUETOOTH positioning signal to the second electronic device;

receive, in response to sending the BLUETOOTH positioning signal, first response information from the second electronic device;

determine, based on the first response information, first position information of the second electronic device, wherein the first position information comprises a first direction of the second electronic device or a first distance of the second electronic device, and wherein the first distance is between the first electronic device and the second electronic device; and display a second interface, wherein the second interface comprises the first position information and the first identifier.

* * * * *